United States Patent
Kamiya et al.

(10) Patent No.: US 7,487,006 B2
(45) Date of Patent: Feb. 3, 2009

(54) AUTOMATIC PROGRAMMING METHOD AND AUTOMATIC PROGRAMMING APPARATUS

(75) Inventors: Takashi Kamiya, Aichi (JP); Hiroshi Katano, Aichi (JP); Kenji Iriguchi, Tokyo (JP); Susumu Matsubara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 200 days.

(21) Appl. No.: 10/563,321

(22) PCT Filed: Jun. 30, 2004

(86) PCT No.: PCT/JP2004/009588

§ 371 (c)(1),
(2), (4) Date: Jan. 4, 2006

(87) PCT Pub. No.: WO2005/003871

PCT Pub. Date: Jan. 13, 2005

(65) Prior Publication Data

US 2007/0027571 A1  Feb. 1, 2007

(30) Foreign Application Priority Data

Jul. 4, 2003  (JP) ............................. 2003-192156

(51) Int. Cl.
*G06F 19/00*  (2006.01)

(52) U.S. Cl. .................. 700/183; 700/160; 700/171; 700/182; 700/192

(58) Field of Classification Search ................ 700/160, 700/171, 182, 183, 186, 192
See application file for complete search history.

(56) References Cited

U.S. PATENT DOCUMENTS

| 3,751,651 | A | * | 8/1973 | Pomella et al. | ............. 318/571 |
| 4,723,203 | A | * | 2/1988 | Kishi et al. | ................. 700/184 |
| 6,047,225 | A | | 4/2000 | Williamson | |
| 6,112,133 | A | * | 8/2000 | Fishman | ..................... 700/182 |
| 6,424,877 | B1 | | 7/2002 | Kondo et al. | |
| 6,580,963 | B2 | * | 6/2003 | Susnjara | ..................... 700/171 |
| 6,850,814 | B2 | * | 2/2005 | Kamiya | ..................... 700/182 |
| 2003/0078758 | A1 | | 4/2003 | Hariya et al. | |

FOREIGN PATENT DOCUMENTS

EP   1217482 A2   6/2002

(Continued)

OTHER PUBLICATIONS

European Search Report dated Sep. 25, 2006.

*Primary Examiner*—Sean P Shechtman
(74) *Attorney, Agent, or Firm*—Sughrue Mion, PLLC

(57) ABSTRACT

Workpiece data involving a product shape and having a smallest diameter for lathe turning around a turning axis is selected from the workpiece database, by comparing dimension data of a workpiece data with dimension data of a product model in a state in which the product model is arranged on the turning axis and the workpiece data is arranged so that a center axis of each workpiece matches a center of the turning axis. The workpiece model for lathe turning is created based on the selected workpiece data.

16 Claims, 49 Drawing Sheets

FOREIGN PATENT DOCUMENTS

| | | |
|---|---|---|
| JP | 58-186548 A | 10/1983 |
| JP | 3-177903 A | 8/1991 |
| JP | 7-40188 A | 2/1995 |
| JP | 7-93013 A | 4/1995 |
| JP | 10-11123 A | 1/1998 |
| JP | 10-207523 A | 8/1998 |
| JP | 10-277882 A | 10/1998 |
| JP | 2001-34318 A | 2/2001 |
| JP | 2002-189510 A | 7/2002 |
| JP | 2002-268718 A | 9/2002 |
| JP | WO002095512 | * 11/2002 |
| SU | 1301644 | 4/1987 |

* cited by examiner

FIG.8

WORKPIECE SHAPE

| MATERIAL | SHAPE | OUTER DIAMETER | INNER DIAMETER | . . . . . |
|---|---|---|---|---|
| CBN STL | Cylinder | 250 | 20 | |
| CBN STL | Cylinder | 250 | 30 | |
| CBN STL | Cylinder | 250 | 40 | |
| CBN STL | Cylinder | 250 | 50 | |
| CBN STL | Cylinder | 400 | | |
| CBN STL | Cylinder | 400 | 30 | |
| CBN STL | Cylinder | 500 | | |
| CBN STL | Cylinder | 800 | 70 | |
| CBN STL | Cylinder | 800 | 100 | |
| CBN STL | Hexagon | 300 | | |
| CBN STL | Hexagon | 300 | | |
| CBN STL | Hexagon | 400 | | |

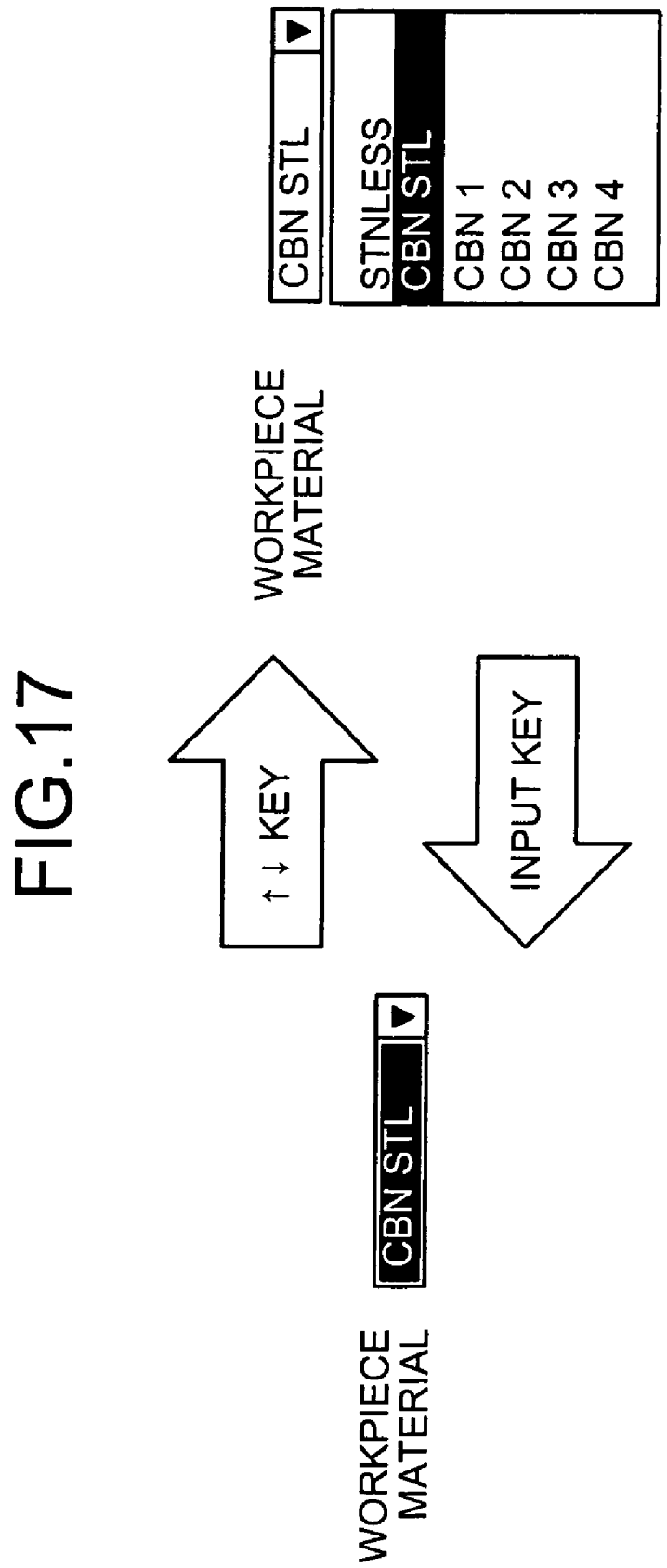

FIG.18

| | | | | |
|---|---|---|---|---|
| CBN STL | ROUND BAR | OUTER DIAMETER 250.0 | INNER DIAMETER 20.0 | |
| CBN STL | ROUND BAR | OUTER DIAMETER 250.0 | INNER DIAMETER 30.0 | |
| CBN STL | ROUND BAR | OUTER DIAMETER 250.0 | INNER DIAMETER 40.0 | LENGTH 800.0 |
| CBN STL | ROUND BAR | OUTER DIAMETER 250.0 | INNER DIAMETER 50.0 | LENGTH 800.0 |
| CBN STL | ROUND BAR | OUTER DIAMETER 400.0 | INNER DIAMETER 0.0 | |
| CBN STL | ROUND BAR | OUTER DIAMETER 400.0 | INNER DIAMETER 30.0 | |
| CBN STL | ROUND BAR | OUTER DIAMETER 500.0 | INNER DIAMETER 0.0 | LENGTH 500.0 |
| CBN STL | ROUND BAR | OUTER DIAMETER 800.0 | INNER DIAMETER 70.0 | LENGTH 300.0 |
| CBN STL | ROUND BAR | OUTER DIAMETER 800.0 | INNER DIAMETER 100.0 | LENGTH 500.0 |

42

↑ KEY
↓ KEY

41

| | |
|---|---|
| WORKPIECE MATERIAL | CBN STL ▶ |
| WORKPIECE SHAPE | ROUND BAR ▶ |
| OUTER DIAMETER | 254.5584 |
| INNER DIAMETER | 0 |
| LENGTH | 150 |
| END-FACE MACHINING ALLOWANCE | 0 |

FIG.33
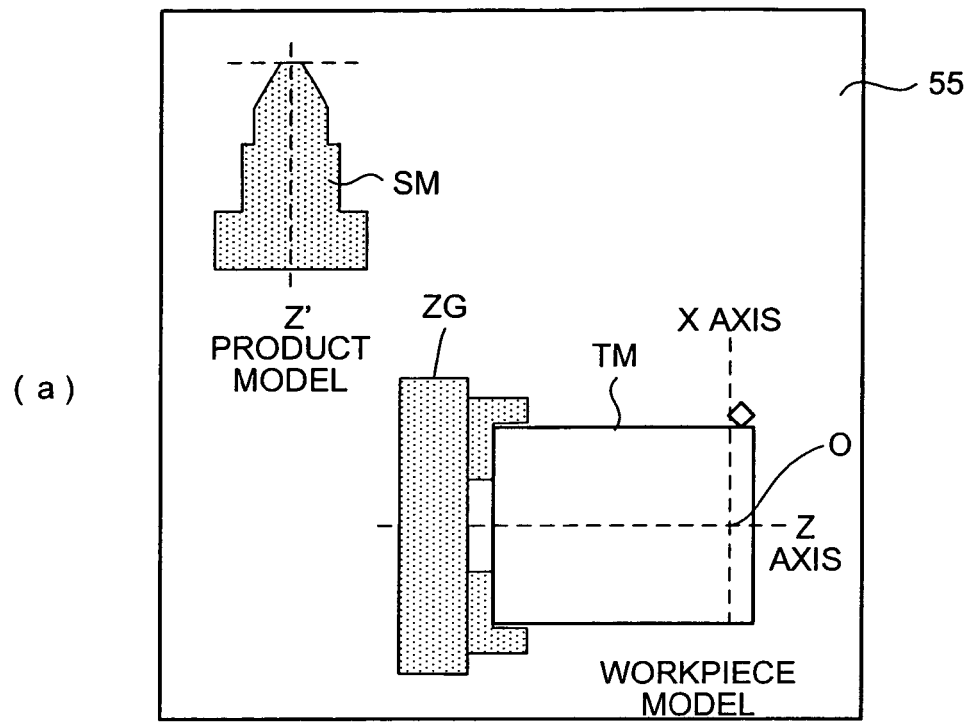
(a)
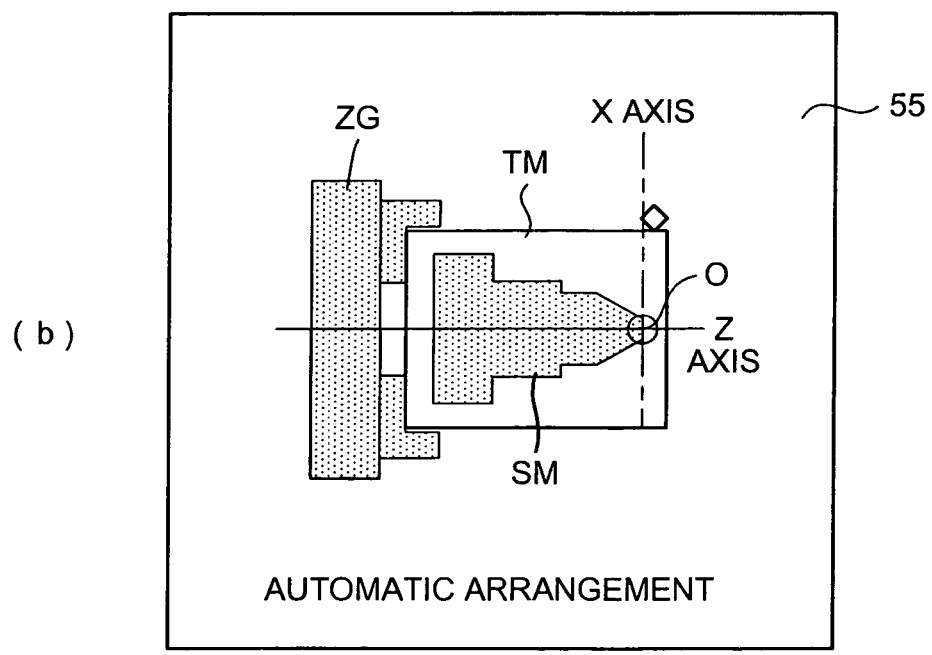
(b)

WHEN A PART OF CONE IS MISSING

DIAMETER OF TURNING SURFACE

311

CONE

DIAMETER OF TURNING SURFACE

313

SPHERE

DIAMETER OF TURNING SURFACE 310

CYLINDER

DIAMETER OF TURNING SURFACE

312

CIRCULAR (TORUS)

FIG.36

| X-AXIS PARALLEL SHIFT | Y-AXIS PARALLEL SHIFT | Z-AXIS PARALLEL SHIFT | | X-AXIS ROTATION | Y-AXIS ROTATION | Z-AXIS ROTATION | | FINISH SHAPE SHIFT |

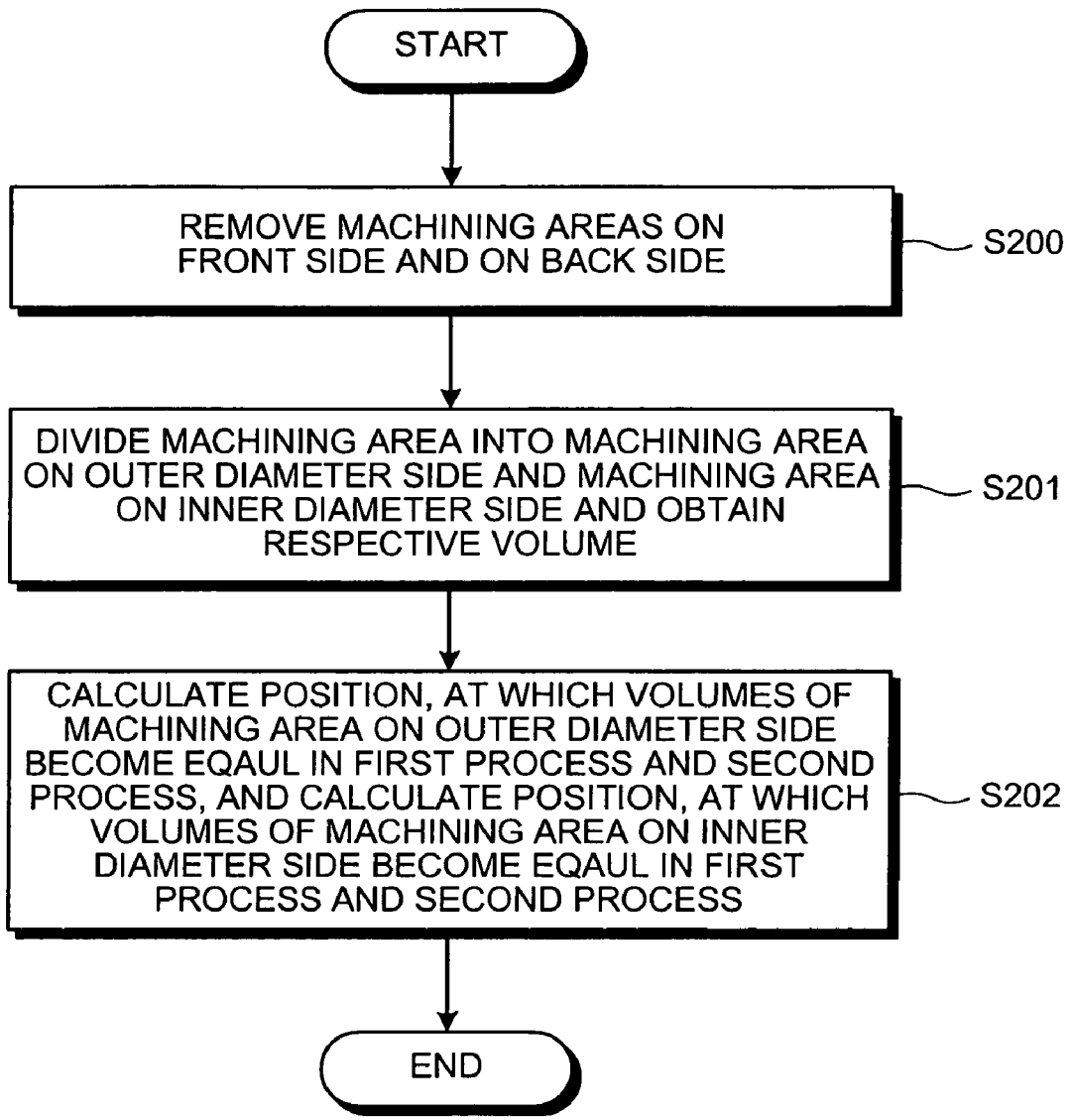

THROUGH HOLE        TWO HOLES

1/2 CROSS SECTION (a)  (b)

FIG.53

| UNIT | | | | | | | | | | |
|---|---|---|---|---|---|---|---|---|---|---|
| INEXPANDABLE | MODE | | | | | | | | | |
| FIG | SHAPE | SURFACE SHIFT Y | SURFACE SHIFT Z | SURFACE SHIFT R | X | Y | RADIUS R/ I | J | ANGLE B | ANGLE C |
| 1 | LINE (SUPPORT) | 0 | 0 | 0 | 18.487 | -29.602 | | | 0 | 0 |
| 2 | LINE | ♦ | ♦ | ♦ | 18.487 | -18.5 | | | ♦ | ♦ |
| 3 | LINE | ♦ | ♦ | ♦ | -18.487 | -18.5 | | | ♦ | ♦ |
| 4 | LINE | ♦ | ♦ | ♦ | -18.487 | -29.602 | | | ♦ | ♦ |
| 5 | LINE | ♦ | ♦ | ♦ | 18.487 | -29.602 | | | ♦ | ♦ |

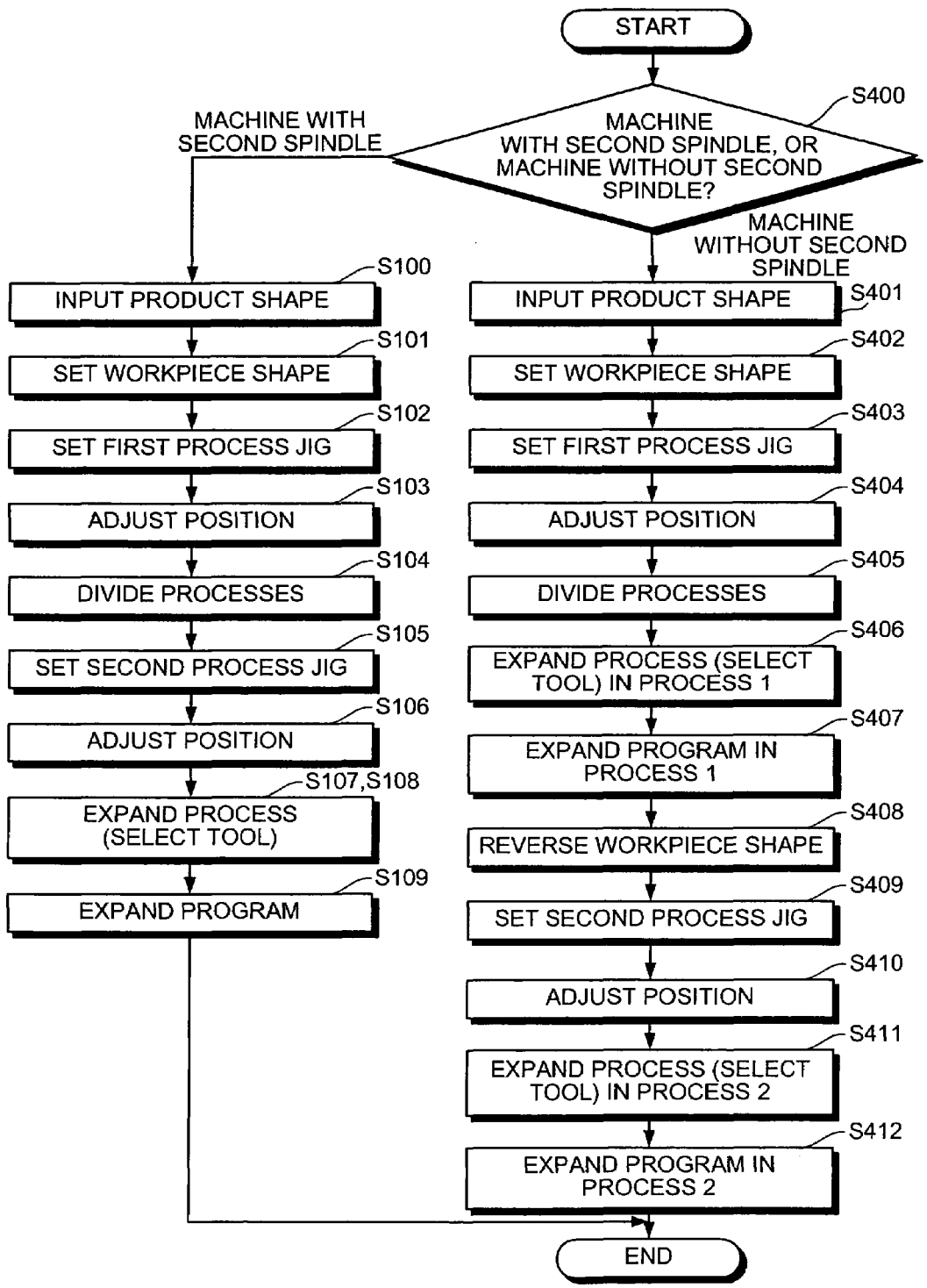

AUTOMATIC PROGRAMMING METHOD AND AUTOMATIC PROGRAMMING APPARATUS

TECHNICAL FIELD

The present invention relates to a technology for creating a numerical control (NC) program using computer-aided-design (CAD) data, such as a product shape and a workpiece shape, with an automatic selection of an optimum workpiece corresponding to a product.

BACKGROUND ART

In a machine tool on which an NC unit (numerical control unit) is mounted, a workpiece is machined into a desired product shape by executing the NC program. To create the NC creation program for creating the NC machining program, recently, an automatic programming technique using a microcomputer referred to as an automatic programming apparatus has been frequently used.

The primitive automatic programming apparatuses were not connected to the CAD data, and hence, it was necessary to perform programming, while watching the machining shape in a drawing or the like. However, recently, some techniques relating to the automatic programming apparatus that creates the NC machining program by the CAD data have been proposed.

For example, in Japanese Patent Application Laid-open No. 2002-189510, feature data of a machined product is extracted from the CAD data to set a machining process and a machining area for each machining process, material data and a machining model for each machining process are created, the created machining process data and machining model data are stored, tool path data is created based on the machining process data, workpiece data, machining model data, tool data, and cutting condition data, to create virtual workpiece-shape data after completing the respective processes, as well as creating fabrication information based on the created process data, workpiece data, tool path data, and virtual workpiece-shape data.

In Japanese Patent Application Laid-open No. 2002-268718, when a machining path for machining a workpiece based on a three-dimensional CAD data of a part is created, machining information for all portions to be machined in a shape indicated by the three-dimensional CAD data is extracted, the extracted machining information is edited to determine a machining process, and the machining path is created based on the determined machining process.

In such type of automatic programming apparatus, it is desired to automatically select an optimum workpiece corresponding to a product easily.

In Japanese Patent Application Laid-open No. H10-207523, some workpiece-shapes expressed by a three-dimensional solid model are stored in a preparation workpiece-shape database, and workpiece-shape data specified by an operator is taken out from the preparation workpiece-shape database, deformed to a size instructed by the operator, and stored in the workpiece-shape database.

In Japanese Patent Application Laid-open No. H10-207523, however, since the operator selects the workpiece from the workpiece-shape data, long time is required for selecting the work, thereby deteriorating the working efficiency.

The present invention has been achieved in order to solve the above problems, and it is therefore an object of the invention to provide an automatic programming method and device that can automatically select optimum workpiece data from the workpiece database, thereby enabling efficient programming operation.

DISCLOSURE OF INVENTION

An automatic programming method according to one aspect of the present invention, which is for selecting workpiece data from a workpiece database in which a material, a shape, and a dimension of a workpiece are registered, creating a workpiece model for lathe turning based on the selected workpiece data, and creating a program for controlling a numerical control device based on a product model for lathe turning and the created workpiece model, includes workpiece selecting including selecting workpiece data involving a product shape and having a smallest diameter for lathe turning around a turning axis from the workpiece database, by comparing dimension data of the workpiece data with dimension data of the product model in a state in which the product model is arranged on the turning axis and the workpiece data is arranged so that a center axis of each workpiece matches a center of the turning axis, and selecting, when there is a plurality of workpiece data involving the product shape and having the smallest diameter for lathe turning around the turning axis, workpiece data having a length equal to or longer than the product shape and a shortest length; and creating the workpiece model for lathe turning based on the selected workpiece data.

According to the present invention, minimum workpiece data involving the product shape is automatically selected from the workpiece database, in the state that the product model is arranged on the turning axis for turning and the work model for turning created based on the workpiece data is arranged so that the central axis of each work matches the center of the turning axis for turning. As a result, optimum workpiece data can be selected in the state that a product and a work are actually arranged on a machine.

BRIEF DESCRIPTION OF DRAWINGS

FIG. 8 is a table of an example of stored data in workpiece-shape database;

FIG. 17 is a schematic for illustrating a display mode in a workpiece-material input column;

FIG. 18 is a schematic for illustrating a shift of focus between a data input column and a list box of workpiece database;

FIG. 33 is a schematic for illustrating a display content of a registration screen for performing the automatic registration processing of the product model and the workpiece model;

FIG. 36 is a schematic for illustrating a shape shift menu;

FIG. 41 is a flowchart of another example of the automatic processing for dividing the process;

FIG. 53 is a schematic for illustrating a state in which the shape sequence is inserted into the editor section;

FIG. 57 is a flowchart of an operation procedure of the automatic programming apparatus according to the second embodiment.

BEST MODE(S) FOR CARRYING OUT THE INVENTION

Exemplary embodiments of an automatic programming method and an automatic programming apparatus according to the present invention are explained below in detail with reference to the accompanying drawings.

Figure 1:
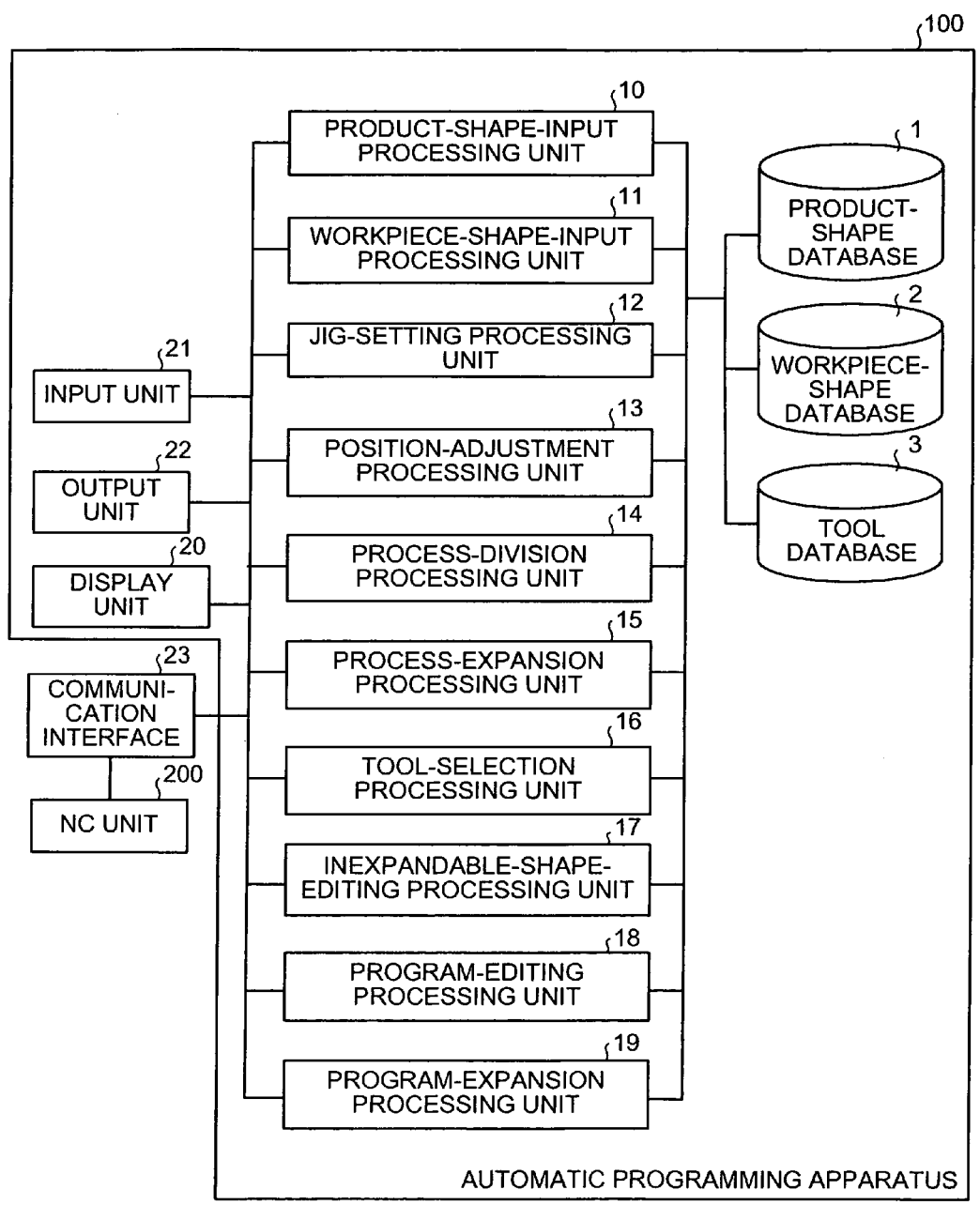
FIG. 1 is a block diagram of a configuration of an automatic programming apparatus.

FIG. 1 is a block diagram of a configuration of an automatic programming apparatus according to a first embodiment of the present invention. An automatic programming apparatus 100 includes, as a basic component, NC creating software for directly fetching data relating to a product shape and a workpiece-shape from CAD data, and creating an NC creation program for machining a product from a material (workpiece) in an interactive mode with an operator, by various data such as the fetched product shape data and workpiece-shape data. The automatic programming apparatus is installed in a computer such as a microcomputer. The NC creation program is described in a predetermined language higher than the NC program.

The automatic programming apparatus 100 can be applied to a two-spindle machine tool having two spindles, that is, a main spindle and a sub-spindle, and a one-spindle machine tool having only the main spindle. However, the automatic programming apparatus applied to the two-spindle machine tool having two spindles, the main spindle and the sub-spindle, will be explained in the first embodiment. The automatic programming apparatus applicable to both the two-spindle machine tool and the one-spindle machine tool will be explained in the second embodiment.

The automatic programming apparatus 100 is applicable to the machine tool that performs lathe-turning for rotating a workpiece and shaving it in a round shape, boring for rotating the workpiece and boring therein, milling for fixing the workpiece and rotating an edged tool to shave the work, and surface machining. The automatic programming apparatus 100 is also applicable to combined machining in which lathe-turning and milling are combined.

FIG. 1 shows a state in which the automatic programming apparatus 100 is installed in a computer, and the automatic programming apparatus 100 is connected to an NC unit 200 that is operated by an NC program via a communication interface 23.

In FIG. 1, a product shape database 1, a workpiece-shape database 2, and a tool database 3 are registered in a built-in memory or an external memory of the microcomputer in which the automatic programming apparatus 100 is installed. Pieces of product shape data shown in three-dimensional CAD data (three-dimensional solid model data) are registered and stored in the product shape database 1. Various types of data, such as the material, shape (columnar, square, hexagonal and the like), and size (outer diameter, inner diameter, length, and the like) are registered and stored in the workpiece-shape database 2, for each work. Tool data is registered and stored in the tool database 3.

The microcomputer, in which the automatic programming apparatus is installed, includes a display apparatus 20, an input unit 21 such as a keyboard and a mouse, and an output unit 22 such as a printer, and the microcomputer is connected to external equipment such as the NC unit 200 via the communication interface 23.

A program unit, which is the basic component of the automatic programming apparatus 100, includes a product-shape-input processing unit 10, a workpiece-shape-input processing unit 11, a jig-setting processing unit 12, a registration processing unit 13, a process-division processing unit 14, a process-expansion processing unit 15, a tool-selection processing unit 16, a non-expandable-shape-editing processing unit 17, a program-editing processing unit 18, and a program-expansion processing unit 19.

The product-shape-input processing unit 10 displays a product shape input screen for selecting the product shape data (product model) by an operator, and when the operator selects the necessary product shape data from a plurality of product shape data formed of the product shape database 1 or three-dimensional solid model data stored in another optional memory, the product-shape-input processing unit 10 executes processing such as three-dimensionally displaying the selected product shape data.

The workpiece-shape-input processing unit 11 displays a workpiece-shape input screen for selecting the workpiece-shape data (workpiece model) by the operator, allows the necessary workpiece-shape data to be selected automatically or by the operator from the plurality of workpiece-shape data formed of the product shape database 1 or the three-dimensional solid model data stored in another optional memory, and executes processing such as three-dimensionally displaying the selected workpiece-shape data. The workpiece-shape-input processing unit 11 has a partial-workpiece setting function for creating thickened workpiece data used for casting and the like based on the product shape data.

The jig-setting processing unit 12 displays jig models formed of a chuck and a claw, and workpiece models, prepares a plurality of jig arrangement patterns corresponding to the workpiece-shapes, determines the jig arrangement by allowing the operator to select a jig arrangement pattern, and calculates a holding position and a holding diameter, to transmit the information to the NC side.

The registration processing unit 13 performs processing for automatically arranging the product model in the workpiece model held by a first chuck at a first process (step performed by the main spindle). The registration processing unit 13 also performs processing for automatically arranging the product model in the workpiece model held by a second chuck at a second process (step performed by a sub-spindle).

The process-division processing unit 14 performs process division processing at the time of machining by the two-spindle machine tool having two spindles, the main spindle and the sub-spindle, and process division processing at the time of machining by the one-spindle machine tool having only the main spindle. In the case of the two-spindle machine tool, the dividing position between the first process performed by the main spindle and the second process performed by the sub-spindle is specified by an outer diameter and an inner diameter. In the case of the one-spindle machine tool, the dividing position of the first process for performing machining by holding one end of a workpiece model by the main spindle, and the second process for performing machining by holding the other end of the workpiece model by the main spindle, is specified by an outer diameter and an inner diameter, respectively.

The process-expansion processing unit 15 executes processing for breaking down a series of machining operations including lathe-turning, point machining, surface machining, and chamfering, referred to as machining modes, into machining units in which continuous machining is performed with the same main spindle and the same tool.

The tool-selection processing unit 16 performs tool determination processing for selecting an optimum tool for each processing position (machining unit) from the tool database 3, and also determines cutting condition corresponding to the tool.

The program-expansion processing unit 19 creates an NC creation program described by the predetermined language based on a combination of a plurality of process-expanded machining units, the determined tool information, and the cutting condition.

The non-expandable-shape-editing processing unit 17 performs editing workpiece for converting the non-expandable shape, which cannot be automatically expanded into the machining unit in the process expansion processing, to some machining unit. The program-editing processing unit 18 is for performing the editing processing of the created NC creation program.

Figure 2:
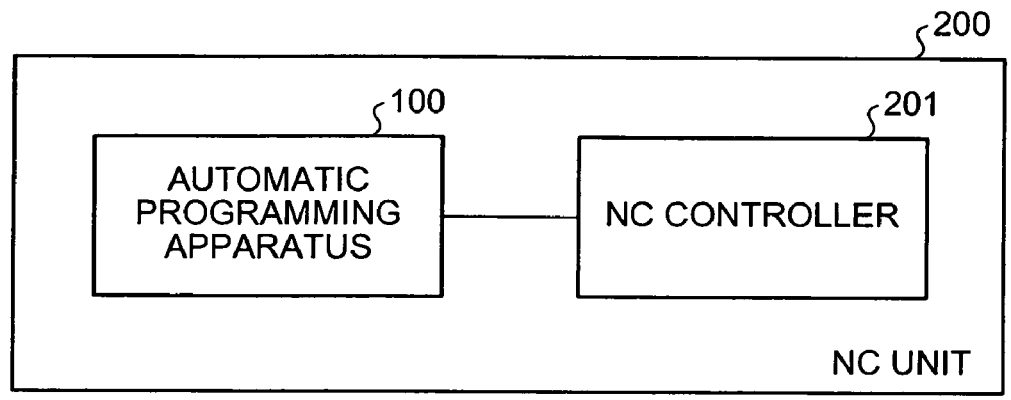
FIG. 2 is a block diagram of an NC unit having the automatic programming apparatus built therein.

The automatic programming apparatus 100 is connected to the NC unit 200 via the communication interface 23 in FIG. 1, however as shown in FIG. 2, the automatic programming apparatus 100 can be installed into the NC unit 200. In this case, the automatic programming apparatus 100 is connected to an NC controller 201 in the NC unit 200.

Figure 3:
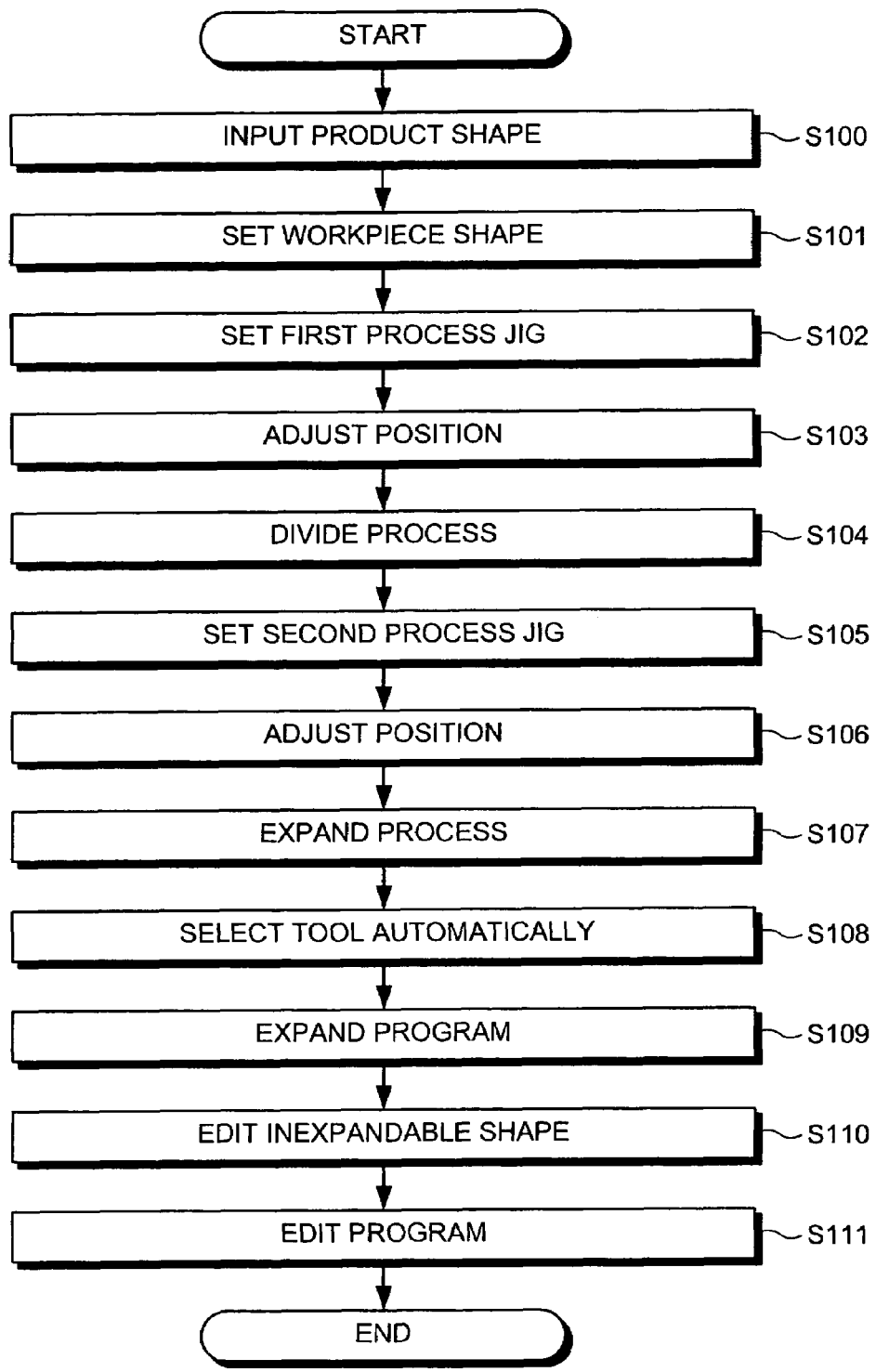
FIG. 3 is a flowchart of an operation procedure of the automatic programming apparatus according to a first embodiment of the present invention.

FIG. 3 is a flowchart of a creation procedure of the NC creation program (machining program) executed by the automatic programming apparatus 100 shown in FIGS. 1 and 2. The details of the creation procedure of the NC creation program executed by the automatic programming apparatus will be explained for each process, with reference to FIG. 3.

Figure 4:
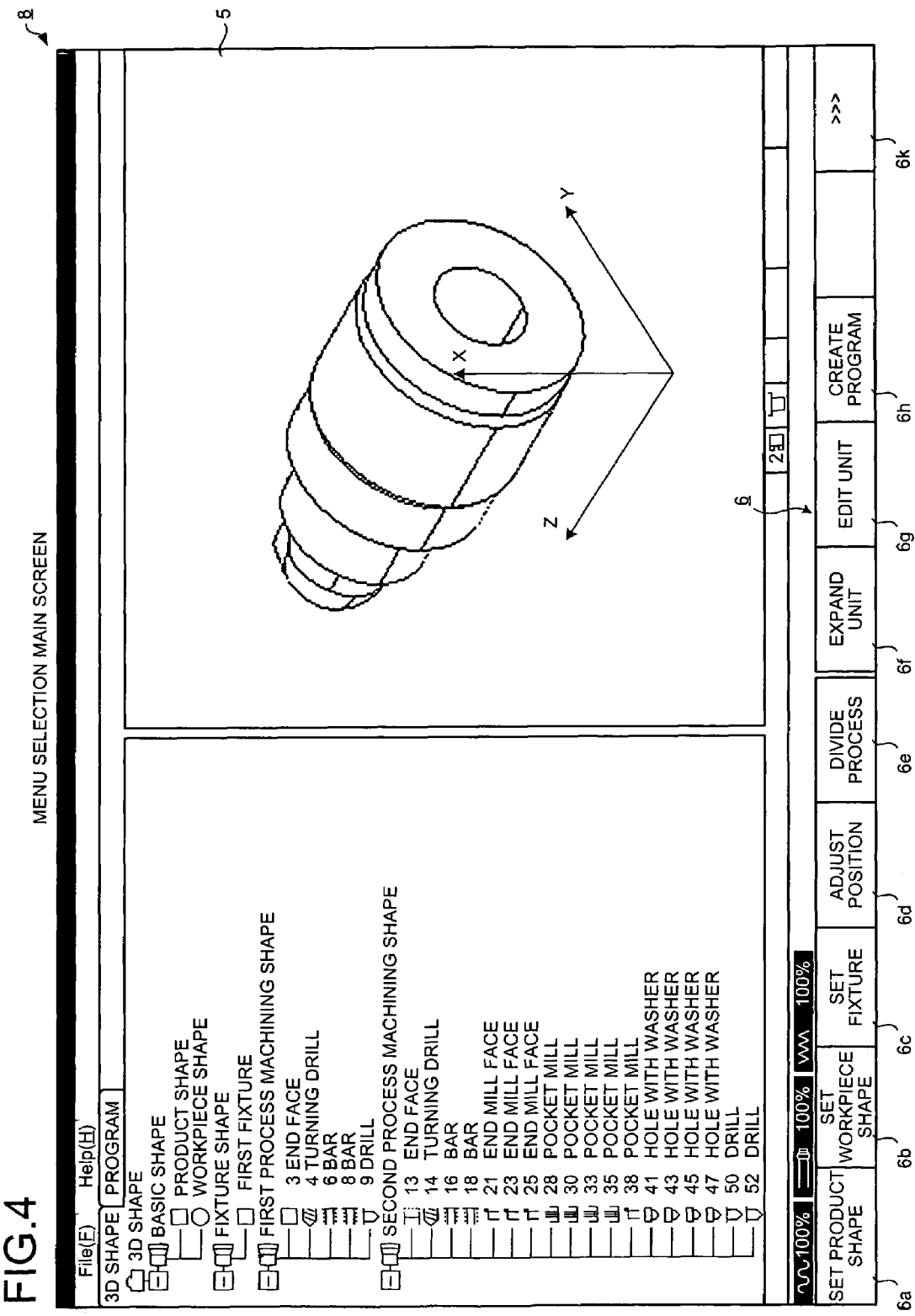
FIG. 4 is a schematic for illustrating an example of a menu selection main screen.

A menu selection main screen 8 displayed first when activating the automatic programming apparatus 100 will be explained. FIG. 4 is a schematic for illustrating an example of the menu selection main screen 8.

As shown in FIG. 4, the menu selection main screen 8 includes a tree display unit 4, a 3D display unit 5, a menu display unit 6, and the like. A name of a product file, a name of a workpiece file, a jig (fixture) file, file names of respective machining units expanded to the machining units, and the like are tree-displayed on the tree display unit 4. The shape data of the product file, workpiece file, jig file, or machining unit file selected on the tree display unit 4 are three-dimensionally (3D) displayed on the 3D display unit 5.

The menu display unit 6 includes a SET PRODUCT SHAPE button 6a, a SET WORKPIECE SHAPE button 6b, a SET FIXTURE button 6c, an ADJUST POSITION button 6d, a DIVIDE PROCESS button 6e, an EXPAND UNIT button 6f, an EDIT UNIT button 6g, a CREATE PROGRAM button 6h, and the like. The SET PRODUCT SHAPE button 6a is a button for shifting to a product shape setting mode, wherein processing such as reading a 3D-CAD model of the product shape is executed. The SET WORKPIECE SHAPE button 6b is a button for shifting to a workpiece-shape setting mode, wherein the workpiece-shape to be machined is selected and set. The SET FIXTURE button 6c is a button for shifting to a fixture setting mode, wherein a fixture (chuck, claw) for holding the workpiece is set. The ADJUST POSITION button 6d is a button for shifting to a registration mode, wherein positioning of the product and the workpiece is executed. The DIVIDE PROCESS button 6e is a button for shifting to a process dividing mode, wherein a dividing position of the first process and the second process is set. The EXPAND UNIT button 6f is a button for shifting to a unit expanding mode, wherein automatic expansion of the machining unit is executed from the set information. The EDIT UNIT button 6g is a button for shifting to a unit editing mode, wherein editing of the expanded machining unit is executed. The CREATE PROGRAM button 6h is a button for shifting to a program creating mode, wherein the NC creation program is created from the expanded and edited unit.

Figure 5:
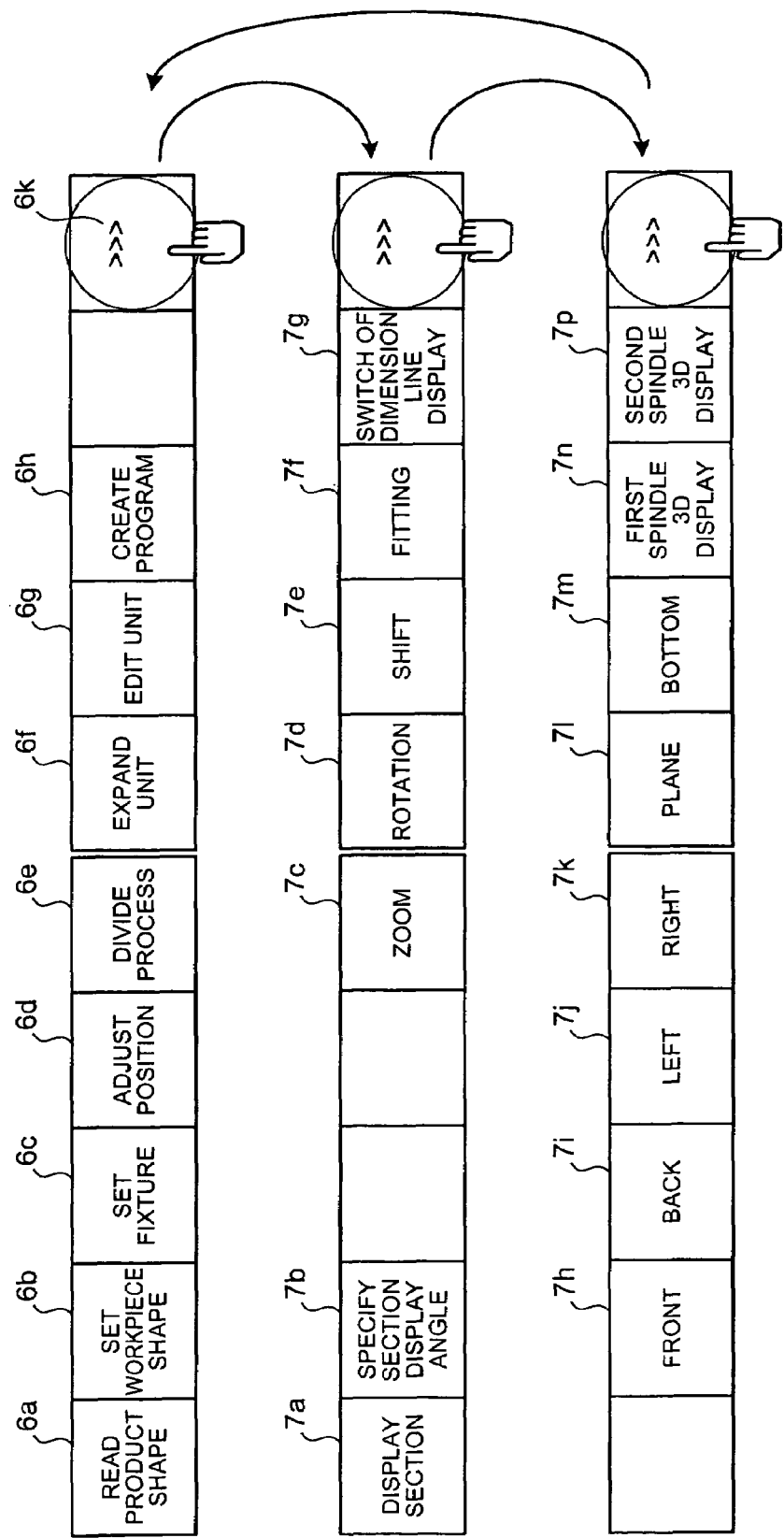
FIG. 5 is a schematic for illustrating an example of an extension menu of the menu selection main screen.

The menu display unit 6 includes a menu changeover button 6k. Other display menus shown in FIG. 5 are changed over and displayed on the menu display unit 6 by operating the menu changeover button 6k. A DISPLAY SECTION button 7a is a button for section-displaying the display data of the 3D display unit 5, and a SPECIFY SECTION DISPLAY ANGLE button 7b is a button for executing section display at a specified angle. A ZOOM button 7c, a ROTATION button 7d, and a SHIFT button 7e are for zoom, rotating, and shifting the display data on the 3D display unit 5. A FITTING button 7f is a button for displaying the displayed 3D shape so that the whole shape is fitted in the middle of the screen, with the posture thereof unchanged. A SWITCH DIMENSION LINE DISPLAY button 7g is a button for displaying or non-displaying a dimension line with respect to the displayed 3D shape. A FRONT button 7h, a BACK button 7i, a LEFT button 7j, a RIGHT button 7k, a PLANE button 7l, and a BOTTOM button 7m are for performing front display, back display, left side display, right side display, plane display, and bottom display of the displayed 3D shape. A FIRST SPINDLE 3D DISPLAY button 7n is a button for displaying the displayed 3D shape in a direction as seen toward the first spindle, and a SECOND SPINDLE 3D DISPLAY button 7p is a button for displaying the displayed 3D shape in a direction as seen toward the second spindle.

In the automatic programming apparatus, each process is normally executed according to the procedure shown in FIG. 3, after displaying the menu selection main screen 8. That is, respective steps are executed in order of product shape input processing (step S100), workpiece-shape setting processing (step S101), first process jig setting processing (step S102), registration processing (step S103), process division processing (step S104), second process jig setting processing (step S105), registration processing (step S106), process expansion processing (step S107), tool automatic setting processing (step S108), program expansion processing (step S109), non-expandable shape editing processing (step S110), and program edit processing (step S111). The respective processing will be explained in detail for each step.

(1) Input of Product Shape (Step S100)

Figure 6:
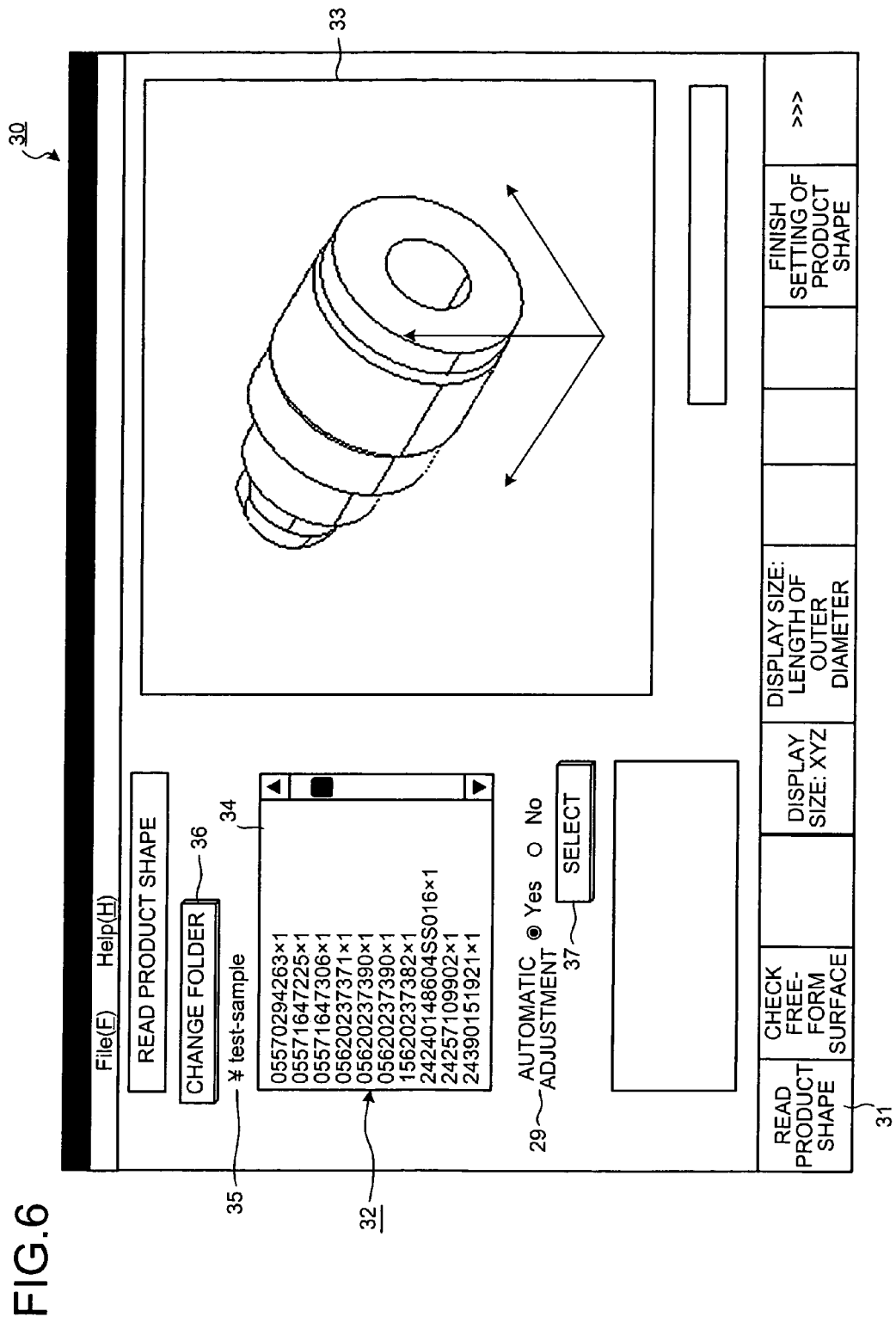
FIG. 6 is a schematic for illustrating an example of a product shape-reading screen.

The product shape input processing is started by turning ON the SET PRODUCT SHAPE button 6a on the menu selection main screen 8 shown in FIG. 4. When the SET PRODUCT SHAPE button 6a on the menu selection main screen 8 shown in FIG. 4 is turned ON, the screen is changed over to a product shape read screen 30 for the product shape input processing shown in FIG. 6. The product shape input processing is mainly executed by the product-shape-input processing unit 10 in FIG. 1.

An operator operates the input unit 21, with the product shape read screen 30 for selecting the product shape data being displayed, to select three-dimensional CAD data (product model) corresponding to the product in the following manner.

First, the operator presses a READ PRODUCT SHAPE button 31 positioned on the leftmost side of a plurality of buttons arranged below the product shape read screen 30. As a result, a product shape-reading dialog 32 is displayed on the left side and a three-dimensional view 33 for displaying the product shape (product model) corresponding to the selected three-dimensional CAD data in a wire frame format is displayed on the right side.

The product shape-reading dialog 32 has a list box 34 for displaying a list of CAD files registered in the product shape database 1. When the operator has selected an optional file in the list box 34, a preview of the product shape corresponding to the selected file is displayed on the three-dimensional view 33. In the preview, respective dimensions of the product in the X, Y, and Z directions are displayed on the three-dimensional view 33. Respective three-dimensional CAD data has shape information and color information (display color), and attribute data relating to the machining is added to the respective pieces of shape information. The attribute data includes screw, coarseness signs, grinding off, chamfering, chamfering of holes, hole information (drill, reamer, end mill, boring, and tapping), part number, material, names of articles, and the like. Adjustment (change of machining order) of the process expansion result is executed by the attribute data. The CAD data includes the color information (display color), and the roughness of the finished surface can be identified according to the display color.

The current directory is displayed on a directory display unit 35 positioned above the list box 34 of the file list. The file list in the directory displayed on the directory display unit 35 is displayed in the list box 34. When the operator presses a CHANGE FOLDER button 36, a folder-changing dialog (not shown) is displayed, and the current directory can be changed by operating the dialog.

When the operator presses a SELECT button 37, the CAD file selected in the list box 34 is read into a storage area of the automatic programming apparatus, an image of the product corresponding to the read CAD file is created, and the created product shape (product model) is displayed on the three-dimensional view 33. At the time of display, respective dimensions of the product model in the X, Y, and Z directions are displayed on the three-dimensional view 33. Furthermore, an automatic adjustment mode at the time of creating the image of the product shape is included, and if the operator selects YES in item 29 in this automatic adjustment mode, the direction of the product and the display position of the product are automatically adjusted on the three-dimensional view 33, in the product shape creation processing.

One or more directories are provided inside or outside the computer as an area for the product shape database 1, so that an optional three-dimensional CAD data can be newly registered in these directories, or already registered product shape data can be changed and re-registered.

(2) Setting of Workpiece-Shape (Step S101)

Figure 7:
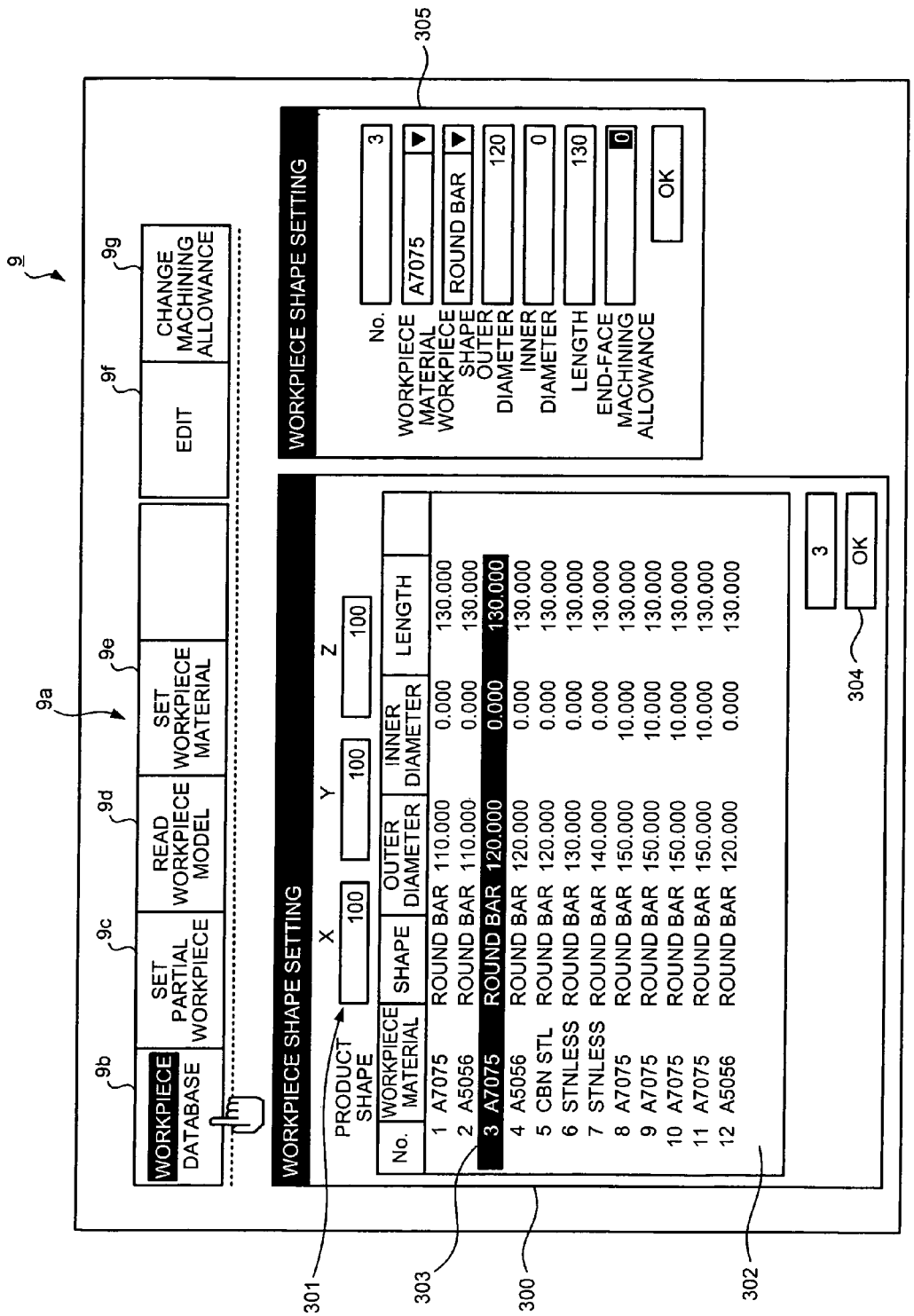
FIG. 7 is a schematic for illustrating an example of a workpiece-shape-setting screen.

The workpiece-shape setting processing is started by turning ON the SET WORKPIECE SHAPE button 6b on the menu selection main screen 8 shown in FIG. 4, and when the SET WORKPIECE SHAPE button 6b is turned ON, for example, the screen is changed over to a workpiece-shape setting screen shown in FIG. 7. The workpiece-shape setting processing is mainly executed by the workpiece-shape-input processing unit 11 in FIG. 1.

FIG. 8 is a diagram of an example of the workpiece-shape data registered in the workpiece-shape database 2. The workpiece-shape data includes, as shown in FIG. 8, materials, types of the shape (columnar, square, hexagonal and the like), size (outer diameter, inner diameter, length, and the like), and the like.

A workpiece setting menu 9a is displayed on a workpiece-shape setting screen 9 shown in FIG. 7. The workpiece setting menu 9a includes a WORKPIECE DATABASE button 9b, a SET PARTIAL WORKPIECE button 9c, a READ WORKPIECE MODEL button 9d, a SET WORKPIECE MATERIAL button 9e, an EDIT button 9f, and a CHANGE MACHINING ALLOWANCE button 9g.

The WORKPIECE DATABASE button 9b is a button for performing automatic selection of the work, described below. The SET PARTIAL WORKPIECE button 9c is a button for creating a workpiece model in which a product model used for casting or the like is partially thickened. The READ WORKPIECE MODEL button 9d is a button for reading workpiece data registered in the workpiece-shape database 2 or optional workpiece data stored in an external storage unit to set the workpiece data as a workpiece-shape. The SET WORKPIECE MATERIAL button 9e is a button for manually setting the material. The EDIT button 9f is a button for registering necessary workpiece data in the workpiece-shape database 2 or editing the registered workpiece data. The CHANGE MACHINING ALLOWANCE button 9g is a button for changing the set value for a machining allowance of an end face.

When the operator presses the WORKPIECE DATABASE button 9b, a workpiece database dialog 300 is displayed. The dimensions of the maximum outer diameter of the product shape in the X, Y, and Z directions, determined by the product shape input processing executed at step S100 are displayed in a product-shape-dimension display section 301 in the workpiece database dialog 300.

The workpiece-shape data registered in the workpiece-shape database 2 is displayed in a workpiece-list display section 302 in the workpiece database dialog 300. A workpiece having a minimum diameter including the outer diameter of the product is selected from the displayed workpiece-shape data, and the selected workpiece is highlighted as shown by reference sign 303. In this case, a round bar is selected by the operator as the workpiece-shape, the workpiece-shape data of the round-bar workpiece is displayed, and the workpiece having the minimum diameter including the outer diameter of the product is selected from the round-bar workpiece data, highlight-displayed. When the workpiece-shape is not specified, a workpiece having the minimum diameter including the outer diameter of the product is selected from all workpiece-shape data, such as round-bar work, square work, and hexagonal work, registered in the workpiece-shape database 2.

When the operator does not like the automatically selected and highlight-displayed workpiece data, the operator appropriately performs sorting by items of number, workpiece material, workpiece-shape, outer diameter, inner diameter, and length, to select desired workpiece data. When the operator presses an OK key 304, in a state with the desired workpiece data being selected (the selected workpiece data is highlight-displayed), the highlighted workpiece data is selected, and an end-face machining-allowance dialog 305 is opened.

In the end-face machining-allowance dialog 305, workpiece number, workpiece material, workpiece-shape, outer diameter, inner diameter, length, and end-face machining allowance of the selected workpiece are displayed, and in the initial state, the machining allowance is 0 millimeter.

The set value of the end-face machining allowance is for end-face machining for cutting off the workpiece end at the beginning of lathe-turning. That is, since the end of an unmachined workpiece is not cut off smoothly, end-face machining is executed at the beginning of lathe-turning. When the operator inputs a desired value as a set value of the end-face machining allowance, and presses the OK button, an end-face machining program for removing the set end-face machining allowance by lathe-turning is created at the time of creating the machining program.

Figure 9:
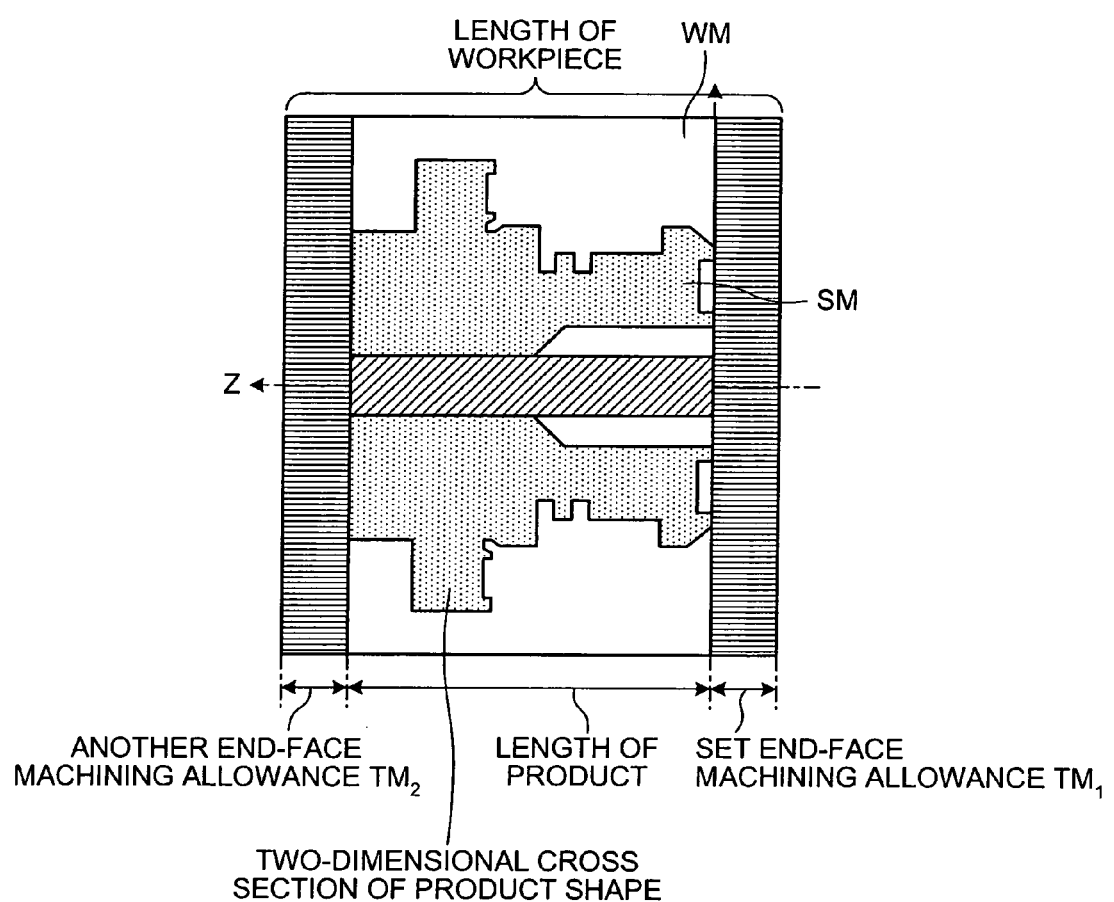
FIG. 9 is a schematic for illustrating a relation between end-face machining and end-face machining allowance set value.

FIG. 9 is a schematic for illustrating a concept of the end face processing. A workpiece model WM is overlapped on a product model SM in FIG. 9. In FIG. 9, an end-face machining allowance TM1 is a value set by the end-face machining-allowance dialog 305, and an end-face machining allowance TM2 on the other side is a value obtained by subtracting the product length and TM1 from the workpiece length.

Figure 10:
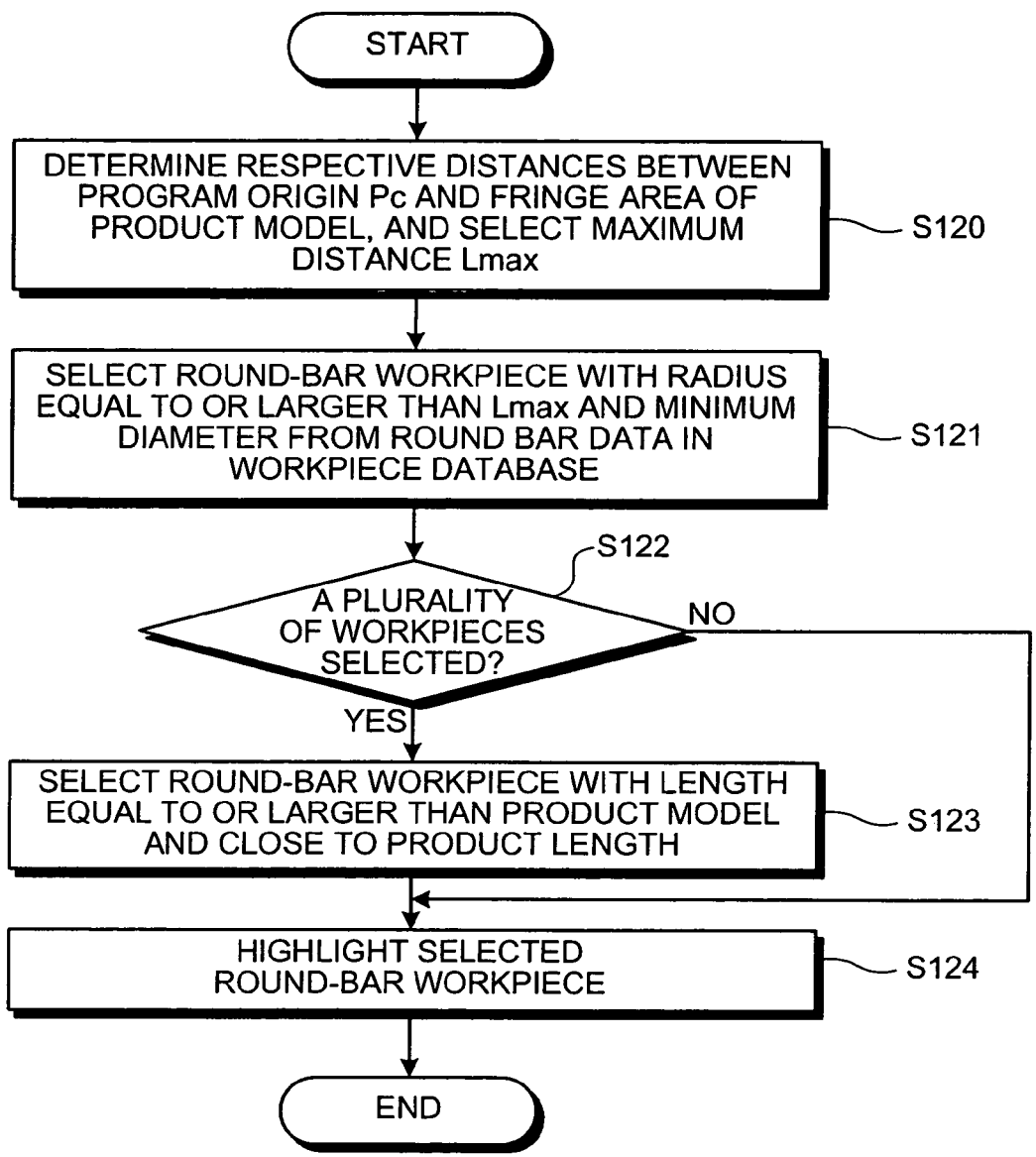
FIG. 10 is a flowchart of an automatic selection processing procedure of a round bar workpiece model.

FIG. 10 is a diagram of a procedure in automatic workpiece selection processing when the WORKPIECE DATABASE button 9b is pressed, and in this case, is a procedure when the round bar is specified as the workpiece-shape.

Figure 11:
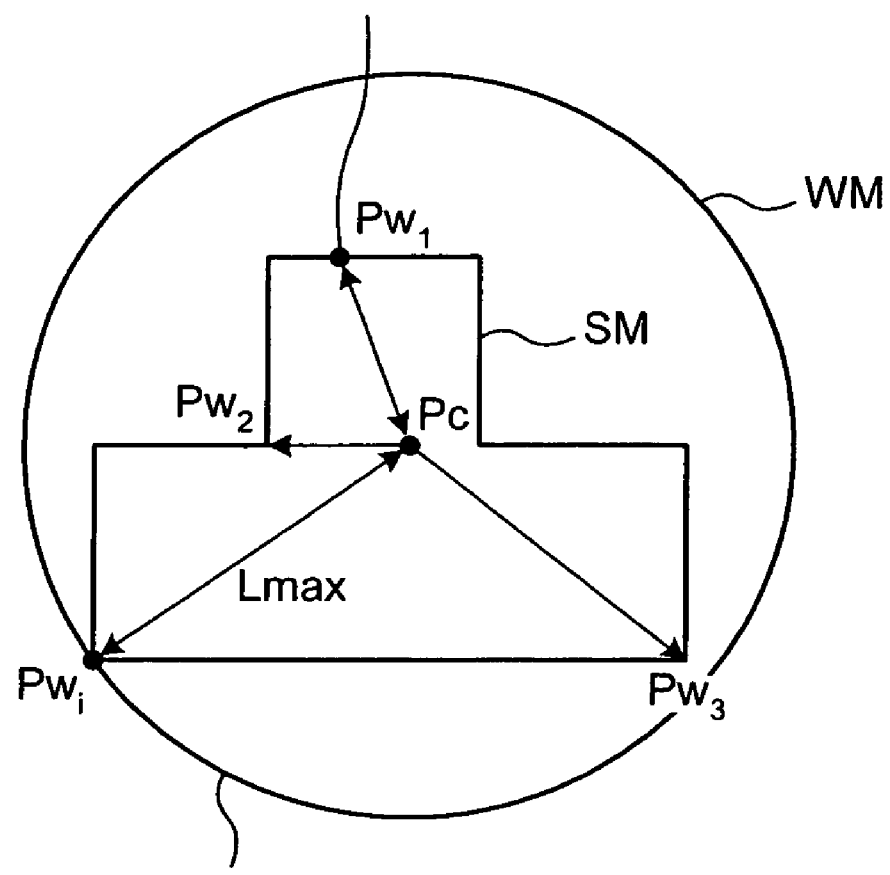
FIG. 11 is a schematic for illustrating an automatic-selection processing procedure shown in FIG. 10.

Respective distances from a program origin Pc (preset in the product shape input processing) of the product model determined in the product shape input processing executed at step S100 to the fringe area of the product model in a direction perpendicular to a turning axis (Z axis) of the product model is calculated, to select the maximum distance Lmax from a plurality of calculated distances (step S120). That is, as shown in FIG. 11, distances from the program origin Pc to a plurality of points PW1 to PWi on the fringe area of the product model SM in a direction perpendicular to the turning axis are respectively determined to select the maximum distance Lmax from the distances. In FIG. 11, a pivot (Z axis) extends in a direction perpendicular to the page.

A plurality of round bar data registered in the workpiece-shape database 2 is displayed in the workpiece-list display section 302 in the workpiece database dialog 300, and a round-bar workpiece whose radius equal to or larger than Lmax and having a minimum diameter is selected from the displayed round bar data (step S121).

When the selected round-bar workpiece is only one (step S122), the workpiece data corresponding to the selected round-bar workpiece is highlight-displayed in the workpiece-list display section 302 (step S124). However, when there is a plurality of selected round bar data, a round-bar workpiece having a length equal to or longer than the product model and shortest among the round-bar works (step S123). The workpiece data corresponding to the selected one or more round-bar works are highlight-displayed in the workpiece-list display section 302 (step S124).

Figure 12:
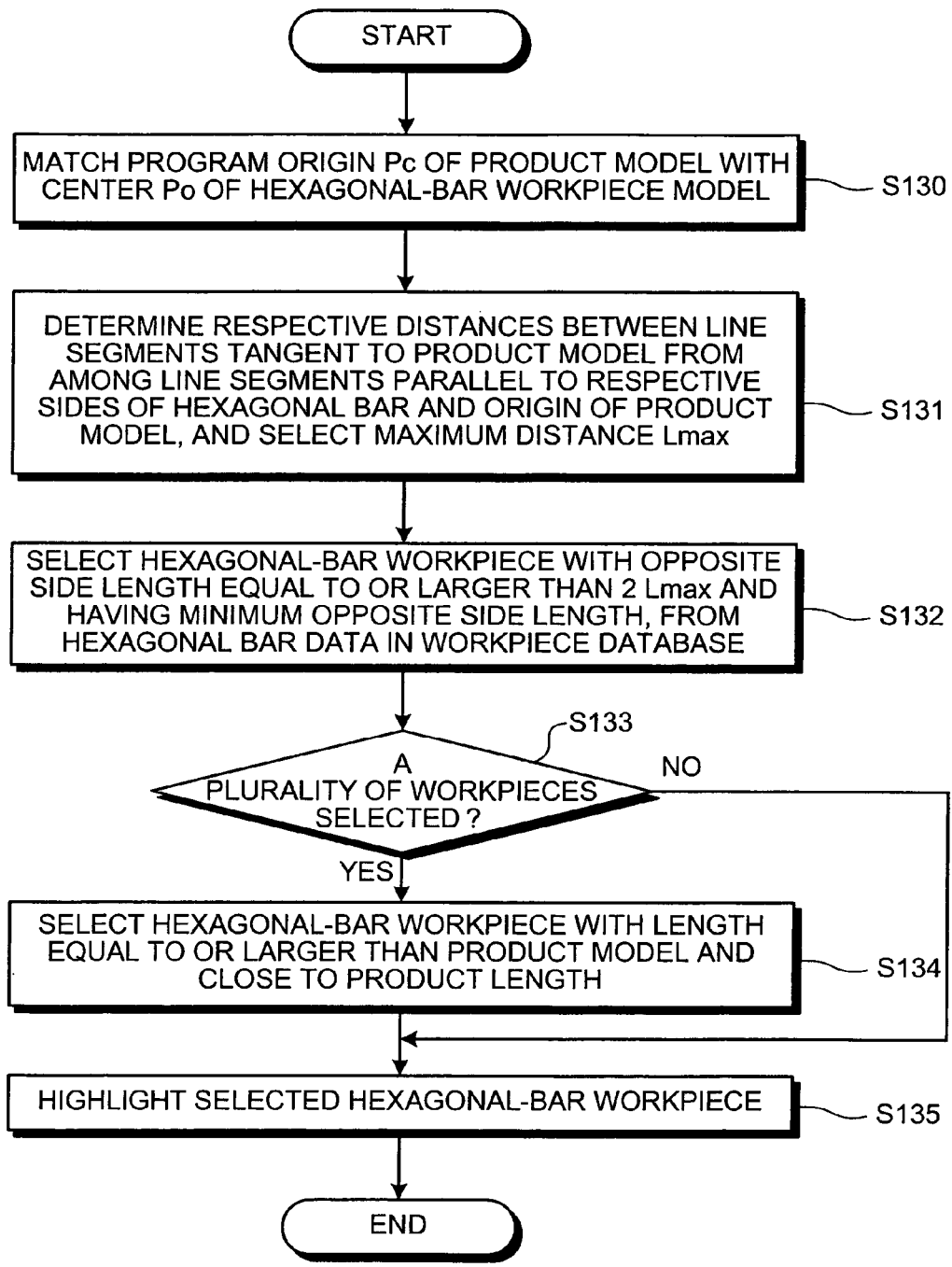
FIG. 12 is a flowchart of the automatic selection processing procedure of a hexagonal bar workpiece model.
Figure 13:
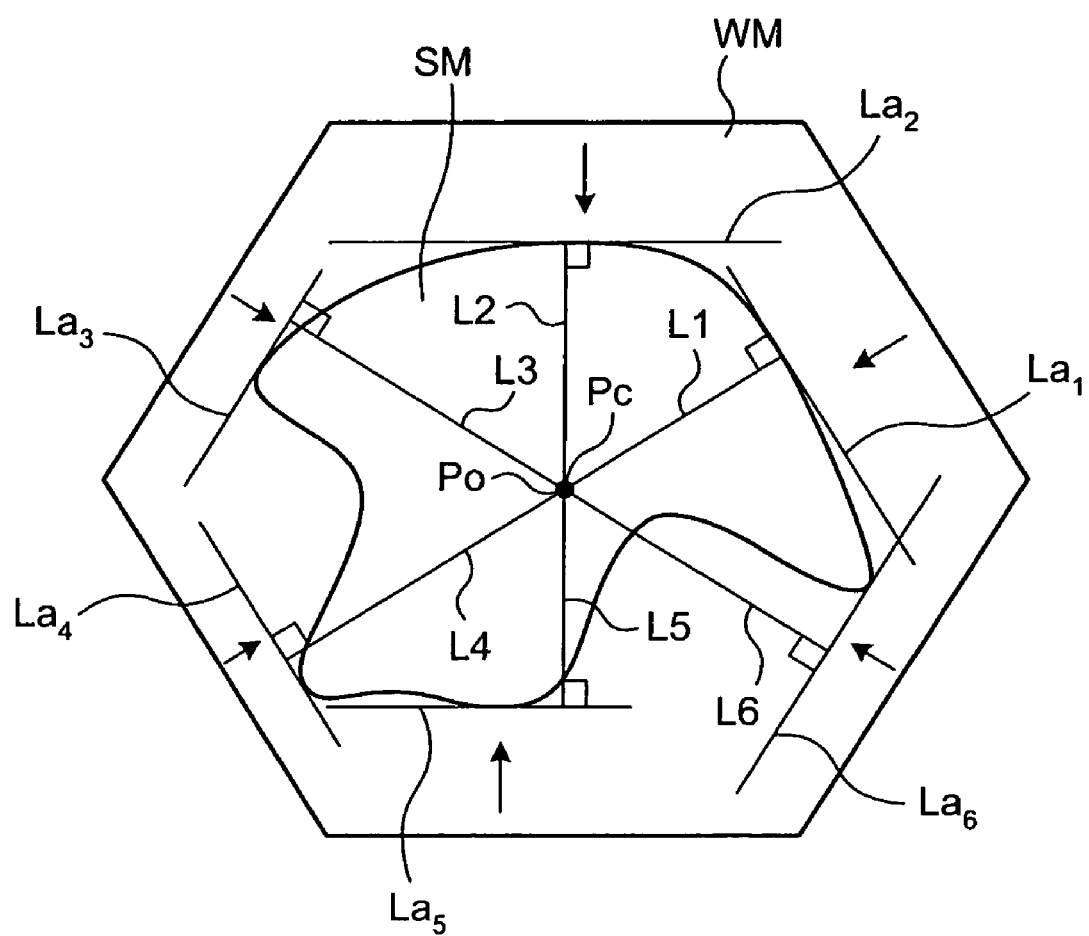
FIG. 13 is a schematic for illustrating the automatic-selection processing procedure shown in FIG. 12.

A procedure in the automatic workpiece selection processing when a hexagonal bar is selected as the workpiece-shape will be explained with reference to FIGS. 12 and 13. In this case, as shown in FIG. 13, the posture of the product model SM with respect to the hexagonal-bar workpiece model WM is determined, so that the program origin Pc of the product model SM matches the center Po of one hexagonal-bar workpiece model WM (step S130). Also in this case, the pivot extends in a direction perpendicular to the page.

The respective sides of the hexagonal-bar workpiece model WM are shifted in parallel until the sides touch the product model SM, to determine distances L1 to L6 between the parallel-shifted respective line segments La1 to La6 and the program origin Pc of the product model SM in the direction perpendicular to the turning axis. The longest distance Lmax is then obtained from these distances (step S131).

Pieces of hexagonal bar data registered in the workpiece-shape database 2 are displayed in the workpiece-list display section 302 in the workpiece database dialog 300, to select a hexagonal-bar workpiece having an opposite side length (a distance between opposite sides) equal to or larger than 2 Lmax and the shortest opposite side length, from the displayed hexagonal bar data (step S132).

When only one hexagonal-bar workpiece is selected (step S133), the workpiece data corresponding to the selected hexagonal-bar workpiece is highlight-displayed in the workpiece-list display section 302 (step S135). However, when there is a plurality of selected hexagonal bar data, a hexagonal-bar workpiece having a length equal to or longer than the product model and shortest among the hexagonal-bar works is selected (step S134). The workpiece data corresponding to the selected one or more hexagonal-bar works are highlight-displayed in the workpiece-list display section 302 (step S135).

Figure 14:
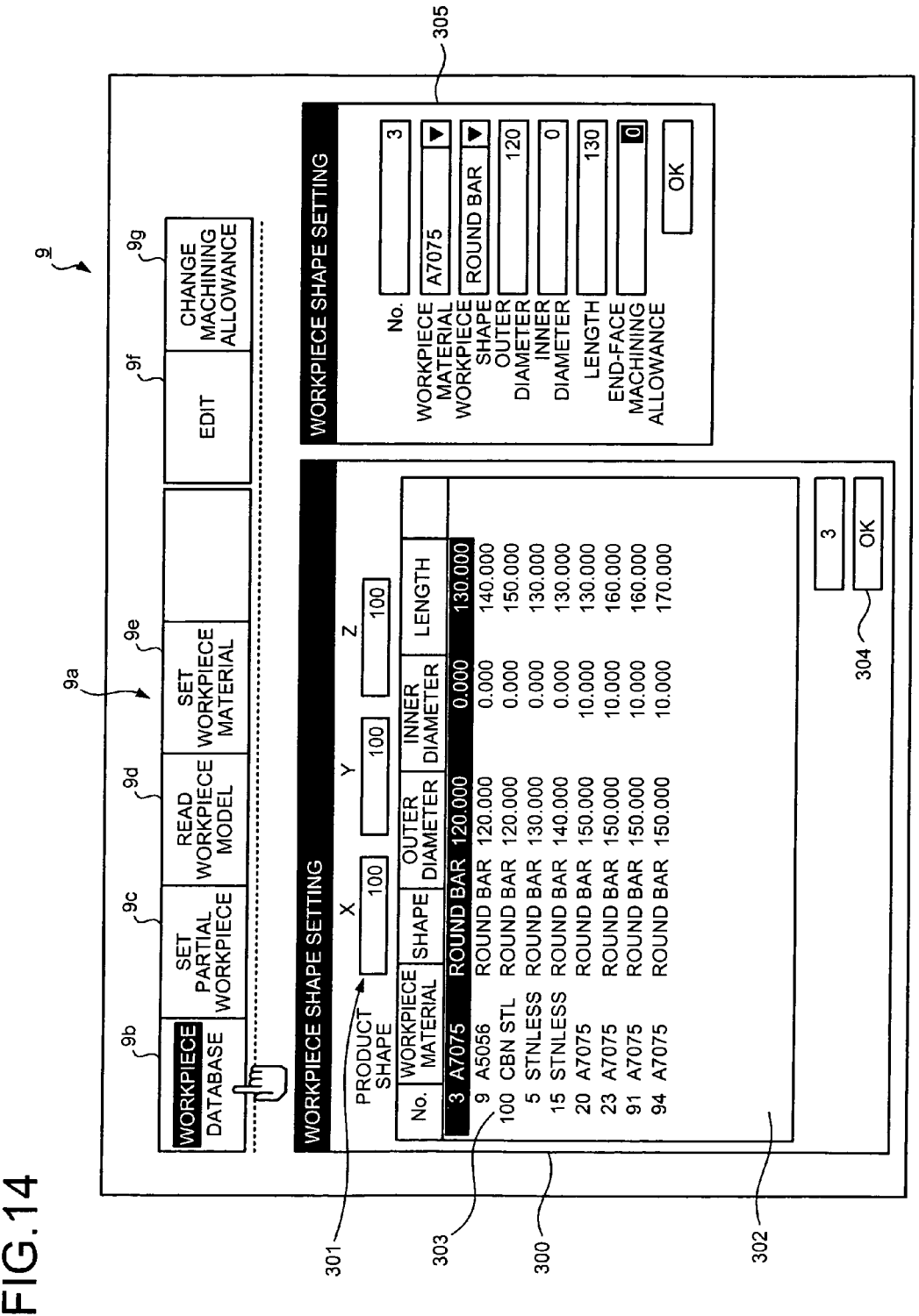
FIG. 14 is a schematic for illustrating an example of the workpiece-shape-setting screen for explaining another selection processing procedure of the workpiece model.

In the case of FIG. 7, all data registered in the workpiece-shape database 2 is displayed in the workpiece-list display section 302, and one or more minimum workpiece data involving the product model is highlight-displayed from the displayed data, but as shown in FIG. 14, only the works involving the product model can be displayed in the workpiece-list display section 302, from all data registered in the workpiece-list display section 302. When there is a plurality of works involving the product model, a workpiece having the smallest diameter and the smallest length, that is, the one whose chipped amount at the time of machining is small is highlight-displayed at the uppermost position in the workpiece-list display section 302, and hereunder, the display sequence is sorted out in order of from the one whose chipped amount is small from the upper position. By performing the display in this manner, the operator can easily select a workpiece contributing to cost reduction, with a fewer chipped amount at the time of machining.

Another embodiment of the workpiece model input setting processing will be explained with reference to FIGS. 15 to 18. The workpiece-shape setting screen shown in FIGS. 16 to 18 does not operate synchronized with the workpiece-shape setting screen 9 shown in FIG. 7, and the workpiece-shape setting screen shown in FIGS. 16 to 18 and the workpiece-shape setting screen 9 shown in FIG. 7 are screens of a so-called separate version.

When the workpiece data is registered in the workpiece-shape database 2, upon pressing an appropriate button (not shown) (corresponding to the EDIT button 9f on the workpiece-shape setting screen 9 shown in FIG. 7), a workpiece data registration screen (not shown) is displayed. The operator appropriately operates the workpiece data registration screen, to register required workpiece data as shown in FIG. 8 in the workpiece-shape database 2. Three-dimensional CAD data can be also input in the workpiece-shape database 2 as workpiece data.

Figure 16:
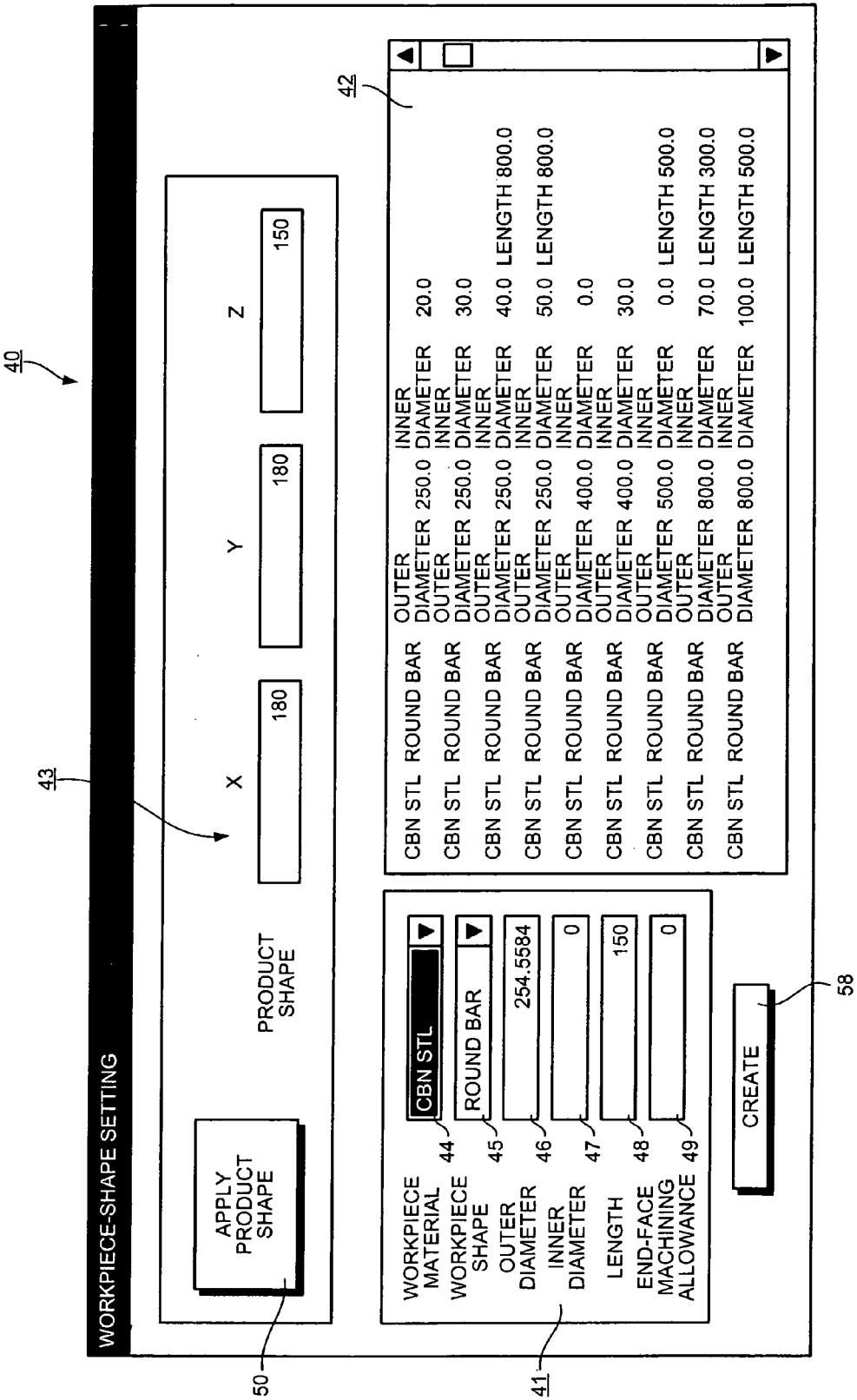
FIG. 16 is a schematic for illustrating another example of a workpiece-shape-forming dialog.

On the other hand, when the workpiece data is manually selected from the workpiece-shape database 2, the operator presses an appropriate button (corresponding to the READ WORKPIECE MODEL button 9d shown in FIG. 7). When this button is pressed, a workpiece-shape creating dialog 40 shown in FIG. 16 is displayed.

The workpiece-shape creating dialog 40 has a data input column 41 for inputting the workpiece material, workpiece-shape, outer diameter of the work, inner diameter of the work, length, and end-face machining allowance, a list box 42 in which data registered in the workpiece-shape database 2 is displayed, and a product-size display column 43 in which the XYZ dimensions of the product shape are displayed.

A workpiece-material input column 44 and a workpiece-shape input column 45 in the data input column 41 are formed of a combo box, and the operator selects the necessary one from the list in the combo box for the workpiece material and the workpiece-shape (round bar, square bar, and the like). An outer-diameter input column 46, an inner-diameter input column 47, a length input column 48, and an end-face machining-allowance input column 49 are formed of an edit box, and a required figure is directly input to each column.

When the operator selects a required material and a workpiece-shape in the workpiece-material input column 44 and the workpiece-shape input column 45, the workpiece-shape-input processing unit 11 searches the workpiece-shape database 2, using the selected material and workpiece-shape as a keyword, to extract the workpiece data matching the selected material and workpiece-shape, of multiple workpiece data in the workpiece-shape database 2, and lists/displays the extracted workpiece data in the list box 42.

The operator selects the required workpiece data from the list box 42, and for example, when the operator presses an input (enter) key on a keyboard, which is the input unit 21, the respective data in the outer-diameter input column 46, the inner-diameter input column 47, and the length input column 48 are automatically updated by the outer diameter, the inner diameter, and the length of the selected workpiece data. However, when the operator selects a workpiece having a zero length and presses an input key, the length of the workpiece is not changed.

The respective operation above can be performed by a pointer such as a mouse, but the following short cut key function can be provided. That is, when focus is in the workpiece-material input column 44 and the workpiece-shape input column 45, and for example, when a cursor shift key "↑" or "↓" is pressed, as shown in FIG. 17, the combo boxes in the workpiece-material input column 44 and the workpiece-shape input column 45 are opened, and the list is displayed. Furthermore, while the lists in the combo boxes in the workpiece-material input column 44 and the workpiece-shape input column 45 are opened, for example, if the input key is pressed, as shown in FIG. 17, the list is closed. Even when focus is not in the combo box, the list is closed likewise. For example, when a TAB key is pressed, focus is shifted among the workpiece-material input column 44, the workpiece-shape input column 45, the outer-diameter input column 46, the inner-diameter input column 47, the length input column 48, and the end-face machining-allowance input column 49. Furthermore, when focus is in any of the workpiece-material input column 44, the workpiece-shape input column 45, the outer-diameter input column 46, the inner-diameter input column 47, the length input column 48, and the end-face machining-allowance input column 49, if a cursor shift key "→" is pressed, as shown in FIG. 8, focus is shifted to the list box 42 in the workpiece database. When the focus is to be returned to the original position from the list box 42 in the workpiece database, a cursor shift key "←" is pressed.

Thus, the operator inputs appropriately desired data in the data input column 41 in the workpiece-shape creating dialog 40, so that the operator can manually set desired workpiece data.

After finishing data input setting to the data input column 41, when the operator presses a CREATE button 58, the input-set workpiece data is read into a storage area of the automatic programming apparatus from the workpiece-shape database 2, to create an image of a workpiece corresponding to the read workpiece data, and the created workpiece-shape is displayed on the three-dimensional view (not shown).

In the manual setting by the operator as described above, it is not assured that the optimum smallest workpiece that can be machined into a product shape can be selected. Therefore, in the product-size display column 43 in the workpiece-shape creating dialog 40, an APPLY PRODUCT SHAPE button 50 is provided for automatically selecting the optimum smallest workpiece that can be machined into the product shape selected by the operator. In the product-size display column 43, the XYZ dimensions of the product shape set in the product shape input processing at step S100 are displayed.

Figure 15:
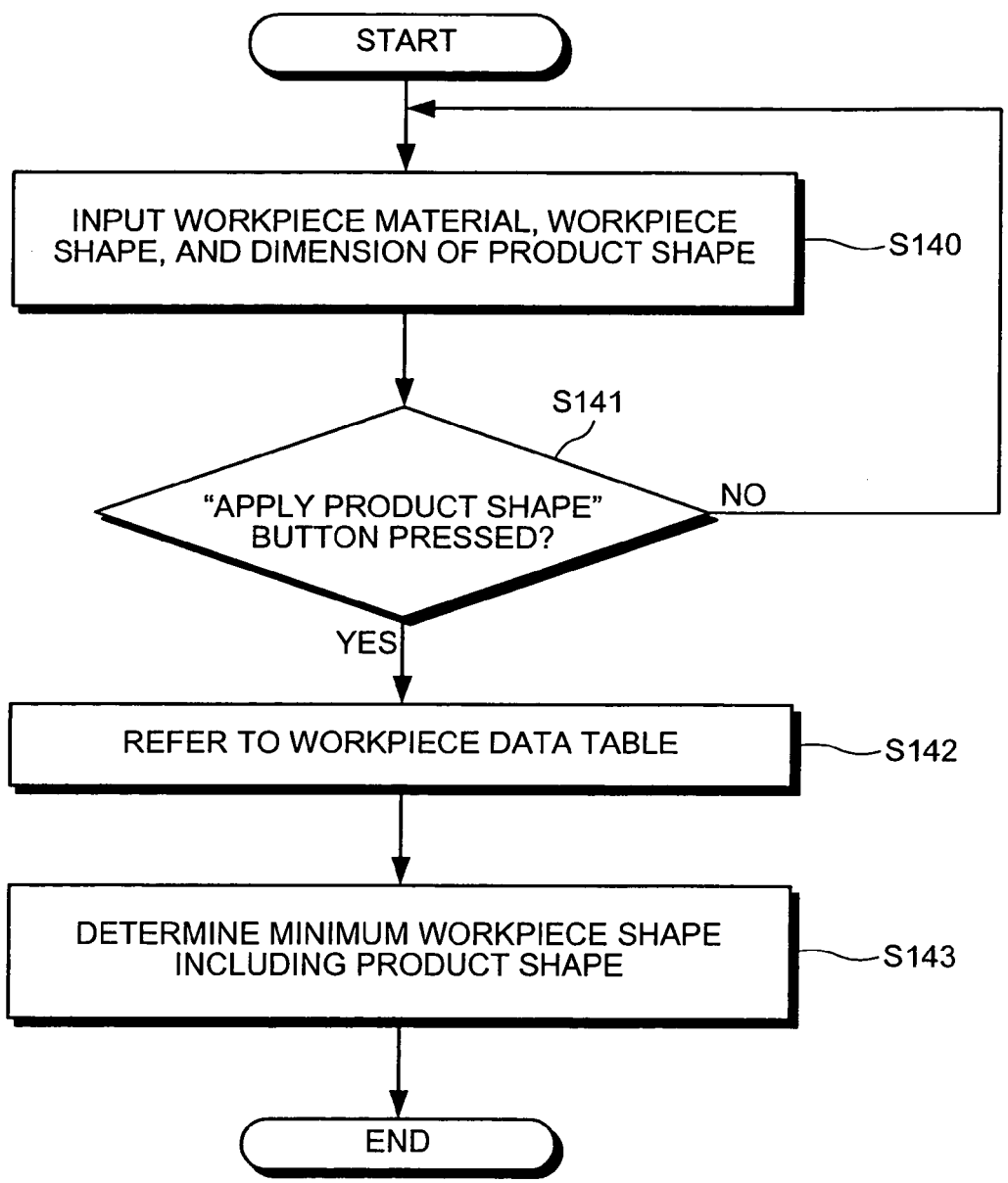
FIG. 15 is a flowchart of another automatic selection processing procedure of the workpiece model.

The automatic selection processing of a workpiece model based on pressing of the APPLY PRODUCT SHAPE button 50 will be explained with reference to FIG. 15. First, data is input to the workpiece-material input column 44 and the workpiece-shape input column 45, to select the workpiece material and the workpiece-shape. Furthermore, dimension data of the product shape is input (step S140). In the case of the automatic programming apparatus, since the selection processing of the product shape is finished at this point in time, the dimensions of the input product shape are displayed in the product-size display column 43.

In this state, when the APPLY PRODUCT SHAPE button 50 is pressed (step S141), the workpiece-shape-input processing unit 11 searches the workpiece-shape database 2, using the material and workpiece-shape selected in the workpiece-material input column 44 and the workpiece-shape input column 45 as a keyword, to extract the workpiece data matching the selected material and workpiece-shape, of many workpiece data in the workpiece-shape database 2 (step S142). The workpiece-shape-input processing unit 11 selects a workpiece involving the product shape, that is, having a larger size than that of the product, from one or more extracted works extracted by comparing the dimension data of the extracted one or more works and the dimension data of the product, and further selects a workpiece having the minimum size from one or more works capable of involving the product shape (step S143). As a method of selecting the workpiece having the minimum size, the method explained with reference to FIGS. 10 and 12 is used.

When the workpiece selection processing is finished, the workpiece-shape-input processing unit 11 updates the respective data in the outer-diameter input column 46, the inner-diameter input column 47, the length input column 48, and the end-face machining-allowance input column 49 with the values of the finally selected workpiece data. Thus, the optimum smallest workpiece capable of machining the product shape is automatically selected. A workpiece model is created based on the selected workpiece data.

Since the smallest workpiece data involving the product shape is automatically selected from the workpiece database, the time and labor of the operator to manually select the workpiece data can be saved, thereby enabling efficient programming operations.

A partial-workpiece setting mode executed by pressing the SET PARTIAL WORKPIECE button 9c on the workpiece-shape setting screen 9 shown in FIG. 7 will be explained with reference to FIGS. 19 to 25. In this partial-workpiece setting mode, a product model is displayed at the time of selecting the work, to allow the operator to select and specify the portion to be thickened and the thickness of this portion from the displayed product model, so that a model in which only the selected and specified portion is thickened to have the specified thickness is created, and the created model is registered as the workpiece model.

In other words, in casting and molding material machining, products are often manufactured by creating a workpiece having a shape close to the desired product, and adding machining such as lathe-turning to the created work. The product manufacturer side asks a workpiece manufacturer to supply such a workpiece having a shape close to the desired product. On the other hand, in the automatic programming apparatus, a machining path and an NC creation program cannot be prepared, unless the product model and the workpiece model are defined. Therefore, it is necessary to define the workpiece model when performing casting and molding material machining. In the partial work-setting mode (thickening mode), a workpiece model for the casting and molding material machining can be easily created.

Figure 19:
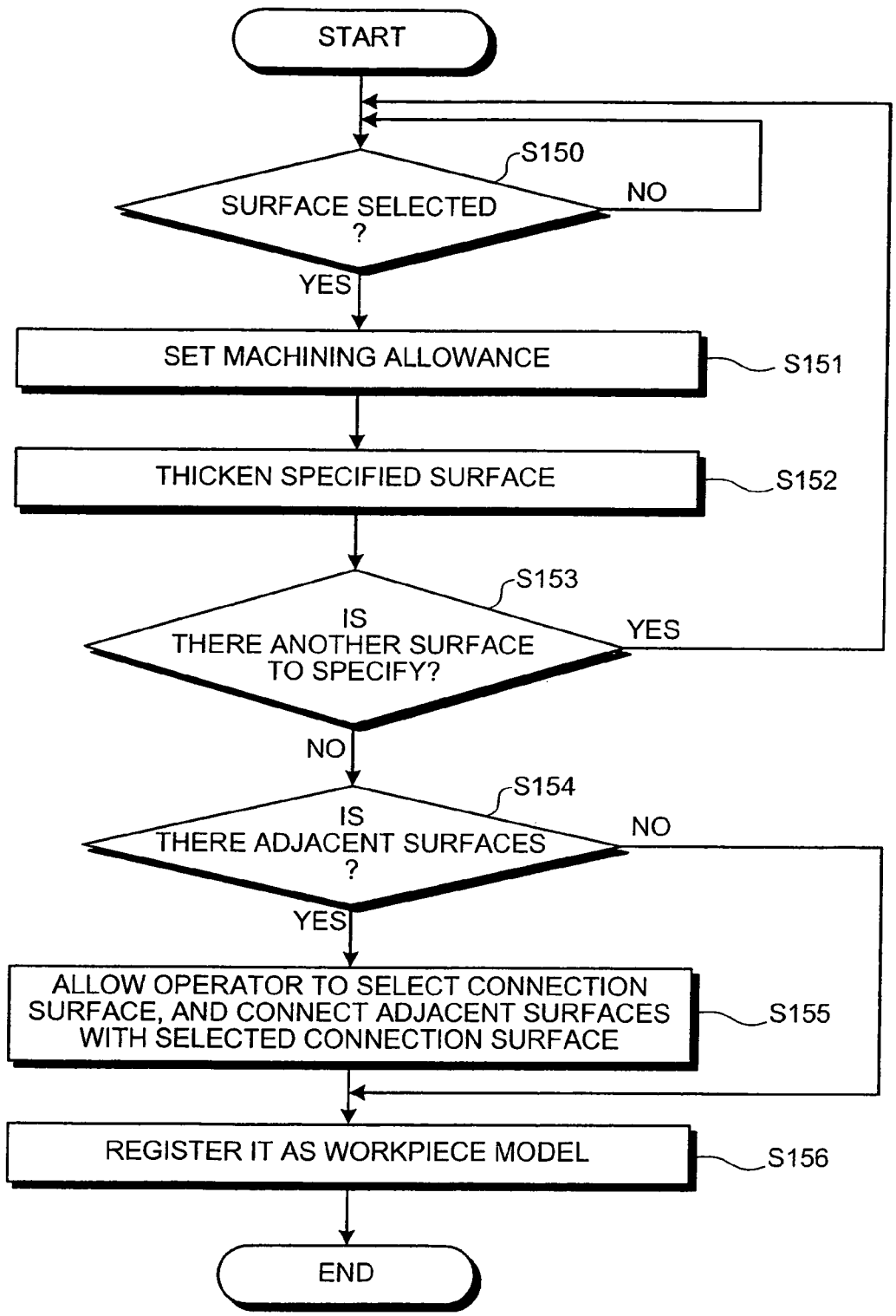
FIG. 19 is a flowchart of an operation procedure in a partial-workpiece setting mode.

The operation procedure in the partial work-setting mode will be explained with reference to the flowchart shown in FIG. 19.

Figure 20:
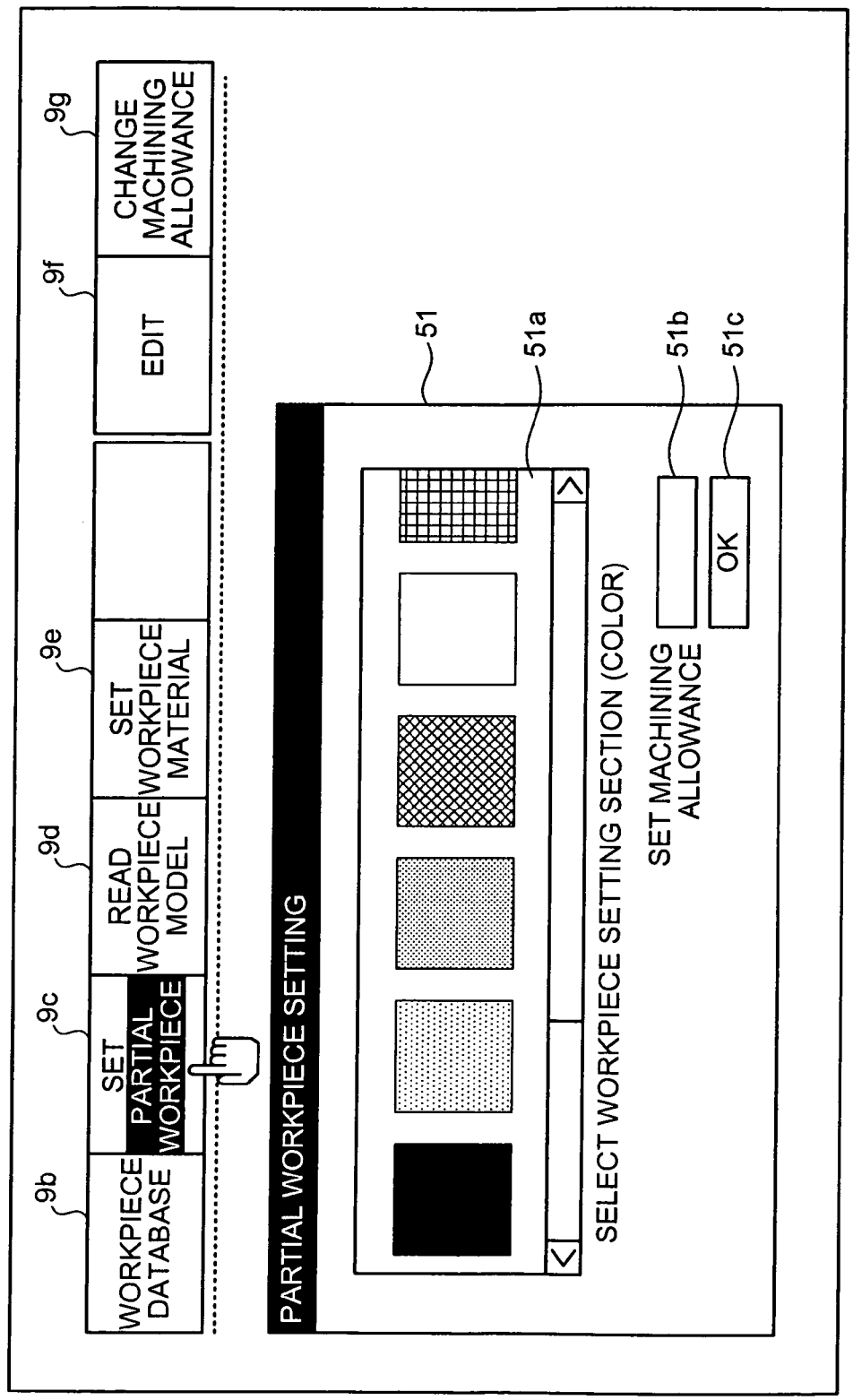
FIG. 20 is a schematic for illustrating an example of a partial-workpiece setting screen.
Figure 21:
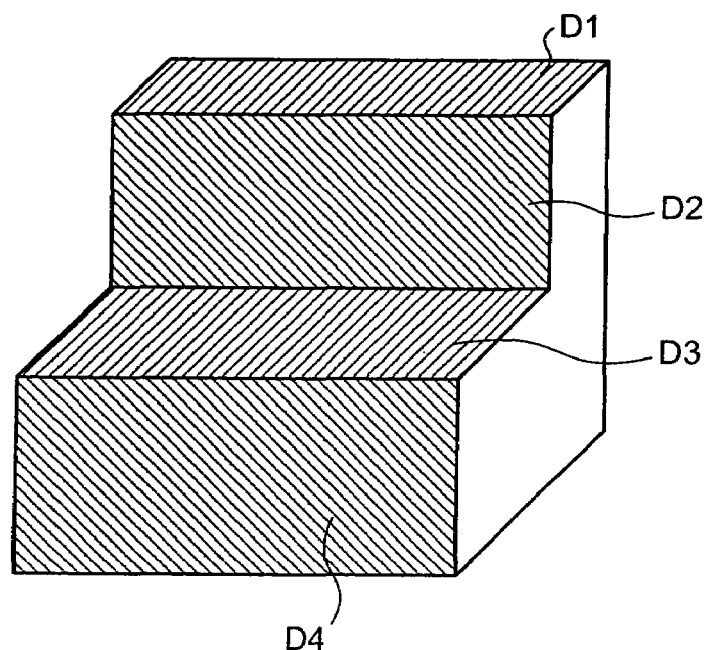
FIG. 21 is a schematic for illustrating a partial-workpiece setting processing.

When the SET PARTIAL WORKPIECE button 9c on the workpiece-shape setting-screen 9 shown in FIG. 7 is pressed, a partial-workpiece setting dialog 51 as shown in FIG. 20 and a product model 3D display screen as shown in FIG. 21 are opened. The 3D-displayed product model is a product model selected in the product shape input processing at step S100. Normally, in the CAD data of the product model, a color attribute different for each surface is added, and each surface of the 3D displayed product model is displayed with a color corresponding to the set color attribute, as shown in FIG. 21. In this case, in the product model shown in FIG. 21, green color attribute is set to the surfaces D1 and D3, and red color attribute is set to the surfaces D2 and D4.

In FIG. 20, the partial-workpiece setting dialog 51 has a color selection section 51a, a machining-allowance setting section 51b, and an OK button 51c, and in the color selection section 51a, all colors set as the attribute for the product model are extracted and displayed. For example, the number of colors that can be set as the attribute is 256×256×256. When the product model is expressed by 20 colors among these colors, the 20 colors are displayed in the color selection section 51a. In the product model shown in FIG. 21, if only the color attributes of green (D1, D3) and red (D2, D4) are set, only the two colors, green and red are displayed in the color selection section 51a.

The operator selects the color corresponding to the portion, which the operator wants to thicken, from the colors displayed in the color selection section 51a, to specify the necessary surface of the product model (step S150), and sets the thickness of the portion to be thickened in the machining-allowance setting section 51b (step S151). When the operator presses the OK button 51c, only the surface corresponding to the selected color of the product model displayed on the 3D display screen is thickened by the machining allowance set in the machining-allowance setting section 51b (step S152).

In the color selection section 51a, when there is another selected surface, the processing of from steps S150 to S152 is repeated similarly.

Figure 22:
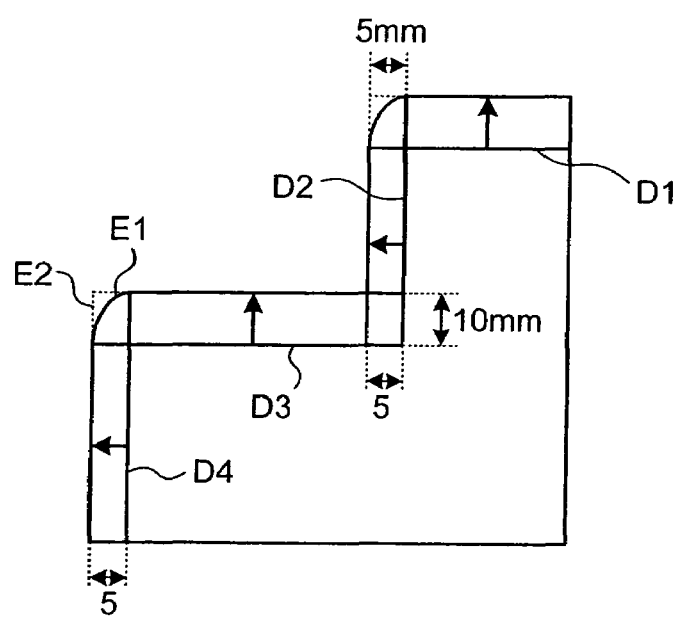
FIG. 22 is a schematic for illustrating the partial-workpiece setting processing.

FIG. 22 is the product model shown in FIG. 21 in cross section (side face). When green is selected in the color selection section 51a, 10 millimeters is set in the machining-allowance setting section 51b, and the OK button 51c is pressed, as shown in FIG. 22, the surfaces D1 and D3 having the green attribute are thickened by 10 millimeters. Furthermore, when green is selected in the color selection section 51a, 5 millimeters is set in the machining-allowance setting section 51b, and the OK button 51c is pressed, the surfaces D2 and D4 having the red attribute are thickened by 5 millimeters.

When all surface selection is finished, it is determined whether there are adjacent surfaces between the thickened surfaces (step S154). When there are no adjacent thickened surfaces, the thickened model created by (repetition of) the processing of from steps S150 to S152 is registered and set as the workpiece model (step S157).

On the other hand, when there are adjacent thickened surfaces, a dialog (not shown) for selecting either a curved surface (shown by solid line E1 in FIG. 22) such as ellipse or circle, or a rectangular surface (shown by broken line E2 in FIG. 22) as a connecting surface between the adjacent surfaces is displayed, so that the operator selects the curved surface or the rectangular surface as the connecting surface. The connecting surface can be selected for each adjacent portion, or can be commonly selected as the curved surface or the rectangular surface for all adjacent portions. The adjacent thickened portions are then connected as shown in FIG. 22, by the selected connecting surface (step S155). The thickened model is registered and set as the workpiece model (step S156).

Figure 23:
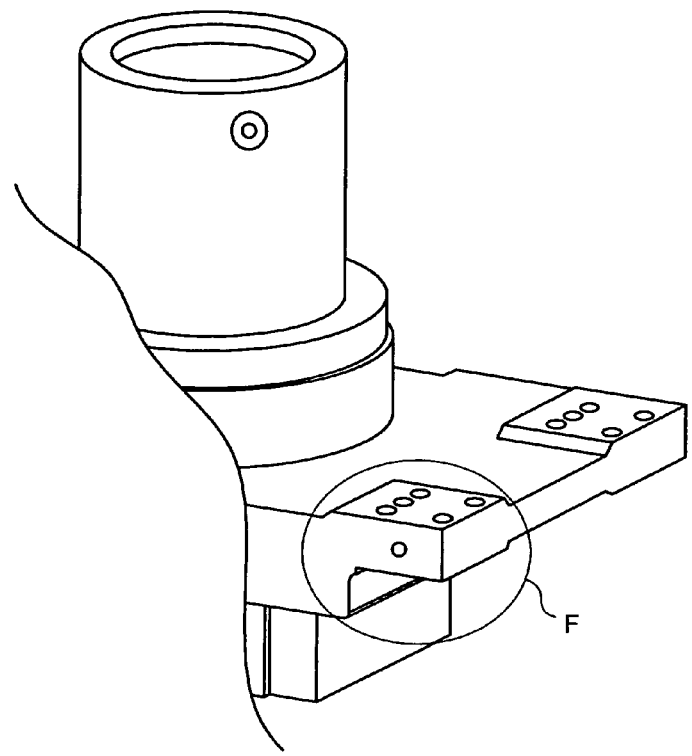
FIG. 23 is a schematic for illustrating an example of a product model before the partial-workpiece setting processing.
Figure 24:
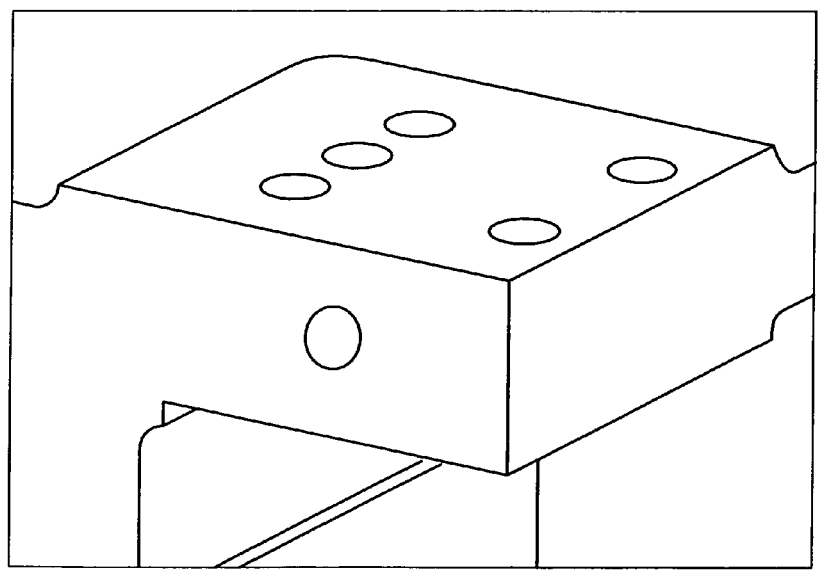
FIG. 24 is a partially enlarged view of the product model shown in FIG. 23.
Figure 25:
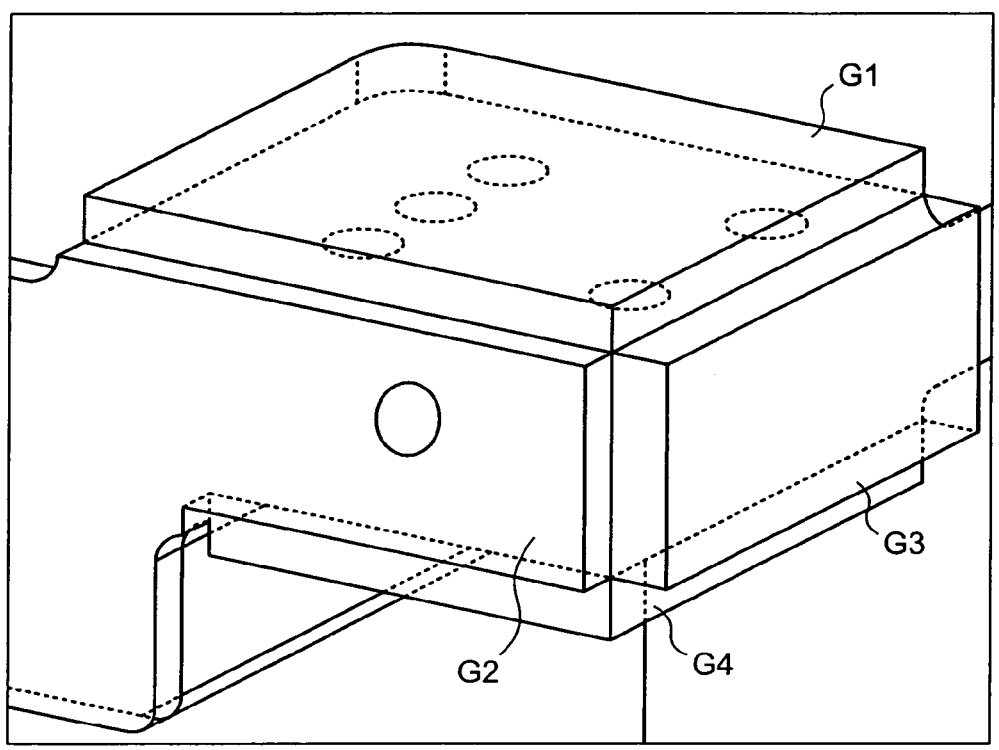
FIG. 25 is a schematic for illustrating a model after the partial-workpiece setting processing of the product model shown in FIG. 24.

FIG. 23 is one example of a part of the product model 3D-displayed at the time of partial-workpiece setting mode. An enlarged view of part F in FIG. 23 is shown in FIG. 24. A thickened model in which thickened portions G1 to G4 are added is shown in FIG. 25.

In the above example, the color attribute is adopted as the display attribute for specifying the respective surfaces of the product model, so as to select the surface to be thickened by the color attribute set for the product model. However, various types of filling patterns such as hatching can be set as the display attribute for the respective surfaces of the product model, and a desired surface to be thickened can be selected by selecting these filling patterns. Furthermore, the surface to be thickened can be selected by an operation of an input unit such as a mouse, and a machining allowance can be set with respect to the selected surfaces.

In the partial-workpiece setting processing, a desired thickened model is created by specifying the surface to be thickened, of the respective surfaces of the product model, and the thickness of the specified surface to be thickened, so that the created thickened model can be registered as the workpiece model. As a result, a workpiece model to be used in casting or the like can be easily created.

(3) First Process Jig Setting Processing (Setting of First Chuck and Claw, Step S102)

Figure 26:
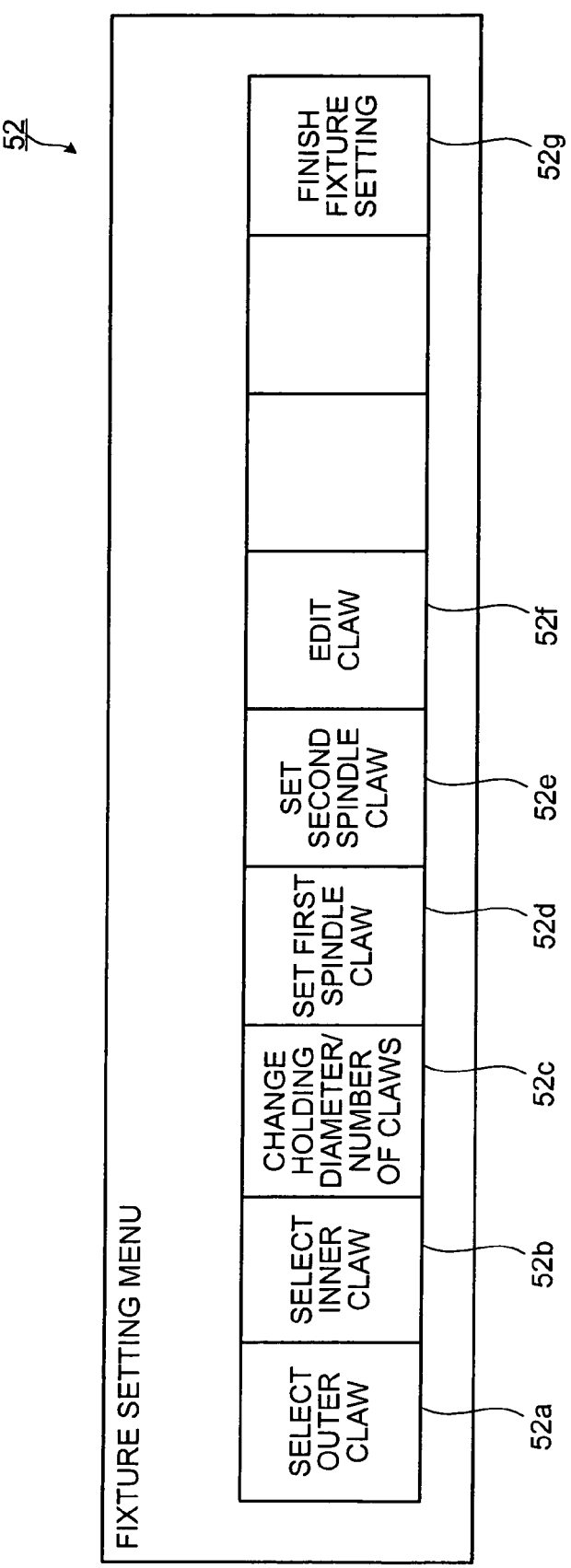
FIG. 26 is a schematic for illustrating an example of a fixture setting menu.

The jig setting processing (fixture setting processing) is started by turning on the SET FIXTURE button 6c on the menu selection main screen 8 shown in FIG. 4. When the SET FIXTURE button 6c is turned on, fixture setting is started, and for example, the menu is changed over to a fixture setting menu 52 as shown in FIG. 26, and a claw-pattern selection table 53 shown in FIG. 28 and a fixture setting window 54 shown in FIG. 29 are displayed. The fixture setting processing is mainly executed by the jig-setting processing unit 12 in FIG. 1. The first process jig setting processing is for setting the jig at the first process carried out by the main spindle of the two-spindle machine tool.

Figure 27:
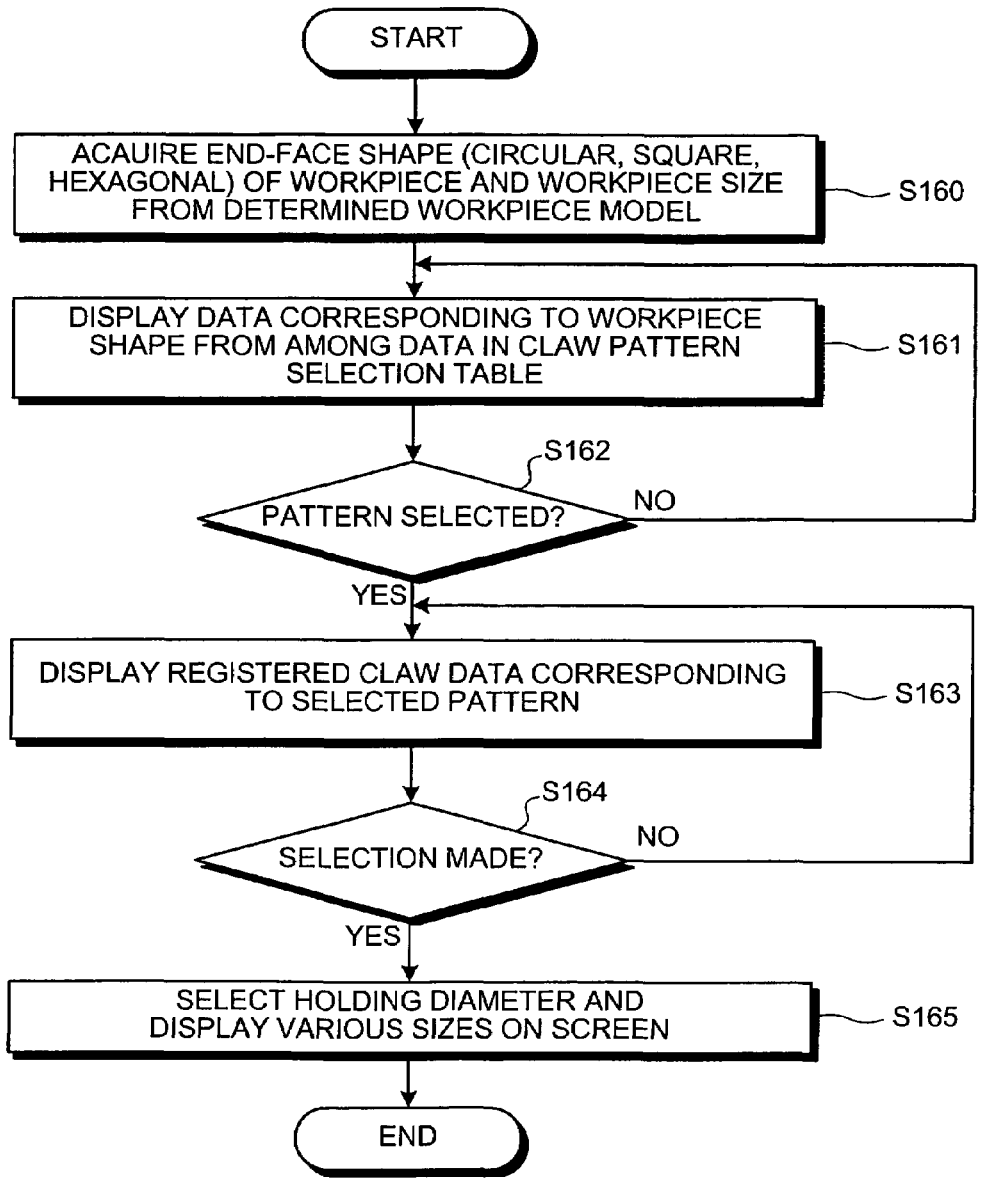
FIG. 27 is a flowchart of an operation procedure of a fixture (jig) setting processing.

A jig model is formed of chuck models and claw models for holding the work. For the chuck shape data, in the case of the configuration of FIG. 1, NC parameters (outer and inner diameters and width of the chuck) are obtained from the NC unit 200 via the communication interface 23 or offline, and in the case of the configuration of FIG. 2, NC parameters (outer and inner diameters and width of the chuck) are obtained from the NC controller 201, and the outer and inner diameters and the width of the chuck are displayed by the obtained NC parameters, so that the operator selects a desired chuck shape. For the claw, the number, the shape, the size, and the holding diameter of the claw are determined according to the procedure shown in FIG. 27. The procedure shown in FIG. 27 is executed by the jig-setting processing unit 12.

In the fixture setting menu 52 shown in FIG. 26, an SELECT OUTER CLAW button 52a is a button for selecting an outer claw, an SELECT INNER CLAW button 52b is a button for selecting an inner claw, and these have exclusive relation, such that when one of these is selected, the other is in a non-selection state. A CHANGE HOLDING DIAMETER/ NUMBER OF CLAWS button 52c is a button for changing the holding diameter and the number of claws. A SET FIRST SPINDLE CLAW button 52d is a button for setting the claw of the first spindle (main spindle), and a SET SECOND SPINDLE CLAW button 52e is a button for setting the claw of the second spindle (sub-spindle). When the fixture setting menu 52 is initially displayed, the SELECT OUTER CLAW button 52a and the SET FIRST SPINDLE CLAW button 52d are automatically selected and turned on. An EDIT CLAW button 52f is a button used at the time of editing the claw data. A FINISH FIXTURE SETTING button 52g is a button for finishing the fixture setting processing.

In this case, since it is jig setting for the first process, the SET FIRST SPINDLE CLAW button 52d is turned on, and either one of the SELECT OUTER CLAW button 52a and the SELECT INNER CLAW button 52b is turned on.

When these buttons are turned on, the jig-setting processing unit 12 obtains the type (circular, square, hexagonal, and the like) of the end face of the workpiece and the dimension data of the workpiece model, from the workpiece model determined in the workpiece-shape setting processing at step S101 (step S160).

Figure 28:
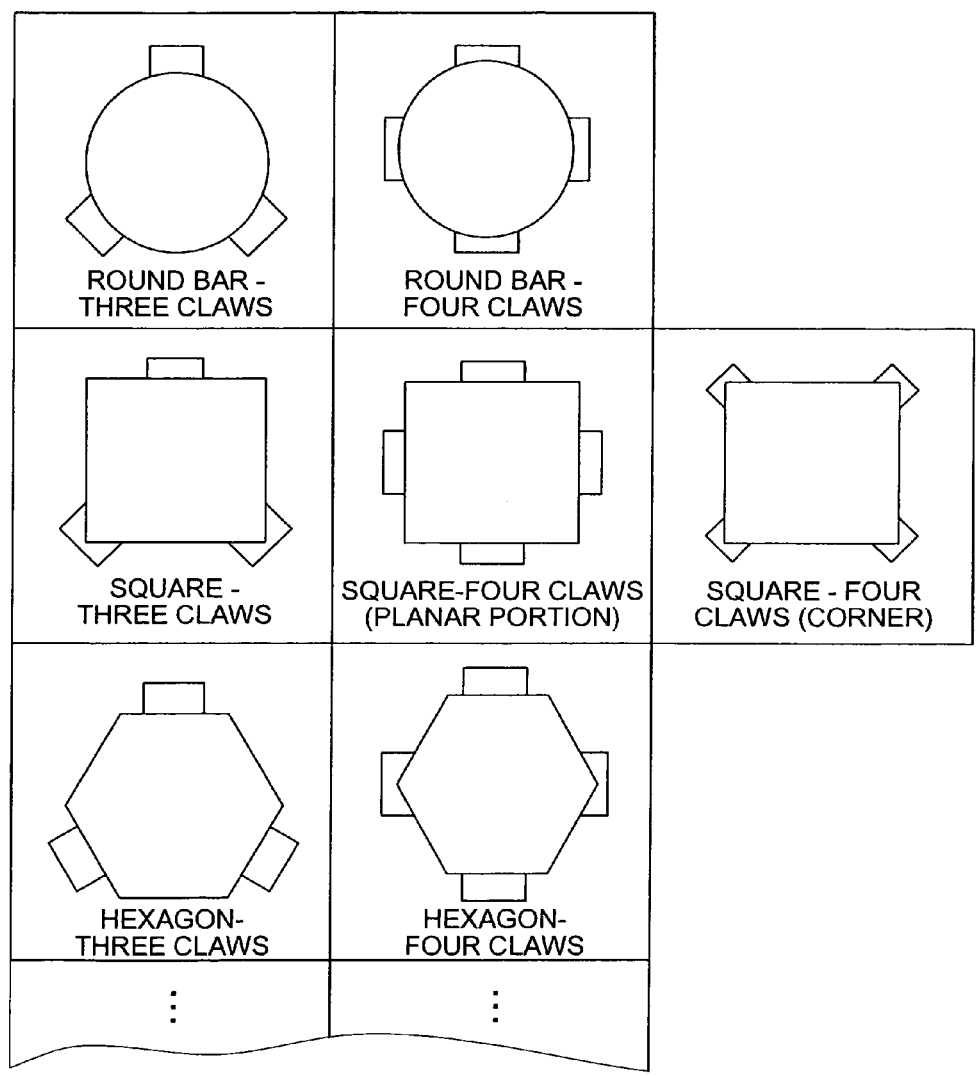
FIG. 28 is a schematic for illustrating an example of types of the workpiece end-face shape and a claw pattern selection table.
Figure 29:
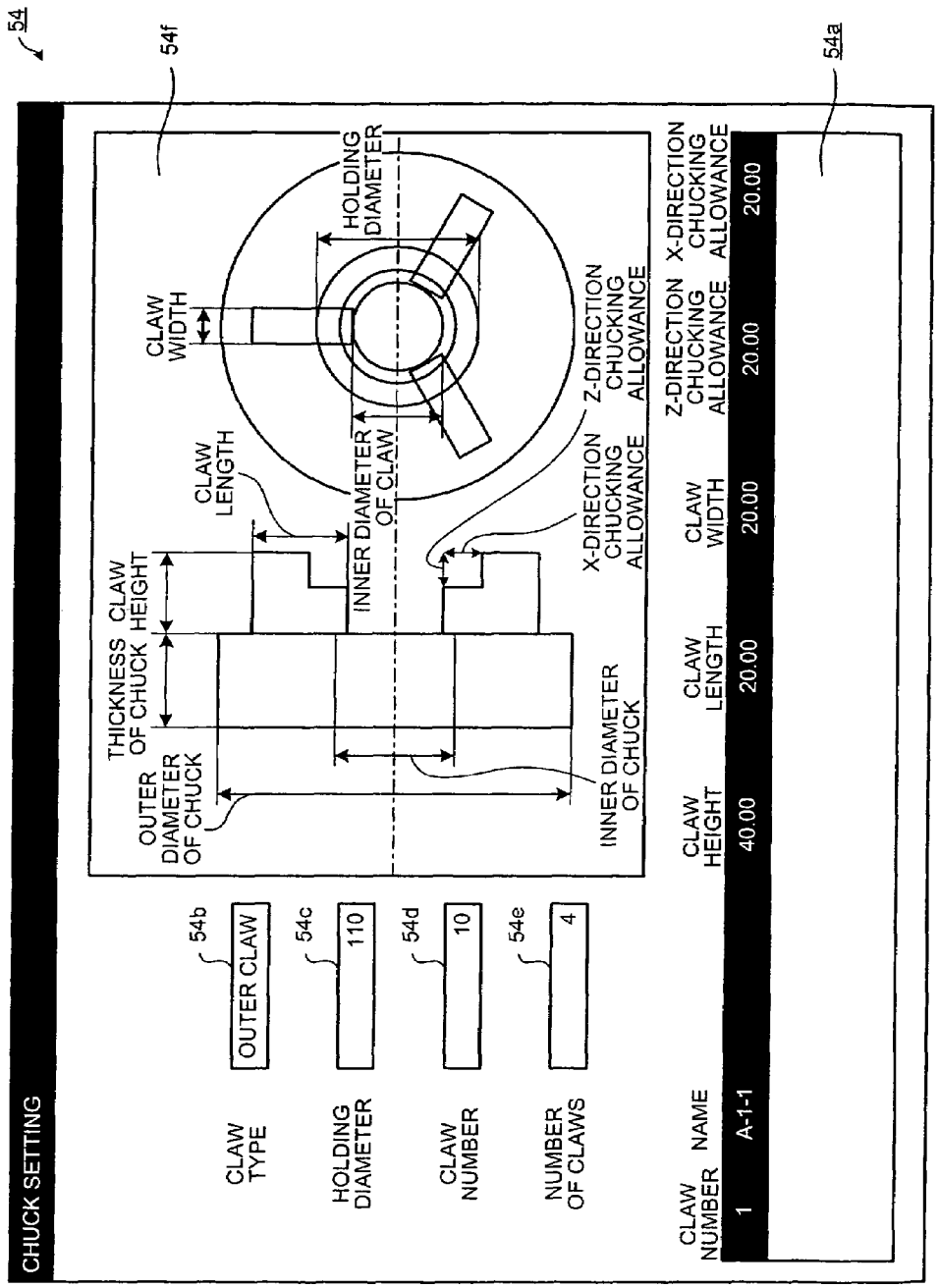
FIG. 29 is a schematic for illustrating an example of a fixture setting window.

For the claw pattern displayed in the claw-pattern selection table 53 shown in FIG. 28 (claw model pattern), at first, the claw pattern is largely divided into an outer claw pattern and an inner claw pattern, and then classified by type (circular, square, hexagonal, and the like) of the end face of the work, claw arrangement pattern (the number of claws, the holding portions by the claw (holding a corner, holding a flat surface, and the like). In FIG. 28, only the outer claw patterns are shown.

Not all claw patterns are displayed in the claw-pattern selection table 53, and only claw patterns corresponding to the type of the workpiece end face of the workpiece model, of claw patterns corresponding to the selected one of the SELECT OUTER CLAW button 52a and the SELECT INNER CLAW button 52b, are displayed. For example, when a workpiece model in a shape of quadratic prism is set, only three claw patterns in the middle row of the claw patterns shown in FIG. 28 are shown (step S161). The operator selects and specifies a desired claw pattern from the claw patterns displayed here (step S162). As a result, the number of claws and the holding portion by the claw (holding a corner or holding a flat surface) are specified.

When the claw pattern is selected, registered data of one or more claw models corresponding to the selected claw pattern is extracted from the whole registered data, and the extracted registered data is displayed in a list display section 54a in the fixture setting window 54 shown in FIG. 29 (step S163). For example, when a claw pattern of a type of square, four claws, and holding a flat surface is selected, only the registered data of the claw model corresponding to the selected pattern is displayed in the list display section 54a.

The list display section 54a includes a claw-number display section (claw number) in which a claw number of a registered claw model is displayed, a claw name display section in which the name of a registered claw shape (claw model) is displayed, a claw height display section in which the height of the registered claw shape is displayed, a claw length display section in which the length of the registered claw shape is displayed, a claw width display section in which the width of the registered claw shape is displayed, a Z-direction chucking allowance display section in which the chucking allowance in the Z direction of the registered claw shape is displayed, and an X-direction chucking allowance display section in which the chucking allowance in the X direction of the registered claw shape is displayed. That is, in the list display section 54a, the shape data of the selected claw model is displayed for each claw number.

The fixture setting window 54 further includes a claw type display section 54b in which whether the claw is an outer claw or an inner claw is identified and displayed, a holding-diameter display section 54c in which the holding diameter is displayed, a selected claw-number display section 54d in which the selected claw number is displayed, a claw-number display section 54e in which the number of claws of the selected claw pattern is displayed, and a fixture display section 54f in which the selected chuck model, the selected claw model, and the selected workpiece model are displayed in cross section or three-dimensionally displayed.

Figure 30:
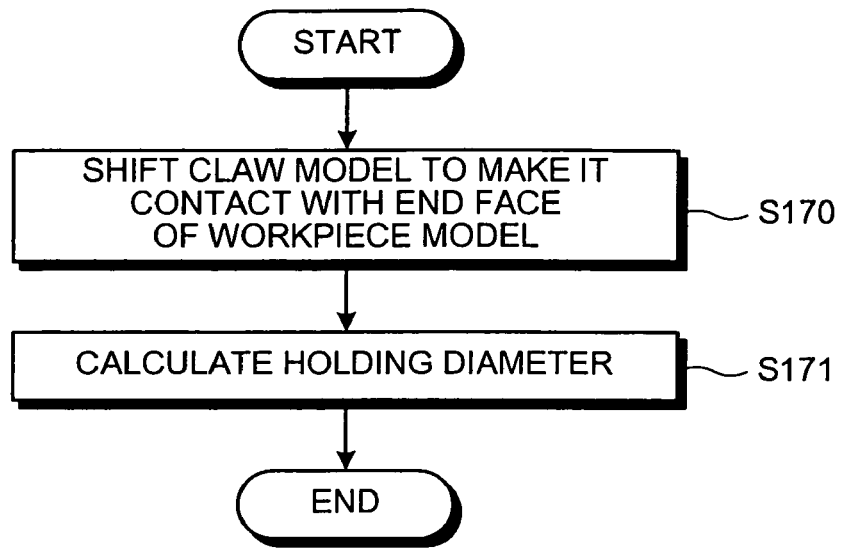
FIG. 30 is a flowchart of a procedure of a holding diameter calculation.

When the operator selects desired data from the registered data (claw model) of the claw displayed in the list display section 54a (step S164), the jig-setting processing unit 12 displays the selected claw number in the selected claw-number display section 54d, displays the number of claws in the claw-number display section 54e, and calculates a holding position coordinates and a holding diameter of the claw according to the procedure shown in FIG. 30.

Figure 31:
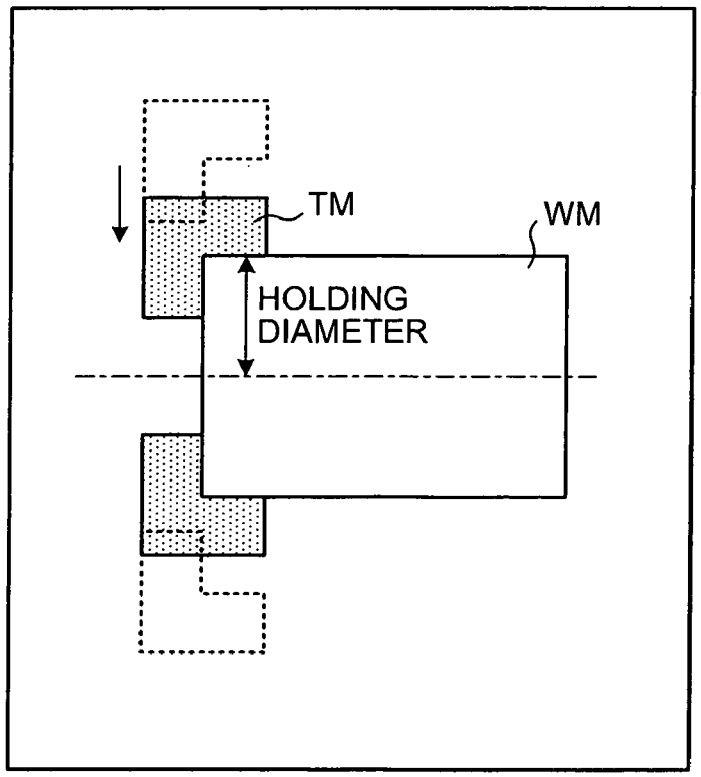
FIG. 31 is a schematic for illustrating a concept of a holding diameter calculation.

That is, as shown in FIG. 31, the jig-setting processing unit 12 shifts a claw model TM so that the selected claw model TM abuts against the end face of the workpiece model WM determined in the workpiece-shape setting processing (step S170), and calculates the holding position coordinates, that is, the holding diameter for the claw model TM to hold the workpiece model WM, based on the shape data of the claw model, the holding position pattern of the claw model (whether holding a corner or holding a flat surface), and the shape data of the workpiece model (outer diameter, inner diameter, length, length of end face) (step S171). At the time of shift, in the case of the outer claw, the claw model TM is shifted so as to abut against the outer diameter of the end face of the workpiece model WM, and in the case of the inner claw, the claw model TM is shifted so as to abut against the inner diameter of the end face of the workpiece model WM.

In this manner, when it is determined at which position at the end of the workpiece model the claw model is held, that is, when calculation of the holding position (holding diameter) of the claw is finished, the jig-setting processing unit 12 displays the calculated holding diameter value in the holding-diameter display section 54c, and displays the chuck model, the claw model, and the workpiece model in the fixture display section 54f, in a state with the claw model holding the workpiece model (step S165).

Thus, the workpiece model is arranged in the first jig model (in this case, a first chuck and claw). When the shape data, the number of claws, and the holding diameter of the selected claw model are to be changed, the operator presses the EDIT CLAW button 52f, or the CHANGE HOLDING DIAMETER/NUMBER OF CLAWS button 52c to open the edit dialog, and executes the edit processing by the edit dialog.

In this manner, since some jig arrangement patterns are prepared corresponding to the workpiece-shapes, and the operator selects a jig arrangement pattern to determine the jig arrangement, the jig arrangement becomes easy. Furthermore, since the holding position and the holding diameter of the claw are calculated on the workpiece model, if the calculation result is transmitted to the NC side, interference check between the tool and the jig (claw) on the NC side can be performed efficiently.

(4) Registration (Step S103)

The registration processing is started by turning on the ADJUST POSITION button 6d on the menu selection main screen 8 shown in FIG. 4. This registration processing is mainly executed by the registration processing unit 13 in FIG. 1. In this registration processing, the product model is automatically arranged (superposed) in the workpiece model held by the first chuck model, and a different portion between the superposed workpiece model and the product model is set as a machining area, and the machining area is expanded to various types of machining units in the subsequent process expansion processing.

First, as shown in (a) of FIG. 33, the product model SM and the workpiece model WM created in the previous processing are displayed on a registration screen 55. The workpiece model WM is displayed in a state arranged at a position set at step S102 with respect to a first jig (in this case, the first chuck and claw) model ZG.

At this time, the workpiece model WM held by the first jig model ZG is arranged at a predetermined position on the registration screen 55, but the product model SM is arranged at a position corresponding to the coordinate of the CAD data with respect to the origin of the CAD data. Therefore, when the product model SM and the workpiece model WM are initially displayed, the positions of the product model SM and the workpiece model WM normally do not match each other.

Figure 32:
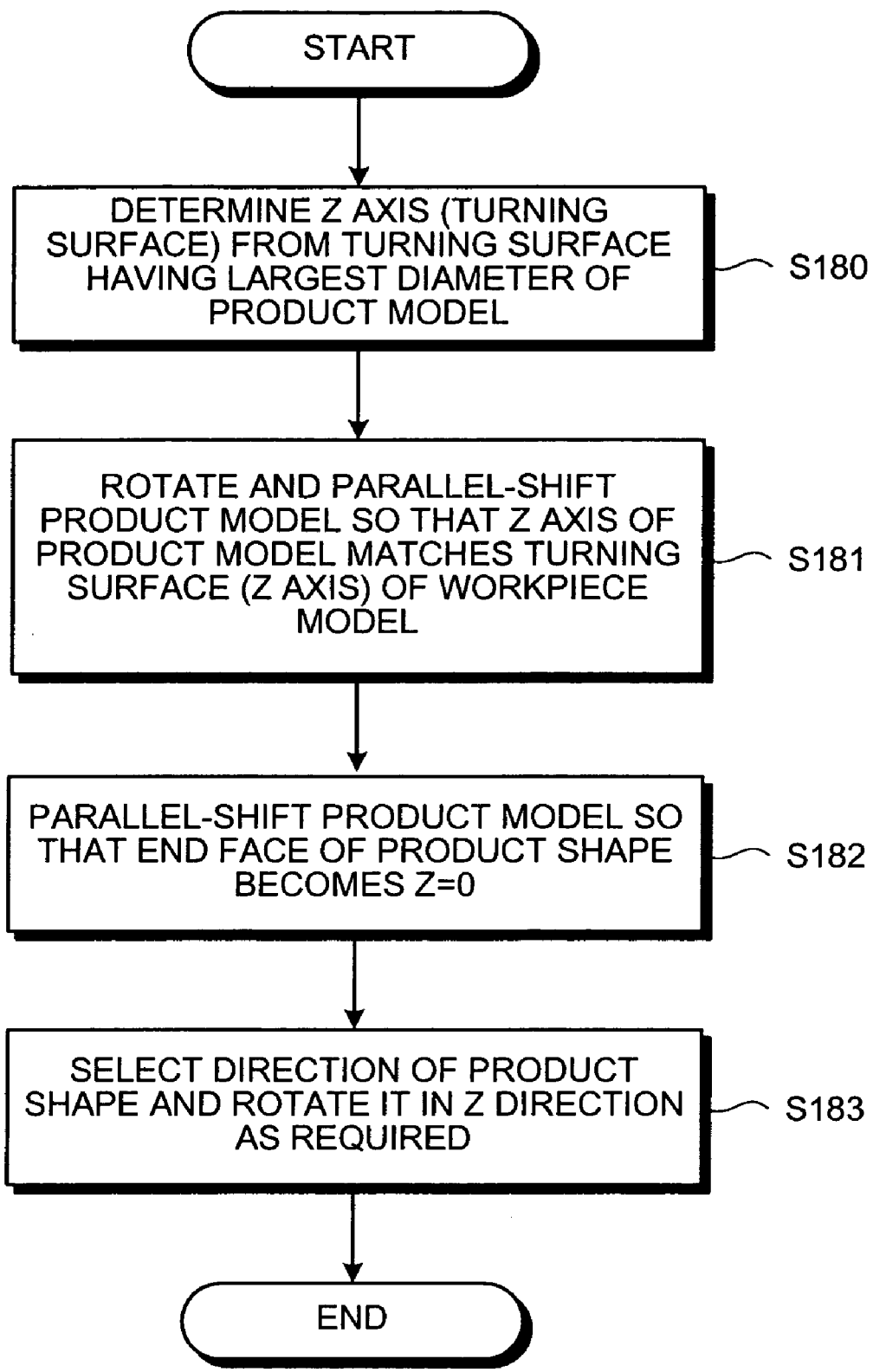
FIG. 32 is a flowchart of an automatic registration processing of the product model and the workpiece model.

In this state, when the operator presses the automatic adjustment button (not shown) arranged in the lower part of the registration screen 55, the registration processing unit 13 executes the registration processing as shown in FIG. 32.

At first, the registration processing unit 13 detects a lathe-turning surface having the largest diameter among one or more surfaces to be machined present in the product model SM, and determines a central axis of rotation of the detected lathe-turning surface having the largest diameter as a Z' axis (turning axis) (step S180).

Figure 34E:
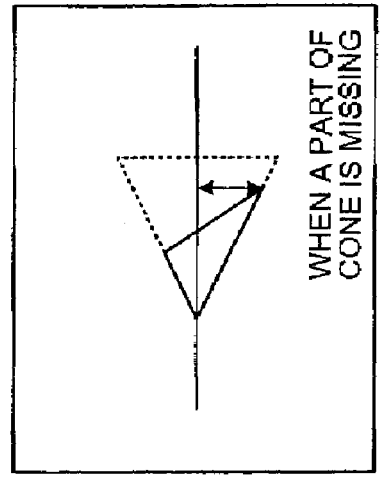
FIGS. 34A to 34E are schematics for illustrating a lathe-turning surface and a lathe-turning surface diameter.
Figure 34B:
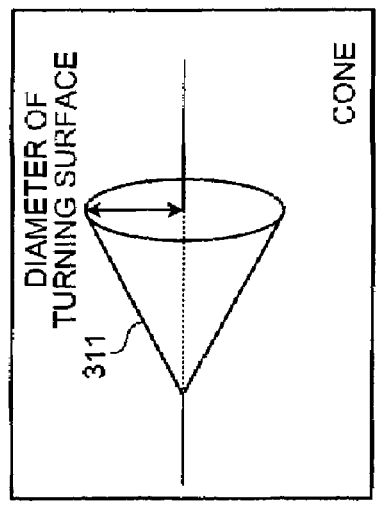
Figure 34D:
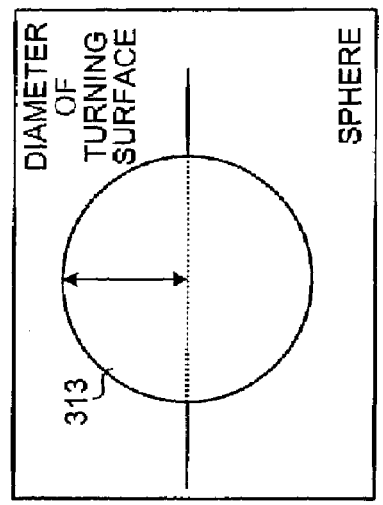
Figure 34A:
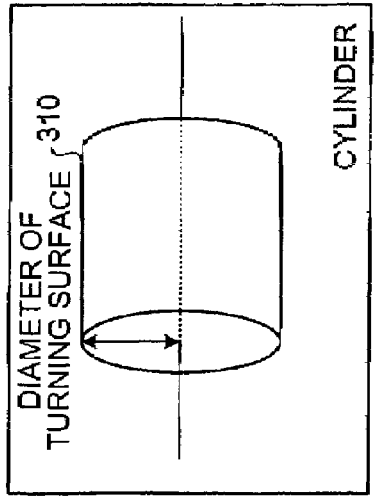
Figure 34C:
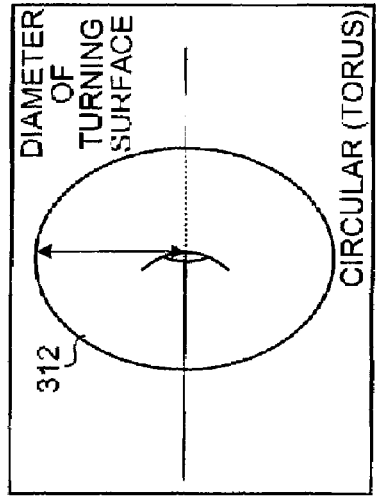

The lathe-turning surface is a surface, as shown in FIGS. 34A to 34D, having any one of a surface of a column 310, a surface of a cone 311, a surface of a circular tube (torus) 312, and a surface of a sphere 313, centering on an axis. As shown in FIG. 34E, when a part of the lathe-turning surface is missing, a distance from the central axis of rotation to the farthest point is designated as a diameter of the lathe-turning surface.

The product model SM is then rotated and parallel-shifted so that the Z' axis determined from the product model SM matches the Z axis (turning axis) of the workpiece model WM held by the first jig model ZG (step S181). Furthermore, the product model SM is parallel-shifted so that the end face of the product model SM in the Z' axis direction matches the program origin O (Z=0) of the automatic programming apparatus (step S182).

The program origin O is preset at a position at the center of the workpiece model WM in the X-axis direction and at a predetermined distance from the end face of the workpiece model WM in the Z-axis direction, away from the first jig model, so that the product model SM is included in the workpiece model WM, when the end face of the product model SM in the Z' direction is arranged so as to match the program origin O (Z=0). As a result, as shown in (b) of FIG. 33, the product model SM is arranged at a machinable position in the workpiece model WM. The position of the program origin O can be changed.

Figure 35:
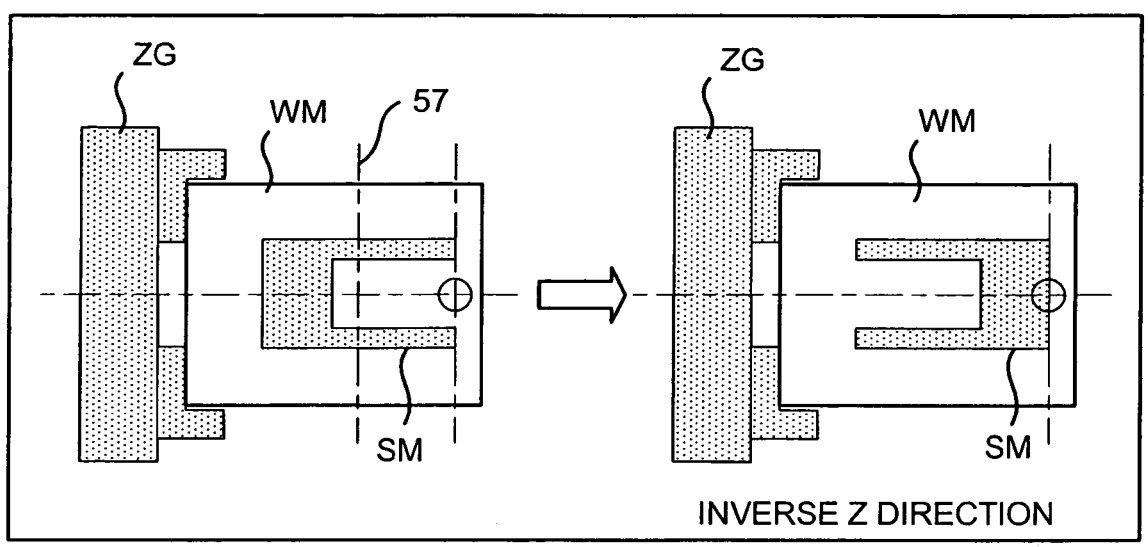
FIG. 35 is a schematic for illustrating a Z reversal processing.

However, at the time of rotation and parallel shift of the product model SM at step S181, it is not clear which one of the two end faces of the product model SM in the Z direction is arranged on the side close to the program origin O (on the right side in (b) of FIG. 33). Therefore, when the operator checks the direction in the Z direction of the product model obtained by automatic arrangement and judges that it is better to rotate the product model SM in the Z direction by 180 degrees because the chipped allowance is less or the like, the operator presses a Z-reversal button (not shown) arranged on the registration screen 55. The central axis for rotation by 180 degrees is an axis 57 (see FIG. 35) extending in parallel with the X axis from the central position of the product model SM in the Z-axis direction. Therefore, as shown in FIG. 35, the product model SM is rotated about the axis 57 by 180 degrees, and the direction thereof in the Z direction is reversed (step S183). Even if the product model SM is rotated, the central position of the product model does not change.

This registration function includes a manual adjustment function for adjusting the arrangement of the product model SM by the operator. In this manual adjustment function, the direction of the product model SM can be selected, and the product model SM can be rotated or shifted in the X-, Y-, and Z-axis directions. The manual adjustment function is used when the operator judges that the chipped amount can be reduced by manual adjustment.

While the registration screen 55 is displayed, when the operator presses a shape shift key 56 (not shown) arranged on the lower part of the registration screen 55, a shape shift menu as shown in FIG. 36 is displayed.

The shape shift menu includes parallel shift button in the X-, Y-, and Z-axis directions, a rotation button in the X-, Y-, and Z-axis directions, and a shape shift finish button. When any button is pressed, a shape shift dialog for performing the shift or rotation of the shape as shown in FIG. 37 is displayed, and the pressed button is reverse-displayed.

Figure 37:
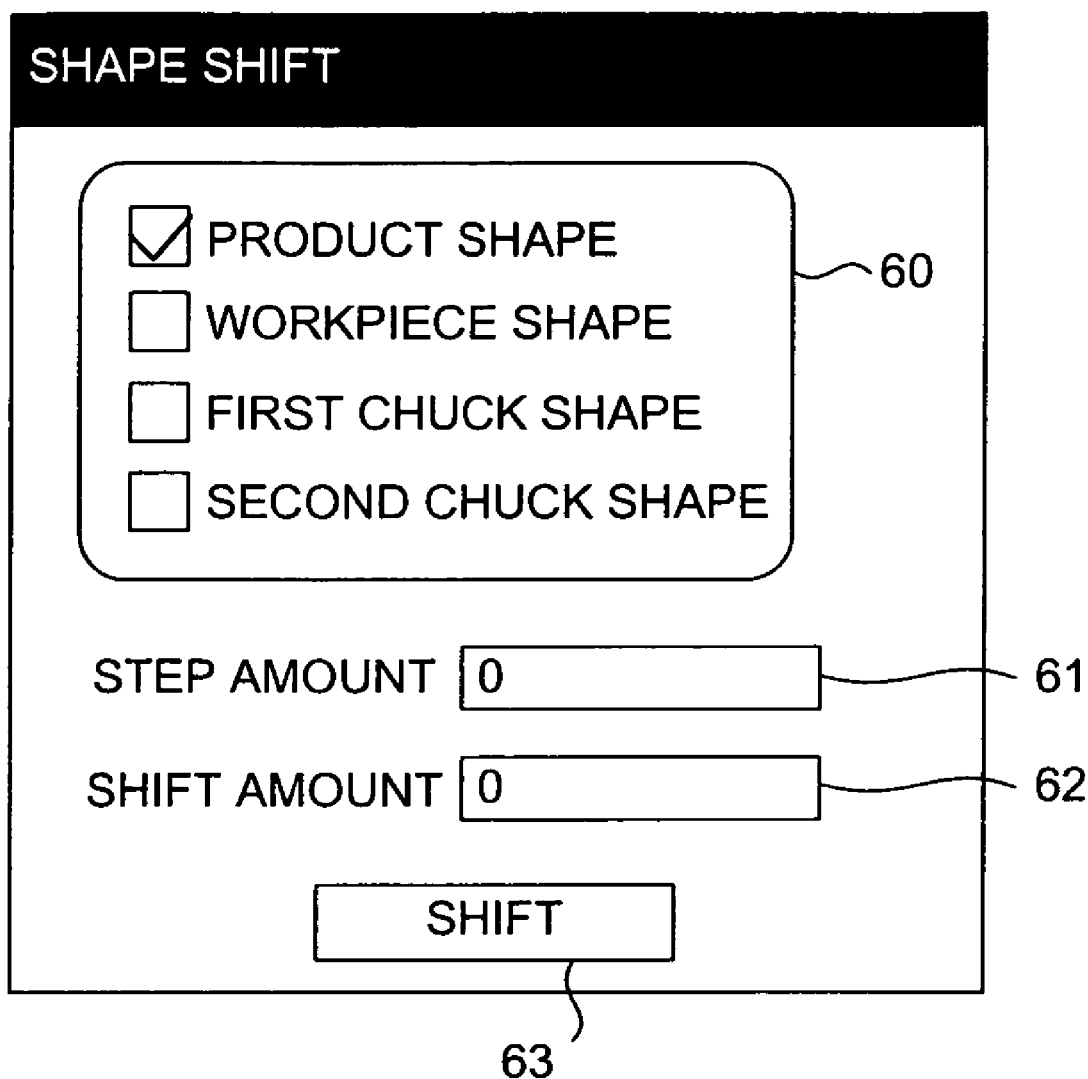
FIG. 37 is a schematic for illustrating a shape shift dialog.

As shown in FIG. 37, the shape shift dialog includes a shape selection check-box 60 for selecting an object of shape shift from product shape (product model), workpiece-shape (workpiece model), first chuck shape (first chuck model), and second chuck shape (second chuck model), a step-amount input section 61, a shift-amount input section 62, and a SHIFT button 63.

In the shape selection check-box 60, the shape (model) with a check is parallel-shifted or rotated. When the operator inputs a shift amount of the model in the shift-amount input section 62, and presses the SHIFT button 63 or the input key, the parallel shift or rotation of the model is executed. When the shift amount is specified in the shift-amount input section 62 to shift the model, the model is shifted by the specified amount once.

When the operator inputs a step amount (unit shift amount) of the model in the step-amount input section 61, and presses the SHIFT button 63 or the input key, the parallel shift or rotation of the model is executed. When the operator inputs the step amount in the step-amount input section 61, and presses the cursor shift key "↑" or "↓", while the focus is on the step-amount input section 61, the shape shift is executed. In the shape shift by inputting the step amount, a preview of the shape to be shifted is displayed, and the displayed preview is shifted. When the operator presses the cursor shift key "↑", the shape is parallel-shifted in the "+" direction or rotated, and when the operator presses the cursor shift key "↓", the shape is parallel-shifted in the "−" direction or rotated. When the operator presses the SHIFT button 63 or the input key, the shift of the preview by inputting the step amount is reflected on the shape, to complete the shape shift. Thus, when the model is step-shifted by specifying the step amount in the step-amount input section 61, the model is shifted by the specified step amount, every time the cursor shift key "↑" or "↓" is pressed.

In the above explanation, adjustment of the Z axis between the product model and the workpiece model and positioning of the end face of the product model in the Z-axis direction at the program origin are performed by one shape shift button, but the adjustment of the Z axis between the product model and the workpiece model can be performed by one button, and positioning of the end face of the product model in the Z-axis direction at the program origin can be performed by another button.

Since the product model is automatically arranged so as to be overlapped in the workpiece model held by the jig model, the time and labor of the operator to manually calculate the position of the product model with respect to the workpiece model can be saved, thereby enabling efficient programming operations.

(5) Process Dividing (Step S104)

The process dividing processing is started by turning on the DIVIDE PROCESS button 6e on the menu selection main screen 8 shown in FIG. 4. The process dividing processing is executed by the process-division processing unit 14 in FIG. 1. The process dividing processing in this case is for dealing with machining by a two-spindle machine tool having the main spindle and the sub-spindle, and respectively specifying the dividing position between the first process in which a machining area as a difference between the product model and the workpiece model is machined by the main spindle, and the second process in which the machining area is machined by the sub-spindle, by the outer diameter and the inner diameter. In the two-spindle machine tool, the workpiece is held and machined by the main spindle in the first process, and after the workpiece is held by the sub-spindle, the workpiece is machined by the sub-spindle in the second process.

Figure 38:
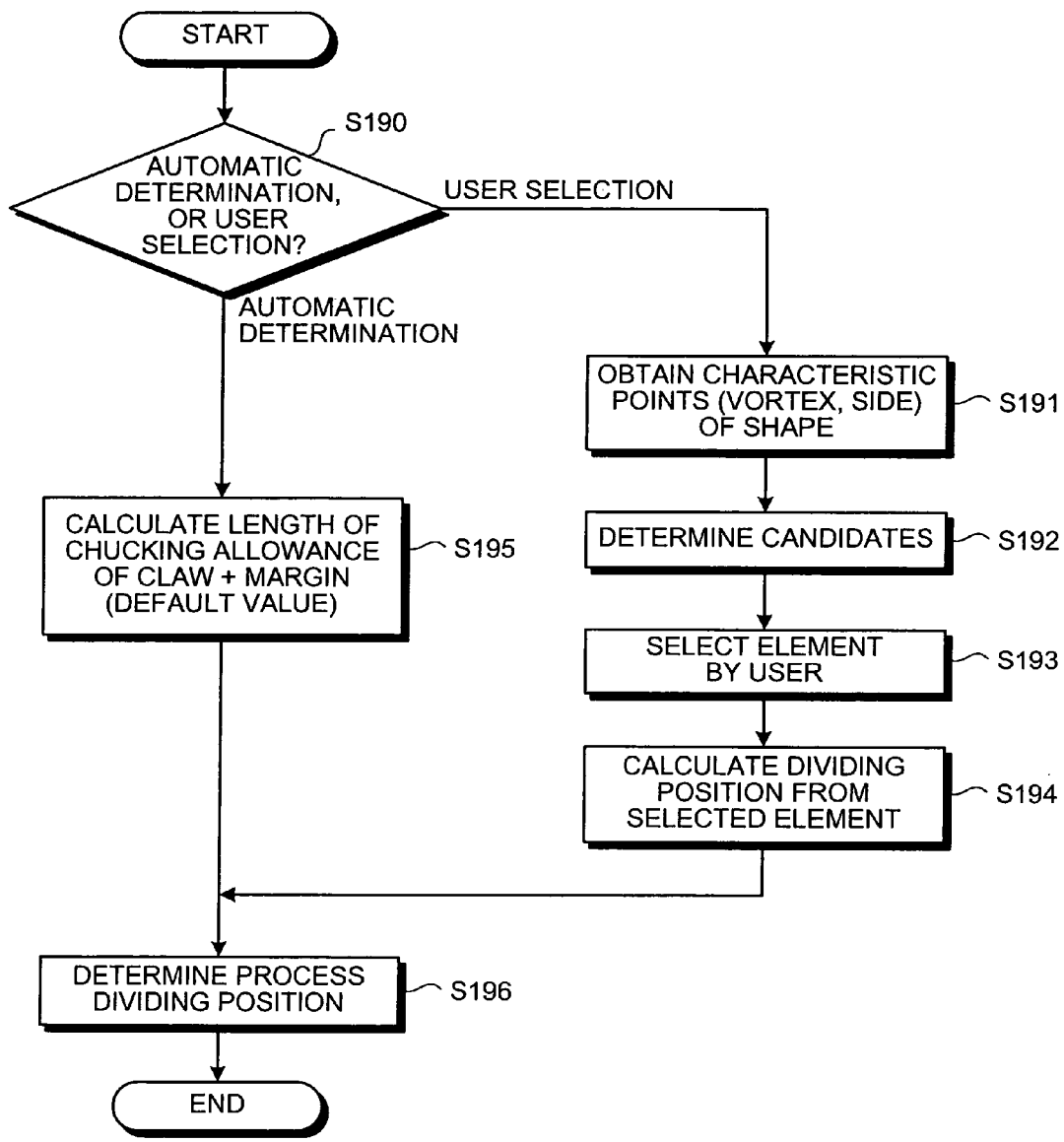
FIG. 38 is a flowchart of a process division processing.

The process dividing processing will be explained according to FIG. 38. On a process dividing processing screen (not shown), at first, the operator selects whether the process division is performed manually or automatically (step S150). When the operator selects a manual mode, the process-division processing unit 14 extracts characteristic points at which the shape of the product model SM, such as a vertex, a hole, and a ridge changes on the outer diameter side and the inner diameter side, respectively (step S191). The process-division processing unit 14 displays the extracted respective characteristic points on the outer diameter side and the inner diameter side on the screen as candidates of process division (step S192).

Figure 39:
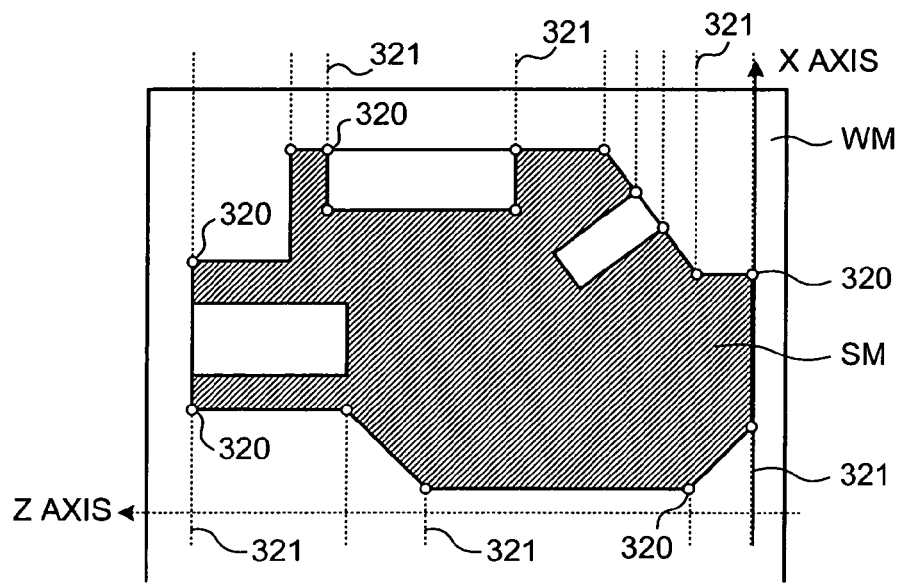
FIG. 39 is a schematic for illustrating a screen on which a characteristic is displayed.

FIG. 39 is one example of a process dividing screen on which a plurality of characteristic points is displayed. Characteristic points 320 and candidate lines 321 for process division corresponding to the characteristic points are displayed for the outer diameter side and the inner diameter side. The candidate lines 321 for process division extends in a direction perpendicular to the Z axis. When there is no characteristic point, a position calculated by adding a predetermined margin to the chucking allowance of the claw in the first process is displayed on the screen as a candidate for process division, so that machining is executed as much as possible in the first process in which more stable machining can be performed.

The operator refers to these displayed candidates for process division to select and specify desired process dividing spots for the inner diameter and the outer diameter (step S193). The process-division processing unit 14 calculates a coordinate position on the product model SM at the selected and specified process dividing spots (step S194). Thus, the process dividing position is determined (step S156).

Figure 40:
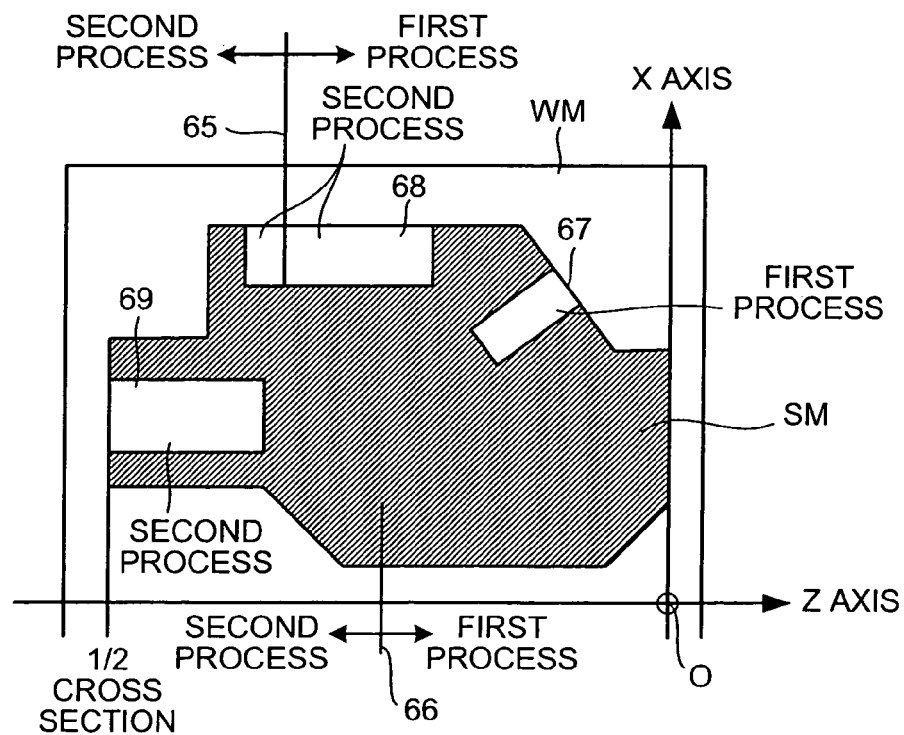
FIG. 40 is a schematic for illustrating a ½ section of a model in which a process dividing spot is specified.

FIG. 40 is a schematic for illustrating a ½ section of a model in which the process dividing spots are specified. In FIG. 17, a product model SM positioned with respect to the workpiece model WM is shown, and in this case, the shape of the product model SM is assumed to be symmetric with respect to the Z axis. In this product model SM, it is necessary to perform milling at 6 positions (3 positions on one side), in addition to drilling (a hole in the middle) and lathe-turning (outer diameter portion and inner diameter portion). In this case, it is determined that the outer diameter side is divided into the first process and the second process at a process dividing position 65, and the inner diameter side is divided into the first process and the second process at a process dividing position 66.

A milling position 67 located on the first process side belongs to the first process, and a milling position 69 located on the second process side belongs to the second process. The process-division processing unit 14 determines the machining content such that at a milling position 68 in which the process dividing position 65 is present, the whole portion including the one belonging to the first process side is machined in the second process. This is because it is more efficient to perform milling after chipping the whole outer diameter, than performing milling in a state that the outer diameter is chipped to half.

On the other hand, when the automatic determination mode is selected at step S190, the process-division processing unit 14 executes the following processing. That is, the chucking allowance length La of the claw in the first process is calculated, and a length (La+α) is calculated by adding a predetermined margin α to the chucking allowance length La of the claw (step S195), to determine a position of the workpiece model WM away from the end face in the Z direction on the chuck side for the length (La+α), as the process dividing position (step S196). A region on the edge side from the determined dividing position is designated as a first process region to be machined in the first process, and a region on the base side (chuck side) from the dividing position is designated as a second process region to be machined in the second process. A plurality of different values is preset corresponding to the length in the Z direction of the product model or the workpiece model as the margin α, so that the margin α is changed corresponding to the length in the Z direction of the product model or the workpiece model.

Another example of the automatic determination processing for process division will be explained with reference to FIGS. 41 and 42.

Figure 42B:
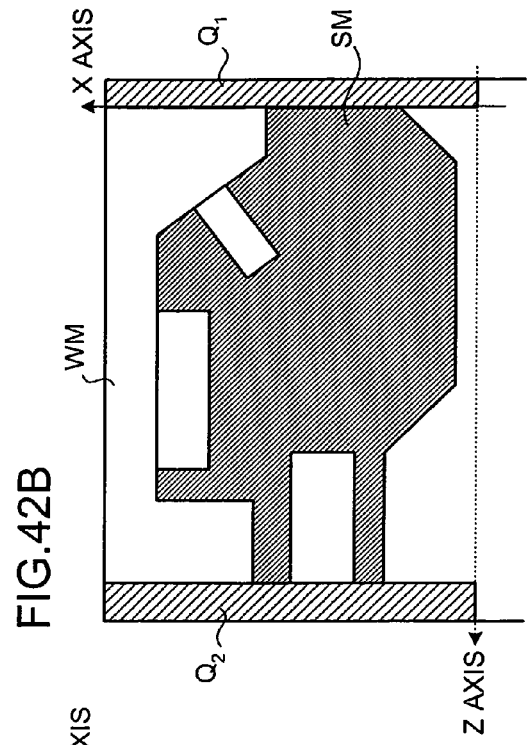
FIGS. 42A to 42D are schematics for illustrating the concept of the automatic processing for dividing the process shown in FIG. 41.
Figure 42D:
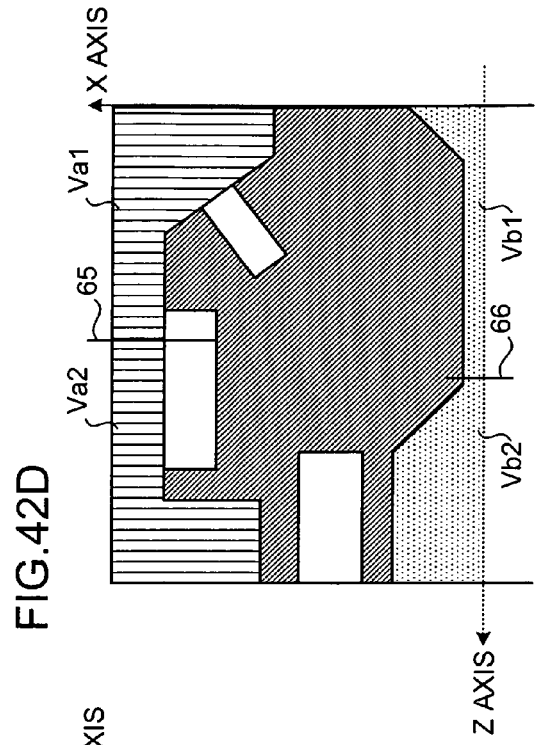
Figure 42A:
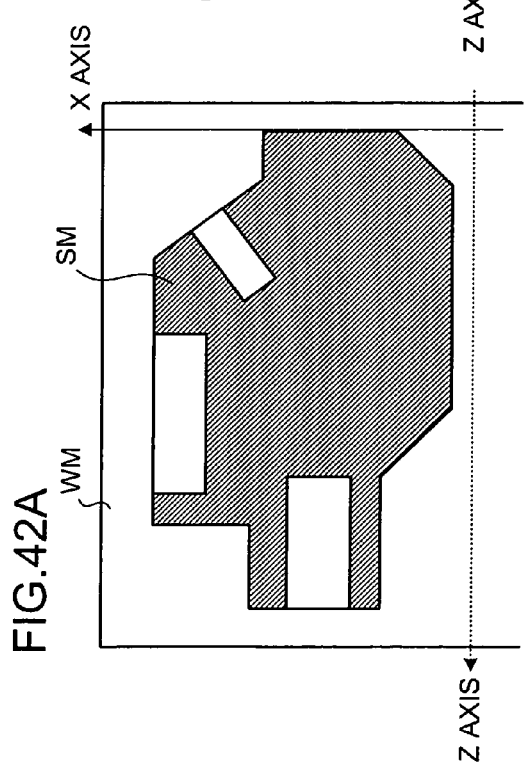

FIG. 42A is the product model SM positioned on the workpiece model WM. When the operator selects the automatic determination mode for process division, the process-division processing unit 14 obtains a workpiece model in which the machining areas on the front side and the backside, which are to be removed in the end-face processing from the workpiece model WM, are deleted (step S200). FIG. 42B is the concept thereof, in which a machining area Q1 on the front side and a machining area Q2 on the backside are removed from the workpiece model WM. That is, the machining area Q1 on the front side and the machining area Q2 on the backside correspond to the end-face machining allowance explained with reference to FIG. 9, and these machining areas Q1 and Q2 are removed based on the end-face machining allowance set by the end-face machining-allowance dialog 305 shown in FIG. 7.

Figure 42C:
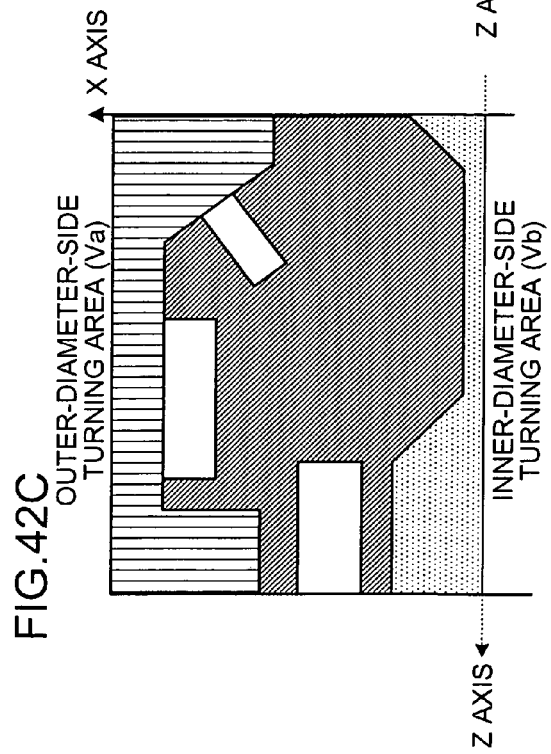

As shown in FIG. 42C, the process-division processing unit 14 divides the lathe-turning area in the workpiece model into a lathe-turning area on the outer diameter side and a lathe-turning area on the inner diameter side, based on the shape data of the workpiece model from which the end-face machining allowance is removed, and the shape data of the product model, to obtain a volume Va of the divided lathe-turning area on the outer diameter side and a volume Vb of the lathe-turning area on the inner diameter side (step S201).

As shown in FIG. 42D, the process-division processing unit 14 designates a position in the Z direction, at which the volume Va of the lathe-turning area on the outer diameter side is divided into two, that is, a position in the Z direction, at which the volume Va1 of a lathe-turning area on the outer diameter side in the first process and the volume Va2 of a lathe-turning area on the outer diameter side in the second process become the same, as the process dividing position 65 on the outer diameter side. Likewise, the process-division processing unit 14 designates a position in the Z direction, at which the volume Vb of the lathe-turning area on the inner diameter side is divided into two, that is, a position in the Z direction, at which the volume Vb1 of a lathe-turning area on the inner diameter side in the first process and the volume Vb2 of a lathe-turning area on the inner diameter side in the second process become the same, as the process dividing position 66 on the inner diameter side (step S202).

Thus, since the process is automatically divided into the first process and the second process, the time and labor of the operator to divide the process manually can be saved, thereby enabling efficient programming operations.

In the case of FIGS. 42A to 42D, the position in the Z direction, at which the lathe-turning area on the outer diameter side is divided into two is designated as a process dividing position on the outer diameter side, and the position in the Z direction, at which the lathe-turning area on the inner diameter side is divided into two is designated as a process dividing position on the inner diameter side. However, a position in the Z direction, at which the whole machining area on the outer diameter side including lathe-turning and milling is divided into two can be designated as a process dividing position on the outer diameter side, and a position in the Z direction, at which the whole machining area on the inner diameter side is divided into two can be designated as a process dividing position on the inner diameter side.

Furthermore, a position at which the volume of the whole machining area including the end-face machining area is divided into two can be designated as the process dividing position. In this case, the process dividing positions on the inner diameter side and the outer diameter side become the same position.

In the case of FIGS. 42A to 42D, only a lathe-turning area is extracted from the whole machining area, to obtain the Z position at which the extracted lathe-turning area is divided into two. Therefore, the lathe-turning area is separated from other machining areas in the whole machining area beforehand, based on the shape data or the like of the machining area. The details of this separation are described in Japanese Patent Application Laid-Open No. 2003-241809 filed by the present applicant.

(3)' Second Process Jig Setting (Setting of Second Chuck and Claw, Step S105)

The second process jig setting is mainly executed by the jig-setting processing unit 12 in FIG. 1. The second process jig setting processing is for setting a jig used in the second process, performed by the sub-spindle in the two-spindle machine tool.

In the second process jig setting processing, the operator turns on the SET FIXTURE button 6c on the menu selection main screen 8 shown in FIG. 4, to open the fixture setting menu 52 shown in FIG. 26, and further presses the SET SECOND SPINDLE CLAW button 52e so as to display the claw-pattern selection table 53 shown in FIG. 28 and the fixture setting window shown in FIG. 29, to perform the same processing as described above, thereby setting the claw arrangement of the second chuck on the sub-spindle side.

Figure 43:
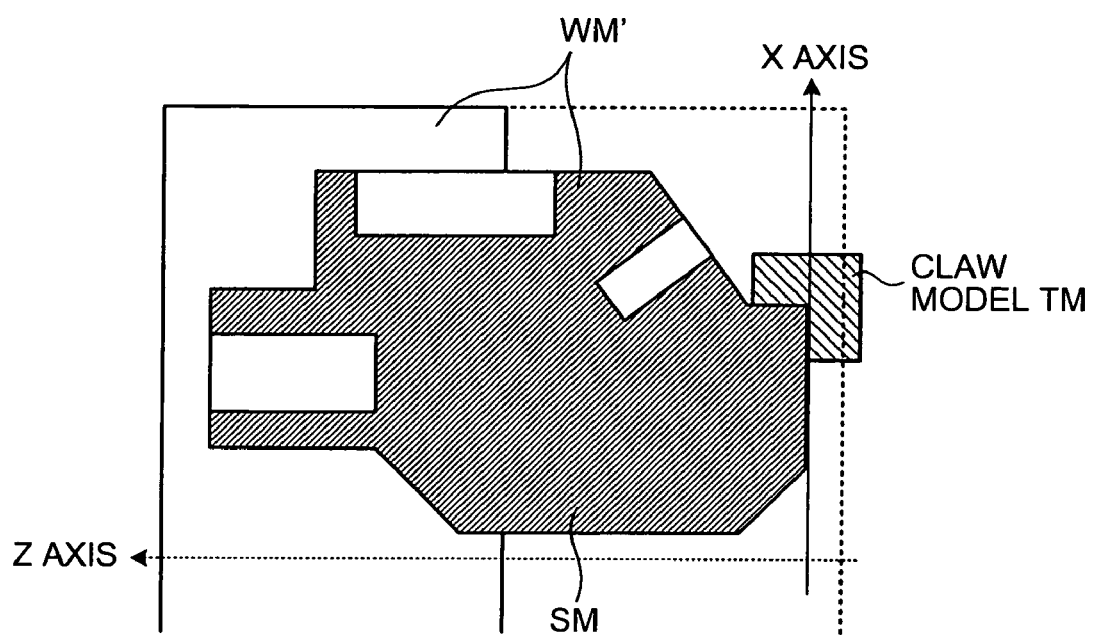
FIG. 43 is a schematic for illustrating the fixture setting processing in a second process.

However, at the time of fitting the workpiece to the sub-spindle, the first process has already been completed, and the holding diameter of the claw in the second process is determined by assuming the workpiece-shape after finishing machining in the first process. That is, as shown in FIG. 43, a workpiece model WM' after machining in the first process has been completed is created by the shape data of the product model SM, and the processing similar to the first process jig setting processing explained for step S102 is performed, to calculate the holding diameter of the claw.

(4)' Registration (Step S106)

The registration processing is mainly executed by the registration processing unit 13 in FIG. 1. The registration processing is for automatically arranging the product model in the workpiece model held by the second chuck used in the second process. Since the operation thereof is the same as the registration processing explained for step S103, the explanation is omitted.

(6) Process Expansion (Step S107)

The process expansion processing is started by turning on the EXPAND UNIT button 6f on the menu selection main screen 8 shown in FIG. 4. The process expansion processing is mainly executed by the process-expansion processing unit 15 in FIG. 1.

The process expansion processing is for breaking down a series of machining operation including lathe-turning, point machining, surface machining, chamfering and the like, referred to as machining modes, into machining units in which continuous machining is performed with the same main spindle and the same tool. The machining operation is formed as a combination of a plurality of machining units. In the process expansion processing, the machining operation both in the first process and the second process is expanded into a unit of machining units.

It is assumed that the default of the sequence in the automatic process expansion in the case of combined machining is lathe-turning→surface machining→point machining→chamfering, and this sequence can be optionally set by the operator. A rule for process-expanding only the point machining can be set by omitting lathe-turning, surface machining, and chamfering, in order to deal with machining for performing only hole drilling.

The default of the sequence in respective machining in the lathe-turning is end-face machining→lathe-turning drill (central hole)→machining of outer diameter of a bar→machining of inner diameter of the bar, and this sequence can be al optionally set by the operator. Therefore, even a sequence of end-face machining→machining of outer diameter of a bar→lathe-turning drill→machining of inner diameter of the bar is possible, and a sequence of end-face machining→lathe-turning drill→machining of inner diameter of the bar→machining of outer diameter of the bar is also possible.

The surface machining is process-expanded in order of from the one having a shallow machining depth. In the case of cylindrical shape, or cylindrical shape+conic shape, the point machining is expanded to drilling, and in the case of two cylindrical shapes having different diameters+conic shape, the point machining is expanded to a washer faced head. When machining attribute data is added to the CAD data, expansion to tapping, reaming, boring, and perfect circle is possible. The point machining is classified into four shape sequences of point, row, square, and lattice according to the array of holes having the same diameter, and the efficiency of point machining is improved by performing drilling in the sequence determined by the classified respective shape sequences. Furthermore, the diameter of the hole is compared with a threshold, to determine whether to perform point machining or pocket milling based on the comparison result, and either the point machining or pocket milling is executed according to the determination result. In this case, the threshold of the diameter can be optionally set.

Figures 44A, 44B:
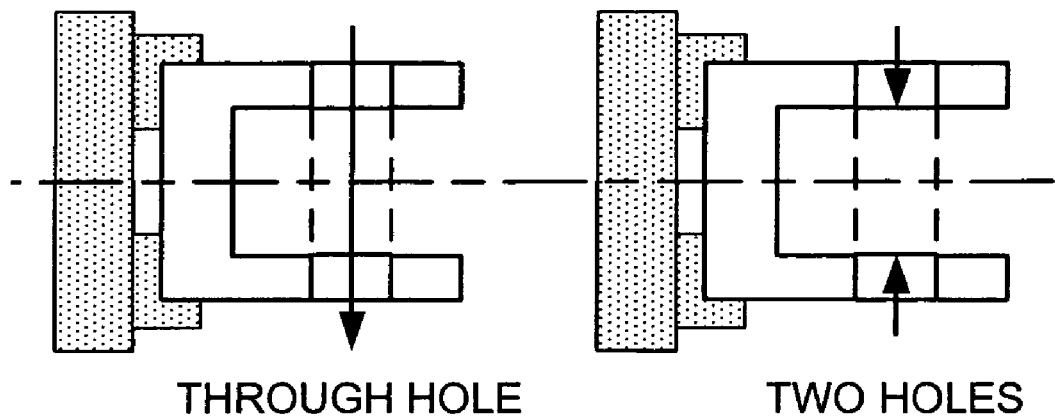
FIGS. 44A and 44B are schematics for illustrating an automatic determination processing of a through hole and two holes.

In point machining, it is automatically determined whether each hole is a through hole that can be machined by one point machining as shown in FIG. 44A, or two holes that can be machined only by two-point-machining as shown in FIG. 44B, and point machining is expanded according to the determination result.

Figure 45:
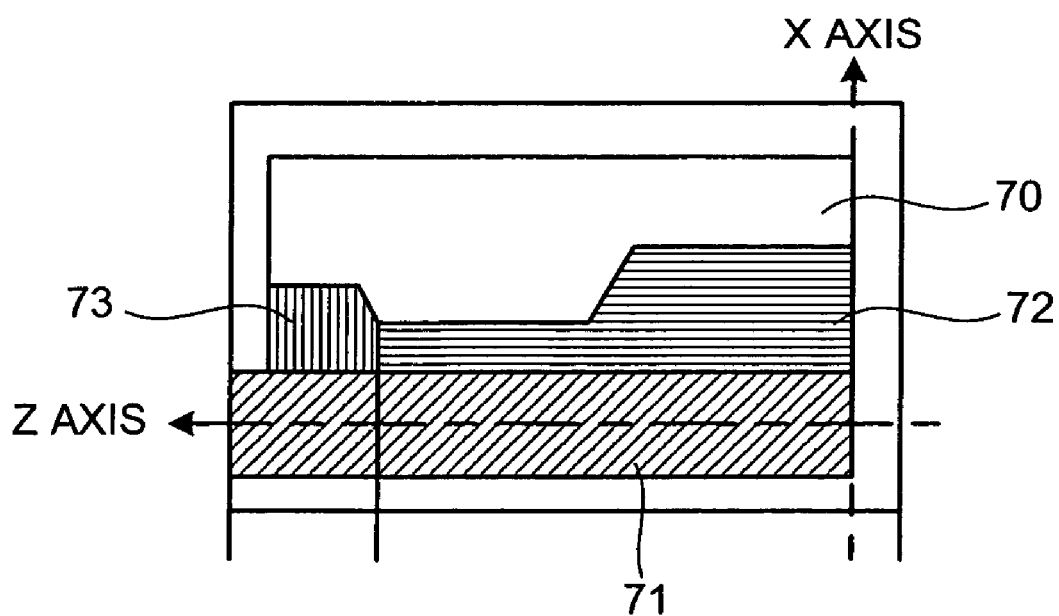
FIG. 45 is a schematic for illustrating an example of machining process expansion for an inner diameter portion.

FIG. 45 is one example of process expansion of lathe-turning only for the inner diameter portion. Reference sign 70 denotes a ½ cross section of the product model. In this case, an area 71 is first machined by lathe-turning and drilling, and the inner diameter of an area 72 is machined by lathe-turning. In the second process, the inner diameter of an area 73 is machined by lathe-turning. These respective areas 71, 72, and 73 are respectively one machining unit.

Figure 46:
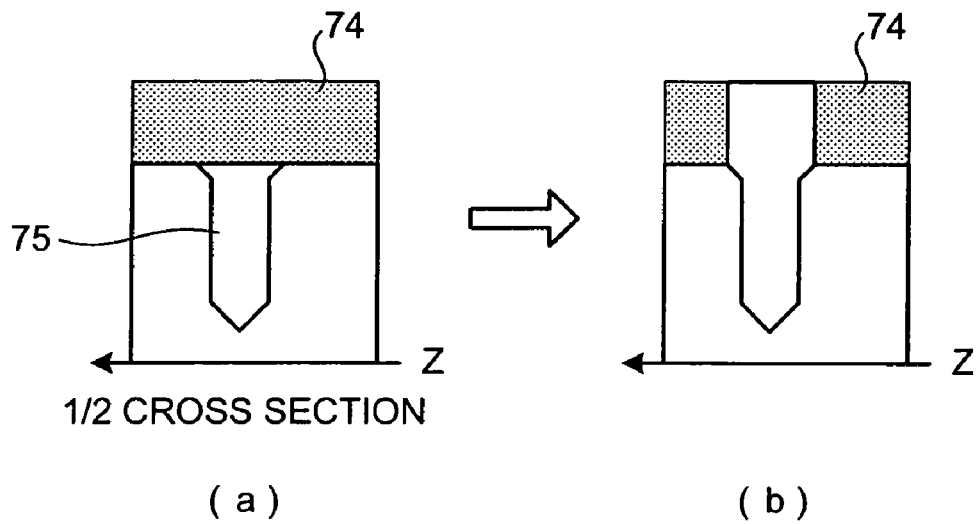
FIG. 46 is a schematic for illustrating point machining of an area between claws of a chuck.

As shown in (a) of FIG. 46, when a portion 75 to be point-machined is present in the lower part of a lathe-turning area 74 in an area between the claws of the first chuck, as shown in (b) of FIG. 46, the hole shape of the portion 75 to be point-machined is extended to the surface of the workpiece model, and the point machining of the portion 75 to be point-machined, with the hole shape being extended, is performed in the first process, in which more stable machining can be normally performed than in the second process. The lathe-turning workpiece with respect to the lathe-turning area 74 is performed in the second process.

The details of the process expansion processing are described in Japanese Patent Application Laid-Open No. 2003-241809 filed by the present applicant.

(7) Tool Selection (Step S108)

Figure 47:
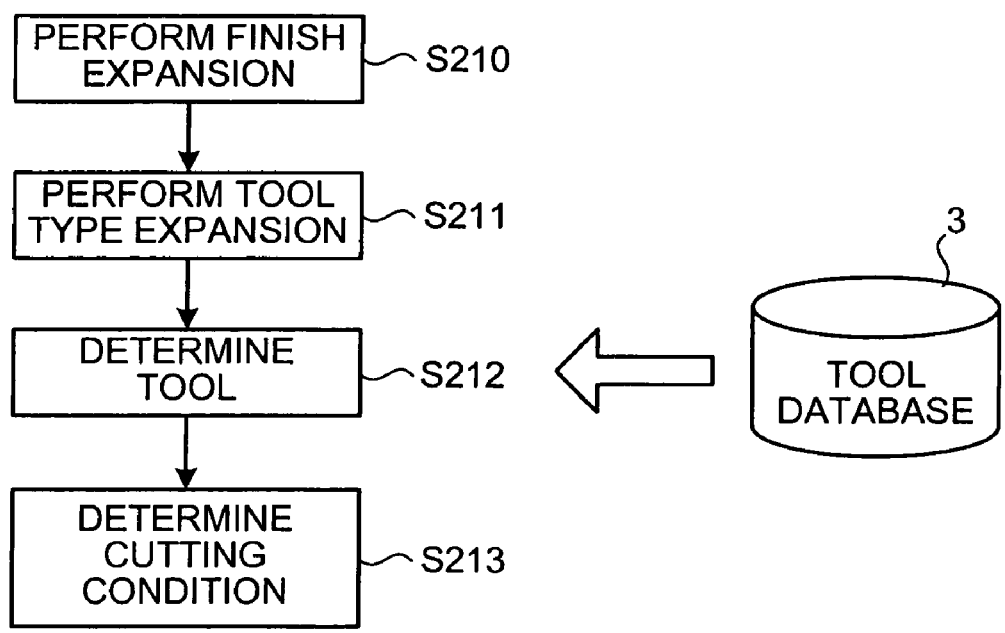
FIG. 47 is a flowchart of tool selection processing.

The process expansion processing described below is mainly executed by the tool-selection processing unit 16 in FIG. 1. FIG. 47 is an automatic expansion procedure of the tool sequence.

At first, a finishing allowance expansion for determining a finishing allowance corresponding to a finish mark in the CAD data is performed (step S210). Tool type expansion for determining how many tools are to be used for machining the respective process-expanded portions to be machined is then performed (step S211). Tool determination processing for selecting an optimum tool for the respective portions to be machined from the tool database is performed next (step S212). Lastly, since the tools are determined, a cutting condition corresponding to the tool is determined (step S213).

(8) Program Expansion (Step S109)

The program expansion processing is started by turning on the CREATE PROGRAM button 6h on the menu selection main screen 8 shown in FIG. 4. The program expansion processing is mainly executed by the program-expansion processing unit 19 in FIG. 1.

In the program expansion processing, NC creation programs for the first and the second processes made of a predetermined language are created, based on the combination of the process-expanded machining units, the determined tool information, and the cutting condition. The NC creation programs are converted to NC programs as numerical programs on the NC unit 200 side or the second NC controller 201 side in FIG. 1.

(9) Non-Expandable Shape Editing (Step S110)

The non-expandable shape editing processing is mainly executed by the non-expandable-shape-editing processing unit 17 in FIG. 1. The non-expandable shape editing processing is for performing editing workpiece for converting a non-expandable shape that cannot be automatically expanded to the machining unit in the previous process expansion processing into some machining unit.

The non-expandable shape includes a curved face, a shape requiring machining by a special tool, a shape that is not included in the machining units in the NC creation program created by the automatic programming apparatus, a tapered portion of a tapered pocket and the upper part thereof, an R portion and a fillet portion of a bottom R and a pocket with bottom fillet, and the upper part thereof.

Figure 48:
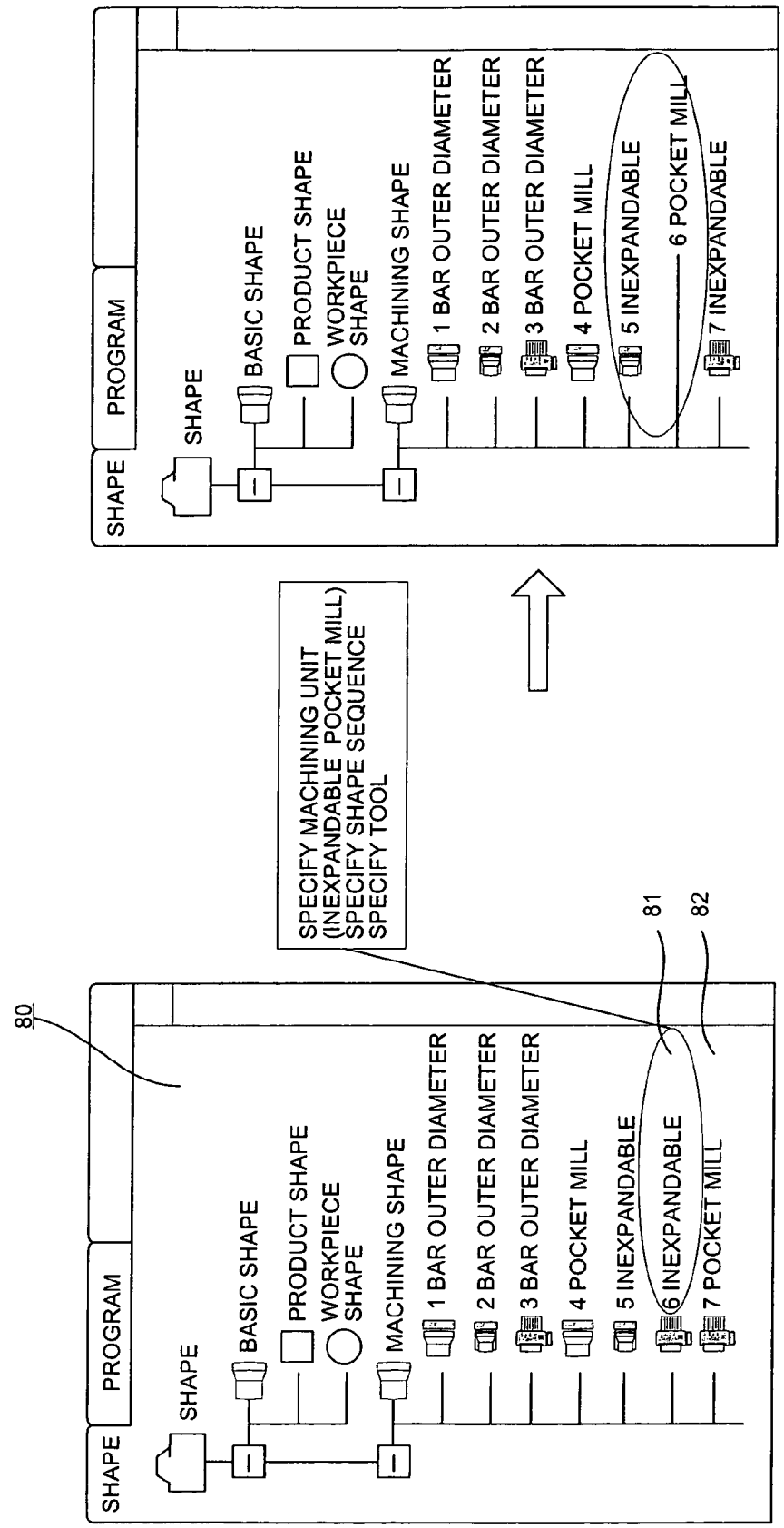
FIG. 48 is a schematic for illustrating an edit processing with respect to a non-expandable shape.

The non-expandable shapes that cannot be automatically expanded to the machining unit are displayed, as shown in (a) of FIG. 48, as non-expandable shapes 81 and 82 in a machining shape tree 80, which hierarchically displays the machining units on a tree.

In the machining shape tree 80, editing operation such as a change of the machining unit name, a sequence change of machining units, and switching of valid/invalid of the machining unit can be performed. In FIG. 48, "outer diameter of bar", "pocket mill", and "non-expandable shape" are added as the machining unit names, and the figure added on the left of the machining unit name shows the machining order of the machining units. When the order of the machining units is changed, interference due to the order change is checked.

The non-expandable shape can be expanded, as shown in (b) of FIG. 48, to the NC creation program that can be created by the automatic programming apparatus, by changing the machining unit name, for example, from "non-expandable" to "pocket mill", and specifying the shape sequence (how to specify the shape expressing the profile) and the tool.

(10) Program Editing (Step S111)

The program edit processing is started by turning on the EDIT UNIT button 6g on the menu selection main screen 8 shown in FIG. 4. The program edit processing is mainly executed by the program-editing processing unit 18 in FIG. 1. In this program edit processing, edit processing of the created NC creation program is performed. The created NC creation program includes machining units and machining programs corresponding to respective machining units.

Figure 49:
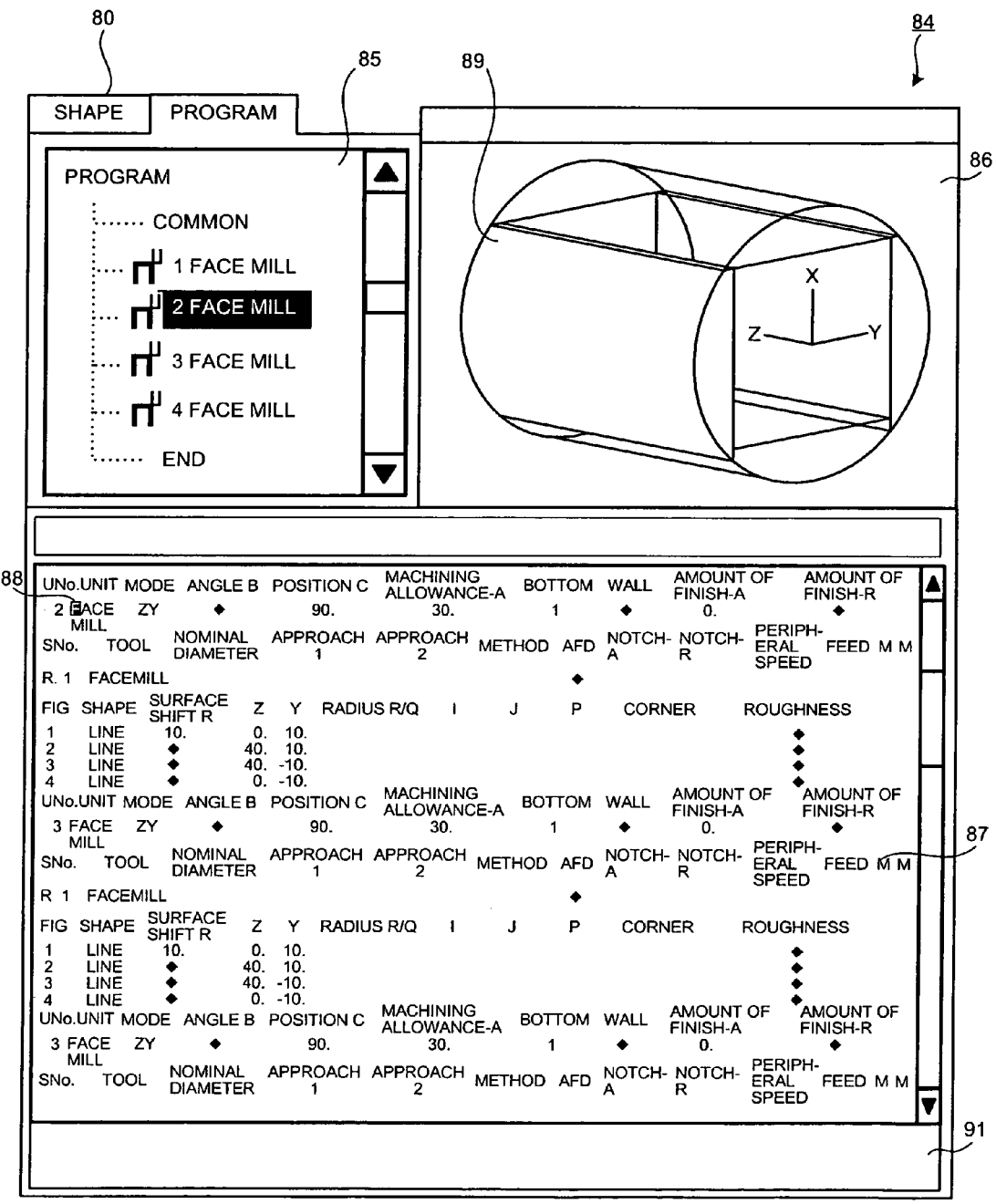
FIG. 49 is a schematic for illustrating a program editing screen.

As shown in FIG. 49, a program editing screen 84 has the machining shape tree 80 and a program tree 85, a three-dimensional display section 86, an editor section 87, and a menu display section 91.

The machining shape tree 80 hierarchically displays machining unit names, as also shown in FIG. 48, in a tree format. The program tree 85 hierarchically displays a machining program in a unit of machining unit in a tree format. In the three-dimensional display section 86, any one of the product model and the workpiece or both (a synthetic model obtained by overlapping the workpiece model on the product model) is three-dimensionally displayed by a wire frame or the like.

In the editor section 87, when the machining shape tree 80 is selected for display, machining unit data (data including the shape sequence indicating the machining shape and machining contents) corresponding to the machining unit name selected in the machining shape tree 80 is displayed, and when the program tree 85 is selected for display, a machining program corresponding to the program name (in the case of FIG. 54, a program name the same as the machining unit name is provided) selected on the program tree 85 is displayed. In the editor section 87, the cursor is positioned at the top of the machining unit data corresponding to the machining unit or the machining program, selected in the machining shape tree 80 or the program tree 85.

Figure 50:
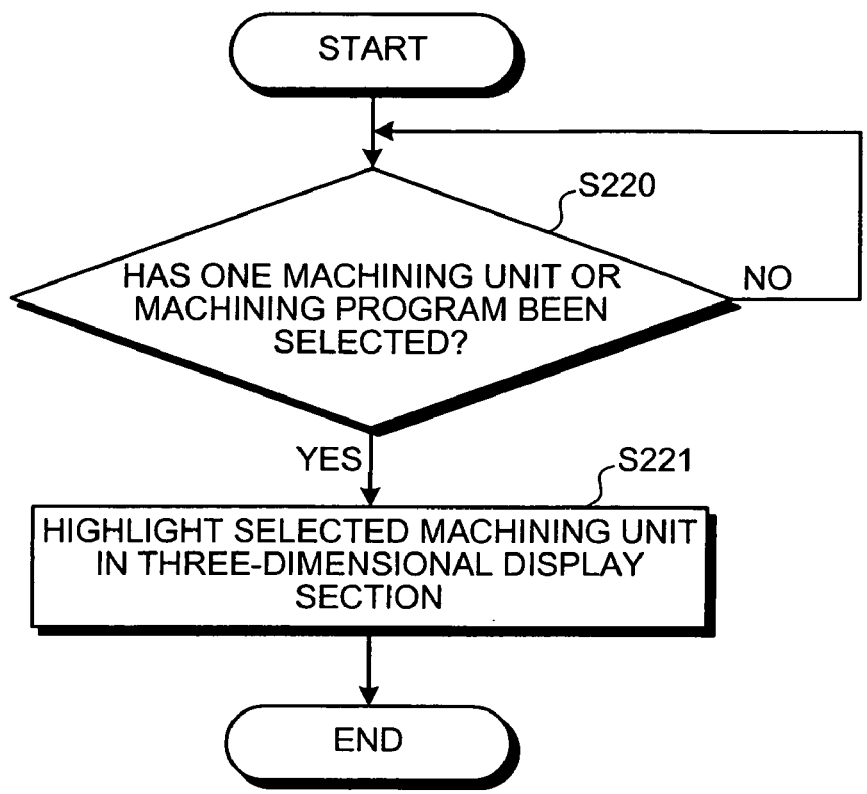
FIG. 50 is a flowchart of highlight processing in a three-dimensional display section of a machining unit.

First, highlighting display processing of the machining unit in the three-dimensional display section 86 will be explained with reference to FIG. 50. The processing in FIG. 50 is the highlighting display processing by the program-editing processing unit 18.

It is assumed that one machining unit name is selected in the machining shape tree 80 to display the machining unit data such as the shape sequence in the editor section 87, or one machining program name is selected on the program tree to display the machining program body in the editor section 87. The program-editing processing unit 18 detects this (step S220), and highlight-displays a machining unit 89 corresponding to the position of the cursor 88 in the editor section 87 in the three-dimensional display section 86 (step S221).

Thus, since the machining unit corresponding to the cursor position is highlight-displayed in the three-dimensional display section 86, it can be determined clearly to which machining unit the cursor position corresponds, thereby making the editing operation efficient, and reducing editing errors.

Figure 52:
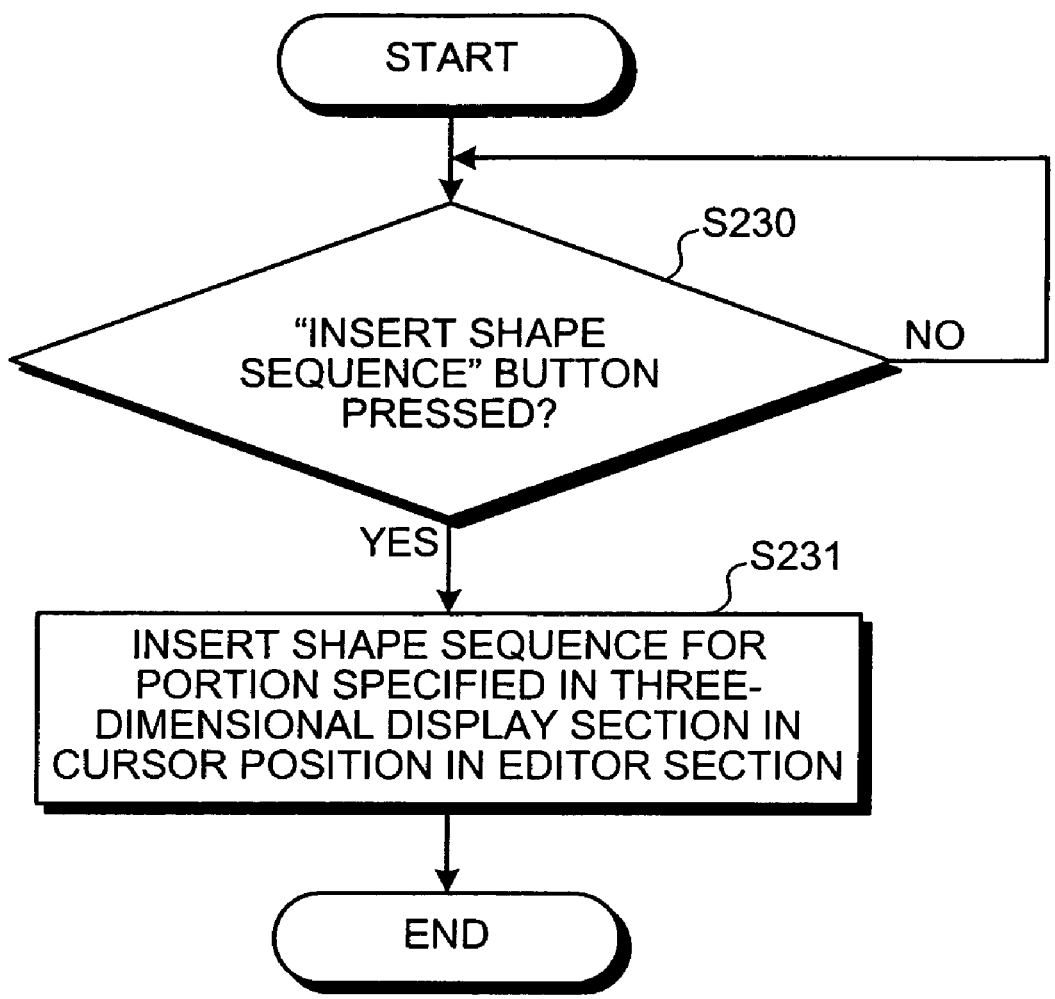
FIG. 52 is a flowchart of shape sequence insertion processing.

Insertion processing of the shape sequence constituting the machining unit data will be explained with reference to FIG. 52. In the shape sequence insertion processing, the shape selected in the three-dimensional display section 86 can be inserted in the cursor position in the editor section 87 as the shape sequence. This function is a convenient function at the time of editing a non-expandable shape. This function is executed in the following manner.

Figure 51A:
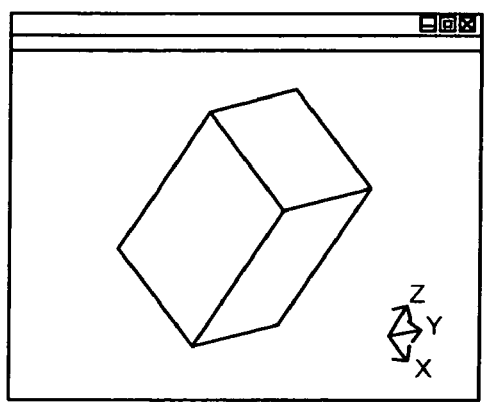
FIGS. 51A and 51B are schematics for illustrating a processing for inserting the shape selected by the three-dimensional display section into a cursor position in an editor section as a shape sequence.

First, the operator selects a machining unit name into which the operator wants to insert a shape sequence (in this case, it is assumed to be a non-expandable unit) on the program tree 85. The operator selects the whole shape of the non-expandable unit on the program tree 85 or the three-dimensional display section 86. FIG. 51A is a state in which the whole non-expandable unit is displayed.

Figure 51B:
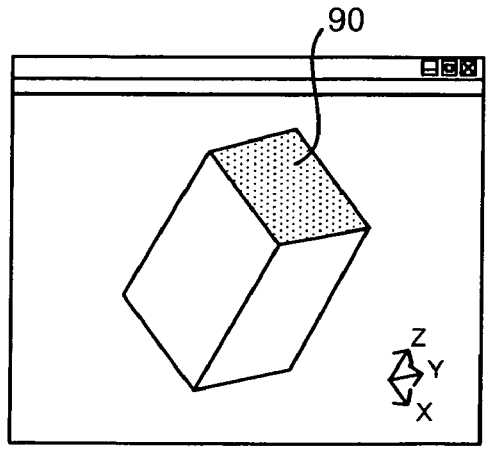

The operator then selects a shape element for which the operator wants to obtain a coordinate value (for example, one plane) in the three-dimensional display section 86 by a mouse or the like. A selected plane 90 is highlight-displayed in the three-dimensional display section 86, as shown in FIG. 51B.

In this state, after having shifted the cursor position in the editor section 87 to a desired position, when the operator presses a "INSERT SHAPE SEQUENCE" button (not shown) in the menu display section 91 on the program editing screen 84 (step S230), as shown in FIG. 53, a shape sequence corresponding to the selected plane 90 is inserted in the cursor position in the editor section 87 (step S231).

Thus, since the shape selected in the three-dimensional display section 86 can be inserted in the cursor position in the editor section 87 as a shape sequence, editing operation of the non-expandable shape and the like can be performed efficiently. In the above explanation, the shape sequence in the machining unit data is inserted in the cursor position, but machining unit data corresponding to the machining unit selected in the three-dimensional display section 86 can be inserted in the cursor position.

Figure 55:
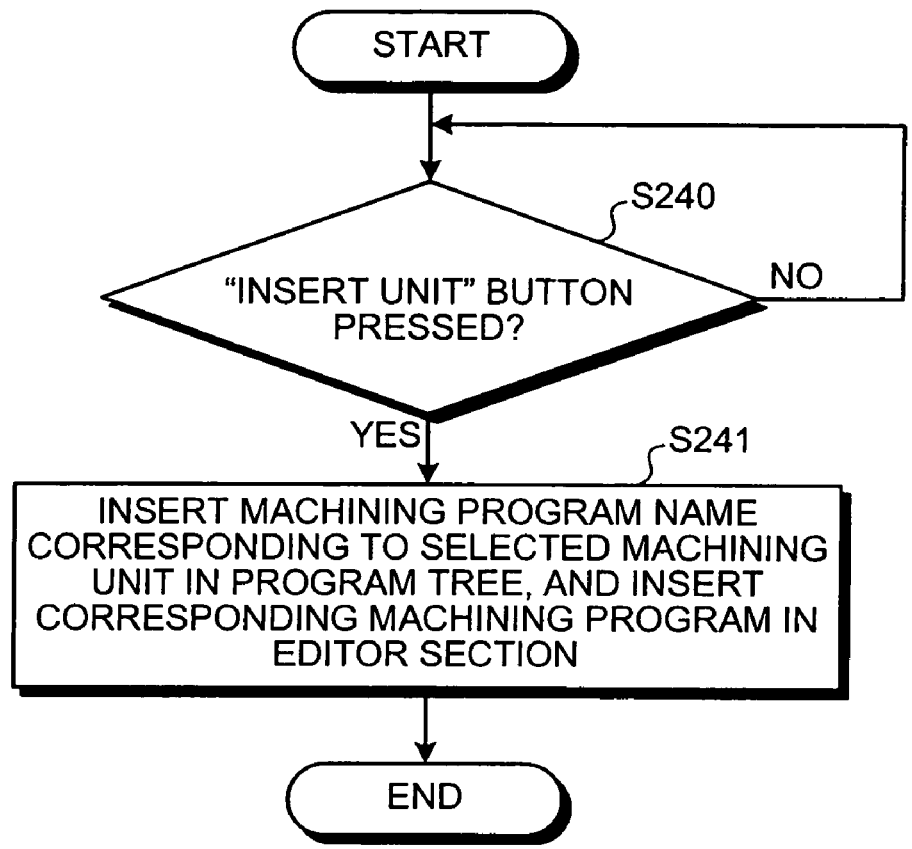
FIG. 55 is a flowchart of unit insertion processing.

The insertion processing of the machining program name and the machining program corresponding to the machining unit name selected in the machining shape tree 80 will be explained with reference to FIG. 55. This insertion function can be used when a program for a machining unit is destroyed due to an erroneous operation, and can perform program conversion in a unit of machining unit. This function is executed in the following manner.

Figure 54:
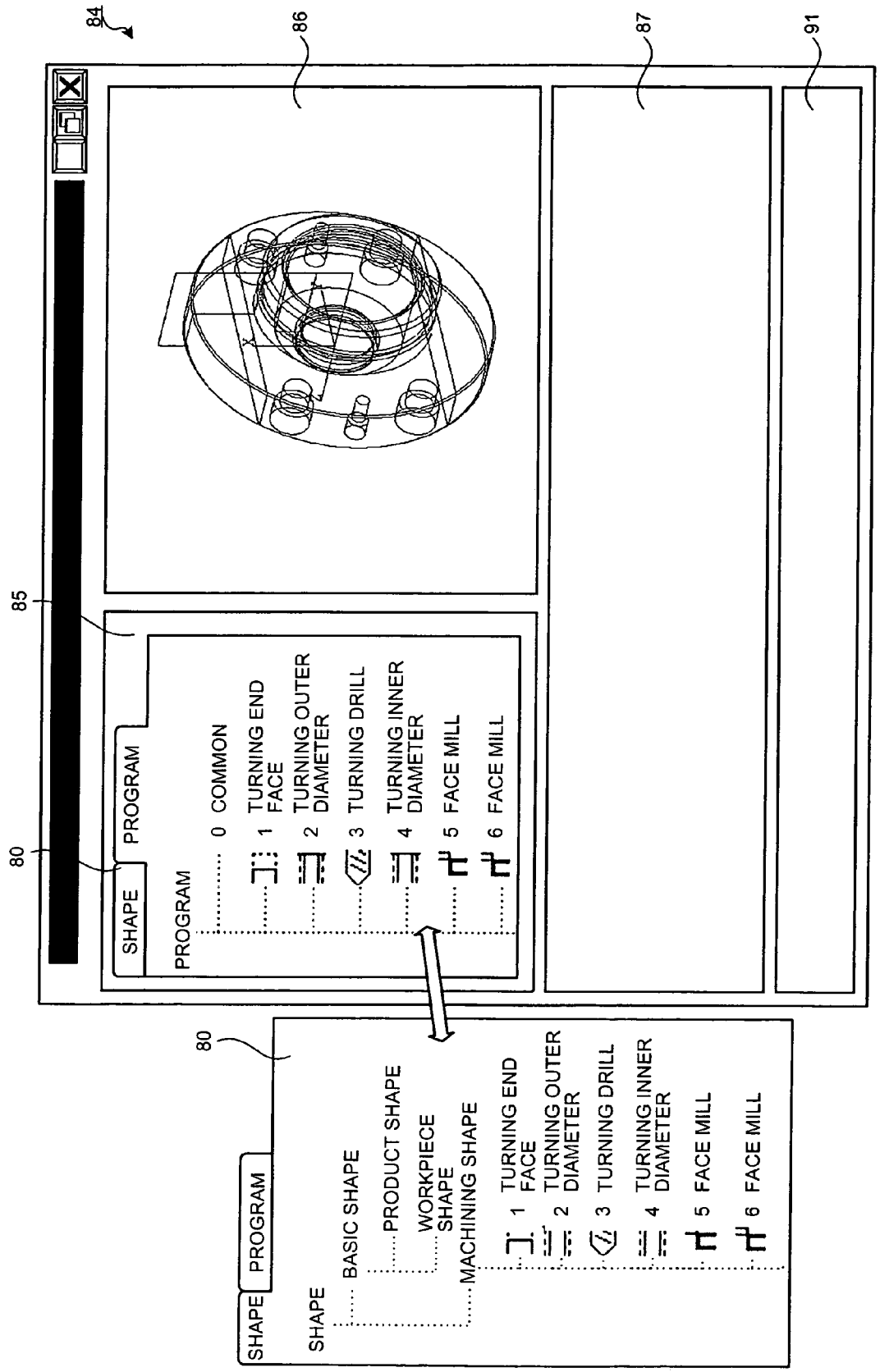
FIG. 54 is a schematic for illustrating the program editing screen.

The operator selects a machining unit name to be inserted in the machining shape tree 80 (see FIG. 54). The operator then selects the machining program name next to the position to be inserted (in the case of FIG. 54, the machining unit name and the machining program name match each other) is selected on the program tree 85. At this time, the cursor in the editor section 87 is positioned at the head of the machining program corresponding to the program name selected on the program tree 85.

In this state, when the operator presses a "INSERT UNIT" button (not shown) in the menu display section 91 on the program editing screen 84 (step S240), the machining program name corresponding to the machining unit name selected in the machining shape tree 80 is inserted in front of the machining program name selected on the program tree 85 in a unit of machining unit, and the machining program corresponding to the machining unit name selected in the machining shape tree 80 is inserted in front of the cursor position in the editor section 87 in a unit of machining unit.

Thus, since the machining program name and the machining program corresponding to the machining unit name can be easily inserted in a unit of machining unit, at a desired position on the program tree 85 and the editor section 87, the editing operation can be efficiently performed when a machining program for a machining unit is destroyed or the like. A program name next to the position to be inserted is first selected on the program tree 85, and then a machining unit name to be inserted next can be selected in the machining shape tree 80.

A second embodiment of the present invention will be explained with reference to FIGS. 56 and 57. The automatic programming apparatus in the first embodiment is an automatic programming apparatus applied to the two-spindle machine tool having two spindles, that is, the main spindle and the sub-spindle installed so as to face the main spindle. However, the automatic programming apparatus in the second embodiment is an automatic programming apparatus applicable to the two-spindle machine tool having the two spindles of the main spindle and the sub-spindle, and a one-spindle machine tool having only the main spindle.

In the case of the two-spindle machine tool, machining in the first process and machining in the second process can be performed continuously by the main spindle side and the sub-spindle side. Therefore, in the automatic programming apparatus, one program for continuously executing the machining in the first process and the machining in the second process is created. In contrast, in the case of the one-spindle machine tool, after finishing machining in the first process, the workpiece is reversed and held again on the main spindle side to perform machining in the second process, in order to perform the machining in the first process and the machining in the second process only by the main spindle. Therefore, in the automatic programming apparatus, two machining programs, that is, a machining program in the first process and a machining program in the second process, are created.

In the case of a machine having only the main spindle, without the sub-spindle, after process 1 (corresponding to the first process) is finished, the workpiece model is reversed and the reversed workpiece model is held again by the chuck model of the main spindle, to execute process 2 (corresponding to the second process) for performing the machining for the remaining area. In other words, in the one-spindle machine tool, machining is performed by holding one end of the workpiece model by the first spindle machine in process 1, and machining is performed by holding the other end of the workpiece model by the first spindle machine in process 2.

Figure 56:
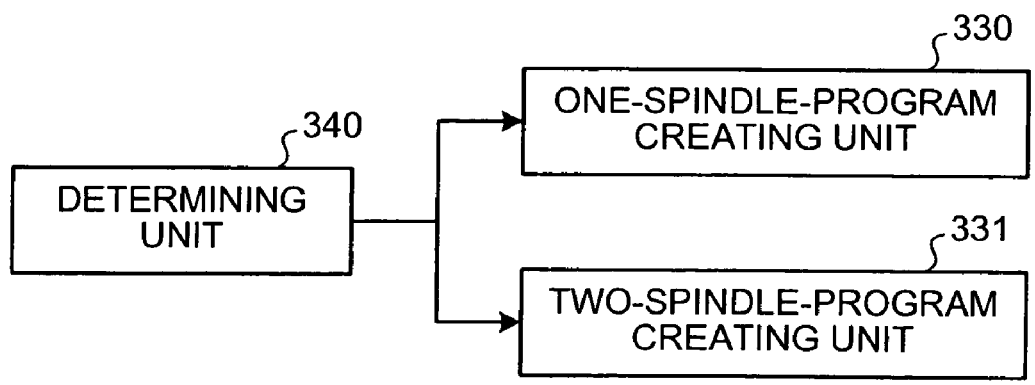
FIG. 56 is a block diagram of a configuration of the automatic programming apparatus according to a second embodiment.

As shown in FIG. 56, the automatic programming apparatus in the second embodiment includes a one-spindle-program creating unit 330, which is an automatic programming apparatus for creating a machining program for a one-spindle machine, a two-spindle-program creating unit 331, which is an automatic programming apparatus for creating a machining program for a two-spindle machine, and a determining unit 340 that determines which is the control object, of the two-spindle machine or the one-spindle machine, and activates either the one-spindle-program creating unit 330 or the two-spindle-program creating unit 331 according to the determination result.

The operation of the automatic programming apparatus in the second embodiment will be explained with reference to the flowchart in FIG. 57. The automatic programming apparatus has the determining unit 340 that determines whether the machine tool to be controlled has a sub-spindle, and the determining unit 340 determines, at the time of startup of the program, whether the machine tool to be controlled is a machine with a sub-spindle (second spindle) (step S400). That is, when the automatic programming apparatus is started for the first time, the operator registers whether the machine tool to be controlled has a sub-spindle, in an interactive mode using an appropriate dialog, and the registered identification information indicating the presence of the sub-spindle is stored, so that the determining unit 340 refers to the stored identification information at the time of startup of the program, to determine whether the machine tool to be controlled has the sub-spindle. The automatic programming apparatus also has a function capable of changing the registered identification information.

Thus, the automatic programming apparatus has first software (two-spindle-program creating unit 331) for creating an NC creation program for creating an NC program for machining a product from a work, for the two-spindle machine tool having two spindles of the main spindle and the sub-spindle as a control object, and second software (one-spindle-program creating unit 330) for creating an NC creation program for creating an NC program for machining a product from a work, for the one-spindle machine tool having the main spindle as a control object. At the time of startup of the program, the determining unit 340 determines which machine tool is to be controlled, of the one-spindle machine tool and the two-spindle machine tool, so as to start either the first software or the second software. The first software and the second software include many common parts.

When the determining unit 340 determines that a machine with the sub-spindle is to be controlled, as in the first embodiment, processing at steps S100 to S109 is executed by the first software (see FIG. 2). According to such processing, since the first process and the second process are program-expanded simultaneously at steps S107 and S108, the created NC creation program is one continuous program including the first process program, the workpiece delivery program, and the second process program, and capable of automatically operating the whole process. In this case, the program for the second process is created, succeeding the information in the first process. Therefore, in the second process, the product shape input processing at step S100 and the workpiece-shape setting processing at step S101 can be omitted, thereby enabling efficient program creation.

On the other hand, when the determining unit 340 determines that a one-spindle machine tool without having a sub-spindle is to be controlled, the following processing is performed by the second software. At first, the product shape input processing similar to that of step S100 is performed (step S401), the workpiece-shape setting processing similar to that of step S101 is performed (step S402), then are subsequently performed first process (process 1) jig setting processing similar to that of step S102 (step S403), registration processing similar to that of step S103 (step S404), and process dividing processing similar to that of step S104 (step S405).

When the one-spindle machine tool is to be controlled, process expansion and tool selection for process 1 only are executed (step S406). Program expansion for only process 1 is then executed (step S407). The workpiece model is then reversed by 180 degrees, and held again by the chuck model of the main spindle (step S408).

Second process (process 2) jig setting processing similar to that of step S105 (step S409), and registration processing similar to that of step S106 (step S410) are performed.

Process expansion and tool selection for only process 2 are executed (step S411), and program expansion for only process 2 is executed (step S412). The NC creation program including the process 1 program and the process 2 program is created in this manner.

According to the second embodiment, it is determined whether the machine tool to be controlled has a sub-spindle, and either the automatic programming apparatus for one-spindle machine or the automatic programming apparatus for two-spindle machine is operated according to the determination. As a result, an automatic programming apparatus applicable to the two-spindle machine tool having the main spindle and the sub-spindle, and the one-spindle machine tool having only the main spindle can be provided.

INDUSTRIAL APPLICABILITY

The automatic programming method and device according to the present invention is useful for software for creating an NC creation program for creating an NC program of an NC unit, for a two-spindle machine tool having the main spindle and the sub-spindle, or a one-spindle machine tool having only the main spindle as a control object.

The invention claimed is:

1. An automatic programming method of selecting workpiece data from a workpiece database in which a material, a shape, and a dimension of a workpiece are registered, creating a workpiece model for lathe turning based on the selected workpiece data, and creating a program for controlling a numerical control device based on a product model for lathe turning and the created workpiece model, the automatic programming method comprising:
   workpiece selecting including
      selecting workpiece data involving a product shape and having a smallest diameter for lathe turning around a turning axis from the workpiece database, by comparing dimension data of the workpiece data with dimension data of the product model in a state in which the product model is arranged on the turning axis and the workpiece data is arranged so that a center axis of each workpiece matches a center of the turning axis; and
      selecting, from a plurality of workpiece data involving the product shape and having the smallest diameter for lathe turning around the turning axis, workpiece data having a length equal to or longer than the product shape and a shortest length; and
   creating the workpiece model for lathe turning based on the selected workpiece data.

2. The automatic programming method according to claim 1, wherein
   a shape of the workpiece is a round bar, and
   the workpiece selecting further includes
      obtaining a longest distance between the turning axis and a fringe area of the product model; and
      selecting a round-bar work having a radius equal to or longer than the longest distance and a smallest diameter.

3. The automatic programming method according to claim 1, wherein
   a shape of the workpiece is a polygonal bar, and
   the workpiece selecting further includes
      obtaining respective distances between line segments parallel to respective fringes of the polygonal bar and tangent to the product model and the turning axis;
      obtaining a maximum value from among the obtained distances; and
      selecting a polygonal work model having an opposite side distance equal to or larger than twice of the obtained maximum value and a shortest opposite side distance.

4. The automatic programming method according to claim 1, wherein
   the workpiece selecting further includes
      displaying the workpiece data registered in the workpiece database in a list; and
      highlighting minimum workpiece data from among the workpiece data displayed in the list.

5. The automatic programming method according to claim 1, wherein
   the workpiece selecting further includes
      displaying workpiece data involving a product shape in a list from the workpiece database in an increasing order of cutting amount; and
      highlighting minimum workpiece data from among the workpiece data displayed in the list.

6. The automatic programming method according to claim 1, wherein
   a workpiece selecting unit automatically performs the workpiece selecting; and
   the workpiece selecting unit communicates the selected workpiece data to a workpiece-model creating unit.

7. The automatic programming method according to claim 6, wherein
   the created workpiece model is stored in a memory.

8. The automatic programming method according to claim 1, wherein
   the created workpiece model is stored in a memory.

9. The automatic programming method according to claim 1, further comprising:
   generating machine code based on the created workpiece model; and
   outputting the machine code from a programming apparatus to a numeric controller.

10. The automatic programming method according to claim 9, further comprising:

the numeric controller executing the machine code transmitted from the programming apparatus.

11. A computer-readable recording medium that stores a computer program for selecting workpiece data from a workpiece database in which a material, a shape, and a dimension of a workpiece are registered, creating a workpiece model for lathe turning based on the selected workpiece data, and creating a program for controlling a numerical control device based on a product model for lathe turning and the created workpiece model, wherein the computer program causes a computer to execute:

workpiece selecting including
selecting workpiece data involving a product shape and having a smallest diameter for lathe turning around a turning axis from the workpiece database, by comparing dimension data of the workpiece data with dimension data of the product model in a state in which the product model is arranged on the turning axis and the workpiece data is arranged so that a center axis of each workpiece matches a center of the turning axis; and
selecting, from a plurality of workpiece data involving the product shape and having the smallest diameter for lathe turning around the turning axis, workpiece data having a length equal to or longer than the product shape and a shortest length; and
creating the workpiece model for lathe turning based on the selected workpiece data.

12. An automatic programming apparatus for selecting workpiece data from a workpiece database in which a material, a shape, and a dimension of a workpiece are registered, creating a workpiece model for lathe turning based on the selected workpiece data, and creating a program for controlling a numerical control device based on a product model for lathe turning and the created workpiece model, the automatic programming apparatus comprising:

a memory;
a processor;
a workpiece selecting unit that selects workpiece data involving a product shape and having a smallest diameter for lathe turning around a turning axis from the workpiece database, by comparing dimension data of the workpiece data with dimension data of the product model in a state in which the product model is arranged on the turning axis and the workpiece data is arranged so that a center axis of each workpiece matches a center of the turning axis, and selects, from a plurality of workpiece data involving the product shape and having the smallest diameter for lathe turning around the turning axis, workpiece data having a length equal to or longer than the product shape and a shortest length; and
a workpiece-model creating unit that creates the workpiece model for lathe turning based on the selected workpiece data,
wherein the memory stores the workpiece selecting unit and the workpiece-model creating unit.

13. The automatic programming apparatus according to claim 12, wherein
a shape of the workpiece is a round bar, and
the workpiece selecting unit obtains a longest distance between the turning axis and a fringe area of the product model, and selects a round-bar work having a radius equal to or longer than the longest distance and a smallest diameter.

14. The automatic programming apparatus according to claim 12, wherein
a shape of the workpiece is a polygonal bar, and
the workpiece selecting unit obtains respective distances between line segments parallel to respective fringes of the polygonal bar and tangent to the product model and the turning axis, obtains a maximum value from among the obtained distances, and selects a polygonal work model having an opposite side distance equal to or larger than twice of the obtained maximum value and a shortest opposite side distance.

15. The automatic programming apparatus according to claim 12, wherein
the workpiece selecting unit displays the workpiece data registered in the workpiece database in a list, and highlights minimum workpiece data from among the workpiece data displayed in the list.

16. The automatic programming apparatus according to claim 12, wherein
the workpiece selecting unit displays workpiece data involving a product shape in a list from the workpiece database in an increasing order of cutting amount, and highlights minimum workpiece data from among the workpiece data displayed in the list.

* * * * *